(12) United States Patent
Zhang et al.

(10) Patent No.: US 11,394,969 B2
(45) Date of Patent: Jul. 19, 2022

(54) SAMPLE DETERMINATION FOR ADAPTIVE LOOP FILTERING

(71) Applicants: Beijing Bytedance Network Technology Co., Ltd., Beijing (CN); Bytedance Inc., Los Angeles, CA (US)

(72) Inventors: Li Zhang, San Diego, CA (US); Kai Zhang, San Diego, CA (US); Hongbin Liu, Beijing (CN); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/570,682

(22) Filed: Jan. 7, 2022

(65) Prior Publication Data
US 2022/0132117 A1 Apr. 28, 2022

Related U.S. Application Data

(63) Continuation of application No. PCT/CN2020/100962, filed on Jul. 9, 2020.

(30) Foreign Application Priority Data

Jul. 9, 2019 (WO) ................ PCT/CN2019/095330

(51) Int. Cl.
*H04N 19/117* (2014.01)
*H04N 19/176* (2014.01)
(Continued)

(52) U.S. Cl.
CPC ......... *H04N 19/117* (2014.11); *H04N 19/132* (2014.11); *H04N 19/14* (2014.11);
(Continued)

(58) Field of Classification Search
CPC .... H04N 19/117; H04N 19/132; H04N 19/14; H04N 19/176; H04N 19/82; H04N 19/96
(Continued)

(56) References Cited

U.S. PATENT DOCUMENTS 10,057,574 B2 8/2018 Li et al.
10,506,230 B2 12/2019 Zhang et al.
(Continued)

FOREIGN PATENT DOCUMENTS

CN 101207812 A 6/2008
CN 103503456 A 1/2014
(Continued)

OTHER PUBLICATIONS

Bross et al. "Versatile Video Coding (Draft 5)," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N1001, 2019.
(Continued)

*Primary Examiner* — Dominic D Saltarelli
(74) *Attorney, Agent, or Firm* — Perkins Coie LLP

(57) ABSTRACT

A method of video processing includes determining a classification of samples of a block in a video picture of a video according to a rule, wherein the video picture is divided into multiple regions, and wherein the rule disallows use of neighboring samples of a current sample across one or more boundaries of the multiple regions for the classification. The one or more boundaries of the multiple regions comprises a virtual boundary for an adaptive loop filtering (ALF) process. The method also includes performing a conversion between the block and a bitstream representation of the video by selectively applying the ALF process according to the classification.

20 Claims, 32 Drawing Sheets

(51) Int. Cl.
*H04N 19/14* (2014.01)
*H04N 19/132* (2014.01)
*H04N 19/82* (2014.01)
*H04N 19/96* (2014.01)

(52) U.S. Cl.
CPC ........... *H04N 19/176* (2014.11); *H04N 19/82* (2014.11); *H04N 19/96* (2014.11)

(58) Field of Classification Search
USPC ......................................................... 375/236
See application file for complete search history.

(56) References Cited

U.S. PATENT DOCUMENTS

| | | | |
|---|---|---|---|
| 10,721,469 B2 | 7/2020 | Zhang et al. | |
| 10,778,974 B2 | 9/2020 | Karczewicz et al. | |
| 10,855,985 B2 | 12/2020 | Zhang et al. | |
| 11,190,765 B2* | 11/2021 | Bordes | H04N 19/172 |
| 11,277,635 B2* | 3/2022 | Xiu | H04N 19/563 |
| 11,284,116 B2* | 3/2022 | Gisquet | H04N 19/182 |
| 2004/0252759 A1 | 12/2004 | John Winder et al. | |
| 2010/0202262 A1 | 8/2010 | Adams et al. | |
| 2011/0274158 A1 | 11/2011 | Fu et al. | |
| 2012/0082244 A1 | 4/2012 | Chen et al. | |
| 2013/0044809 A1 | 2/2013 | Chong et al. | |
| 2013/0094569 A1 | 4/2013 | Chong et al. | |
| 2013/0107973 A1 | 5/2013 | Wang et al. | |
| 2013/0128986 A1 | 5/2013 | Tsai et al. | |
| 2013/0272624 A1 | 10/2013 | Budagavi | |
| 2014/0153844 A1 | 6/2014 | Jeon et al. | |
| 2015/0016543 A1 | 1/2015 | Rapaka et al. | |
| 2015/0172724 A1 | 6/2015 | Minezawa et al. | |
| 2017/0085917 A1 | 3/2017 | Hannuksela | |
| 2017/0195670 A1 | 7/2017 | Budagavi | |
| 2017/0238020 A1 | 8/2017 | Karczewicz et al. | |
| 2017/0332075 A1 | 11/2017 | Karczewicz et al. | |
| 2017/0374385 A1 | 12/2017 | Huang et al. | |
| 2018/0041778 A1 | 2/2018 | Zhang et al. | |
| 2018/0041779 A1 | 2/2018 | Zhang et al. | |
| 2018/0054613 A1 | 2/2018 | Lin et al. | |
| 2019/0141321 A1 | 5/2019 | Yin et al. | |
| 2019/0238845 A1 | 8/2019 | Zhang et al. | |
| 2019/0281273 A1 | 9/2019 | Lin et al. | |
| 2019/0306502 A1 | 10/2019 | Gadde et al. | |
| 2020/0074687 A1 | 3/2020 | Lin et al. | |
| 2020/0204801 A1 | 6/2020 | Hu et al. | |
| 2020/0267381 A1 | 8/2020 | Vanam et al. | |
| 2020/0329239 A1 | 10/2020 | Hsiao et al. | |
| 2020/0413038 A1 | 10/2020 | Zhang et al. | |
| 2021/0281838 A1* | 9/2021 | Lee | H04N 19/593 |
| 2021/0314628 A1 | 10/2021 | Zhang et al. | |
| 2021/0314630 A1* | 10/2021 | Misra | H04N 19/70 |
| 2021/0321095 A1 | 10/2021 | Zhang et al. | |
| 2021/0321121 A1 | 10/2021 | Zhang et al. | |
| 2021/0360238 A1 | 11/2021 | Chen et al. | |
| 2021/0368171 A1 | 11/2021 | Zhang et al. | |
| 2021/0377524 A1 | 12/2021 | Zhang et al. | |
| 2021/0385446 A1 | 12/2021 | Liu et al. | |
| 2021/0392381 A1 | 12/2021 | Wang et al. | |
| 2021/0400267 A1 | 12/2021 | Kotra et al. | |
| 2021/0409699 A1* | 12/2021 | Andersson | H04N 19/167 |

FOREIGN PATENT DOCUMENTS

| | | |
|---|---|---|
| CN | 103891292 A | 6/2014 |
| CN | 104813661 A | 7/2015 |
| CN | 105847843 A | 8/2016 |
| CN | 106878729 A | 6/2017 |
| CN | 108111851 A | 6/2018 |
| CN | 108605143 A | 9/2018 |
| CN | 109479130 A | 3/2019 |
| CN | 109600611 A | 4/2019 |
| CN | 109660797 A | 4/2019 |
| CN | 109996069 A | 7/2019 |
| EP | 3057320 A1 | 8/2016 |
| EP | 3496399 A1 | 6/2019 |
| WO | 2015070772 A1 | 5/2015 |
| WO | 2018119429 A1 | 6/2018 |
| WO | 2018182377 A1 | 10/2018 |
| WO | 2019131400 A1 | 7/2019 |

OTHER PUBLICATIONS

Bross et al. "Versatile Video Coding (Draft 6)," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O2001, 2019.

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.

Chen et al. "Adaptive Loop Filter with Virtual Boundary Processing," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0164, 2019.

Chen et al. "Description of Core Experiment 5 (CE5): Adaptive Loop Filter," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M1025, 2019.

Chen et al. "CE5-1: Adaptive Loop Filter with Virtual Boundary Processing," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0088, 2019.

Helmrich et al. "CE11-Related: Very Strong Deblocking Filtering with Conditional Activation Signaling," Joint Video Experts Team (JVET) of ITU-T SG 16 WP 3 and ISO/IEC JTC 1/SC 29/WG 11 12th Meeting: Macao, CN, Oct. 3-12, 2018, document JVET-L0523, 2018.

Heng et al. "Non-CE8: Comments on Current Picture Referencing," Joint Video Experts Team (JVET0 of ITU-SG 16 WP 3 and ISO/IEC JTC 1/SC 29/WG 11 13th Meeting: Marrakech, MA Jan. 9-18, 2019, document JVET-M0402, 2019.

Hu et al. "CE5-Related: Unification of Picture Boundary and Line Buffer Handling for ALF," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0416, 2019.

"Information Technology—High Efficiency Coding and Media Delivery in Heterogeneous Environments—Part 2: High Efficiency Video Coding" Apr. 20, 2018, ISO/DIS 23008, 4th Edition.

Karczewicz et al. "Geometry Transformation-based Adaptive In-Loop Filter, "IEEE, Qualcomm Technologies, Inc., San Diego, CA, 2016.

Kotra et al. "CE5-2: Loop filter Line Buffer Reduction," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0180, 2019.

Lim et al. "CE2: Subsampled Laplacian Calculation (Test 6.1, 6.2, 6.3, and 6.4)," Joint Video Experts Team (JVET) of ITU-T SG 16 WP 3 and ISO/IEC JTC 1/SC 29/WG 11, 12th Meeting: Macao, CN, Oct. 3-12, 2018, document JVET-L0147, 2018.

Liu et al. "Non-CE5: Padding Method for Samples at Variant Boundaries in ALF," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O0625, 2019.

Liu et al. "Non-CE5: Fixes of ALF Sample Padding," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P0492, 2019.

Park et al. "CE4: Results on Reference Picture Boundary Padding in J0025," Joint Video Experts Team (JVET) of ITU-T SG 16 WP 3 and ISO/IEC JTC 1/SC 29/WG 11 11th Meeting: Ljubljana, SI, Jul. 10-18, 2018, document JVET-K0117, 2018.

Sauer et al. "Geometry Padding for Cube Based 360 Degree Video Using Uncoded Areas," Joint Video Experts Team (JVET) of ITU-T

(56) References Cited

OTHER PUBLICATIONS

SG 16 WP 3 and ISO/IEC JTC 1/SC 29/WG 11 15th Meeting: Gothenburg, SE, Jul. 3-12, 2019, document JVET-O0487, 2019.
Taquet et al. "CE5: Results of Tests CE5-3.1 to CE5-3.4 on Non-Linear Adaptive Loop Filter." Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0242, 2019.
Tsai et al. "AHG6: ALF with Modified Padding Process," Joint Collaborative Team on Video Coding (JCT-VC) of ITU-T SG 16 WP 3 and ISO/IEC JTC 1/SC 29/WG 11, 10th Meeting, Stockholm, SE, Jul. 11-20, 2012, document JCTVC-J0050, 2012.
Wang et al. "AHG12: Harmonized Proposal for Sub-Picture-Based Coding for VVC," oint Video Experts Team (JVET) of ITU-T SG 16 WP 3 and ISO/IEC JTC 1/SC 29/WG 11 14th Meeting: Geneva, CH, Mar. 19-27, 2019 document JVET-N0826, 2019.
Wang et al. "AHG12: Sub-Picture Based Motion-Constrained Independent Regions," Joint Video Experts Team (JVET) of ITU-T SG 16 WP 3 and ISO/IEC JTC 1/SC 29/WG 11 15th Meeting: Gothernburg, SE, Jul. 3-12, 2019, document JVET-O0141, 2019.
https://vcgit.hhi.fraunhofer.de/jvet/VVCSoftware_VTM/tags/VTM-5.0.
International Search Report and Written Opinion from International Patent Application No. PCT/CN2020/096044 dated Sep. 17, 2020 (9 pages).
International Search Report and Written Opinion from International Patent Application No. PCT/CN2020/096045 dated Sep. 24, 2020 (13 pages).
International Search Report and Written Opinion from International Patent Application No. PCT/CN2020/100962 dated Oct. 12, 2020 (10 pages).
International Search Report and Written Opinion from International Patent Application No. PCT/CN2020/101589 dated Oct. 14, 2020 (12 pages).
International Search Report and Written Opinion from International Patent Application No. PCT/CN2020/102003 dated Oct. 19, 2020 (9 pages).
International Search Report and Written Opinion from International Patent Application No. PCT/CN2020/102040 dated Oct. 19, 2020 (10 pages).
International Search Report and Written Opinion from International Patent Application No. PCT/CN2020/116707 dated Dec. 21, 2020 (9 pages).
International Search Report and Written Opinion from International Patent Application No. PCT/CN2020/116708 dated Dec. 10, 2020 (11 pages).
International Search Report and Written Opinion from International Patent Application No. PCT/CN2020/118029 dated Dec. 30, 2020 (10 pages).
International Search Report and Written Opinion from International Patent Application No. PCT/CN2020/120063 dated Jan. 4, 2021 (9 pages).
Non Final Office Action from U.S. Appl. No. 17/548,134 dated Mar. 3, 2022.
Non Final Office Action from U.S. Appl. No. 17/548,187 dated Mar. 2, 2022.
English translation of CN109600611A.

* cited by examiner

SAMPLE DETERMINATION FOR ADAPTIVE LOOP FILTERING

CROSS REFERENCE TO RELATED APPLICATIONS

This application is a continuation of International Patent Application No. PCT/CN2020/100962, filed on Jul. 9, 2020, which claims the priority to and benefits of International Patent Application No. PCT/CN2019/095330, filed on Jul. 9, 2019. All the aforementioned patent applications are hereby incorporated by reference in their entireties.

TECHNICAL FIELD

This patent document is directed generally to video coding and decoding technologies.

BACKGROUND

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/High Efficiency Video Coding (HEVC) standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the JVET between VCEG (Q6/16) and ISO/IEC JTC1 SC29/WG11 (MPEG) was created to work on the next generation Versatile Video Coding (VVC) standard targeting at 50% bitrate reduction compared to HEVC.

SUMMARY

Using the disclosed video coding, transcoding or decoding techniques, embodiments of video encoders or decoders can handle virtual boundaries of coding tree blocks to provide better compression efficiency and simpler implementations of coding or decoding tools.

In one example aspect, a method of video processing is disclosed. The method includes determining a classification of samples of a block in a video picture of a video according to a rule. The video picture is divided into multiple regions. The rule disallows use of neighboring samples of a current sample across one or more boundaries of the multiple regions for the classification. The one or more boundaries of the multiple regions comprise a virtual boundary for an adaptive loop filtering (ALF) process. The method also includes performing a conversion between the block and a bitstream representation of the video by selectively applying an adaptive loop filter according to the classification.

In another example aspect, a method of video processing is disclosed. The method includes performing a conversion between video blocks of a video picture and a bitstream representation thereof. Here, the video blocks are processed using logical groupings of coding tree blocks and the coding tree blocks are processed based on whether a bottom boundary of a bottom coding tree block is outside a bottom boundary of the video picture.

In another example aspect, another video processing method is disclosed. The method includes determining, based on a condition of a coding tree block of a current video block, a usage status of virtual samples during an in-loop filtering and performing a conversion between the video block and a bitstream representation of the video block consistent with the usage status of virtual samples.

In yet another example aspect, another video processing method is disclosed. The method includes determining, during a conversion between a video picture that is logically grouped into one or more video slices or video bricks, and a bitstream representation of the video picture, to disable a use of samples in another slice or brick in the adaptive loop filter process and performing the conversion consistent with the determining.

In yet another example aspect, another video processing method is disclosed. The method includes determining, during a conversion between a current video block of a video picture and a bitstream representation of the current video block, that the current video block includes samples located at a boundary of a video unit of the video picture and performing the conversion based on the determining, wherein the performing the conversion includes generating virtual samples for an in-loop filtering process using a unified method that is same for all boundary types in the video picture.

In yet another example aspect, another method of video processing is disclosed. The method includes determining to apply, during a conversion between a current video block of a video picture and a bitstream representation thereof, one of multiple adaptive loop filter (ALF) sample selection methods available for the video picture during the conversion and performing the conversion by applying the one of multiple ALF sample selection methods.

In yet another example aspect, another method of video processing is disclosed. The method includes performing, based on a boundary rule, an in-loop filtering operation over samples of a current video block of a video picture during a conversion between the current video block and a bitstream representation of a current video block; wherein the boundary rule disables using samples that cross a virtual pipeline data unit (VPDU) of the video picture and performing the conversion using a result of the in-loop filtering operation.

In yet another example aspect, another method of video processing is disclosed. The method includes performing, based on a boundary rule, an in-loop filtering operation over samples of a current video block of a video picture during a conversion between the current video block and a bitstream representation of a current video block; wherein the boundary rule specifies to use, for locations of the current video block across a video unit boundary, samples that are generated without using padding and performing the conversion using a result of the in-loop filtering operation.

In yet another example aspect, another method of video processing is disclosed. The method includes performing, based on a boundary rule, an in-loop filtering operation over samples of a current video block of a video picture during a conversion between the current video block and a bitstream representation of a current video block; wherein the boundary rule specifies selecting, for the in-loop filtering operation, a filter having dimensions such that samples of current video block used during the in-loop filtering do not cross a boundary of a video unit of the video picture and performing the conversion using a result of the in-loop filtering operation.

In yet another example aspect, another method of video processing is disclosed. The method includes performing, based on a boundary rule, an in-loop filtering operation over samples of a current video block of a video picture during a conversion between the current video block and a bitstream representation of a current video block; wherein the boundary rule specifies selecting, for the in-loop filtering operation, clipping parameters or filter coefficients based on whether or not padded samples are needed for the in-loop filtering and performing the conversion using a result of the in-loop filtering operation.

In yet another example aspect, another method of video processing is disclosed. The method includes performing, based on a boundary rule, an in-loop filtering operation over samples of a current video block of a video picture during a conversion between the current video block and a bitstream representation of a current video block; wherein the boundary rule depends on a color component identity of the current video block and performing the conversion using a result of the in-loop filtering operation.

In yet another example aspect, a video encoding apparatus configured to perform an above-described method is disclosed.

In yet another example aspect, a video decoder that is configured to perform an above-described method is disclosed.

In yet another example aspect, a machine-readable medium is disclosed. The medium stores code which, upon execution, causes a processor to implement one or more of the above-described methods.

The above and other aspects and features of the disclosed technology are described in greater detail in the drawings, the description and the claims.

BRIEF DESCRIPTION OF THE DRAWINGS

FIG. 7 shows examples of pixels involved in filter on/off decision and strong/weak filter selection.

FIG. 12A shows an example arrangement for sub sampled Laplacian calculations.

FIG. 12B shows another example arrangement for sub sampled Laplacian calculations.

FIG. 12C shows another example arrangement for sub sampled Laplacian calculations.

FIG. 12D shows yet another example arrangement for sub sampled Laplacian calculations.

DETAILED DESCRIPTION

Figure 1:
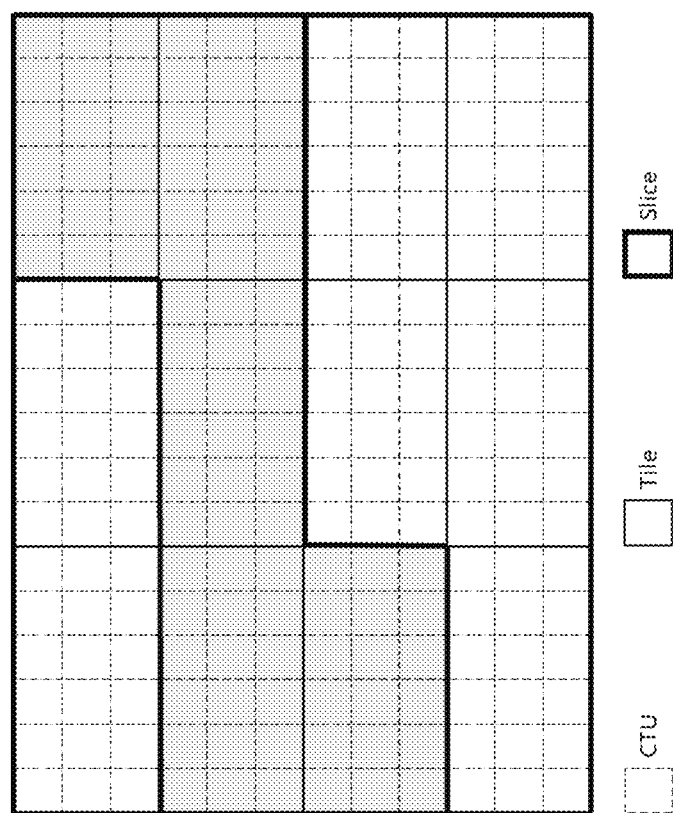
FIG. 1 shows an example of a picture with 18 by 12 luma coding tree units CTUs that is partitioned into 12 tiles and 3 raster-scan slices.

Section headings are used in the present document to facilitate ease of understanding and do not limit the embodiments disclosed in a section to only that section. Furthermore, while certain embodiments are described with reference to Versatile Video Coding or other specific video codecs, the disclosed techniques are applicable to other video coding technologies also. Furthermore, while some embodiments describe video coding steps in detail, it will be understood that corresponding steps decoding that undo the coding will be implemented by a decoder. Furthermore, the term video processing encompasses video coding or compression, video decoding or decompression and video transcoding in which video pixels are represented from one compressed format into another compressed format or at a different compressed bitrate.

1. Brief Summary

This document is related to video coding technologies. Specifically, it is related to picture/slice/tile/brick boundary and virtual boundary coding especially for the non-linear adaptive loop filter. It may be applied to the existing video coding standard like HEVC, or the standard (Versatile Video Coding) to be finalized. It may be also applicable to future video coding standards or video codec.

2. Initial Discussion

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the JVET between VCEG (Q6/16) and ISO/IEC JTC1 SC29/WG11 (MPEG) was created to work on the VVC standard targeting at 50% bitrate reduction compared to HEVC.

2.1 Color Space and Chroma Subsampling

Color space, also known as the color model (or color system), is an abstract mathematical model which simply describes the range of colors as tuples of numbers, typically as 3 or 4 values or color components (e.g. RGB). Basically speaking, color space is an elaboration of the coordinate system and sub-space.

For video compression, the most frequently used color spaces are YCbCr and RGB.

YCbCr, Y'CbCr, or Y Pb/Cb Pr/Cr, also written as YCBCR or Y'CBCR, is a family of color spaces used as a part of the color image pipeline in video and digital photography systems. Y' is the luma component and CB and CR are the blue-difference and red-difference chroma components. Y' (with prime) is distinguished from Y, which is luminance, meaning that light intensity is nonlinearly encoded based on gamma corrected RGB primaries.

Chroma subsampling is the practice of encoding images by implementing less resolution for chroma information than for luma information, taking advantage of the human visual system's lower acuity for color differences than for luminance.

2.1.1 Color Format 4:4:4

Each of the three Y'CbCr components have the same sample rate, thus there is no chroma sub sampling. This scheme is sometimes used in high-end film scanners and cinematic post production.

2.1.2 Color Format 4:2:2

The two chroma components are sampled at half the sample rate of luma: the horizontal chroma resolution is halved. This reduces the bandwidth of an uncompressed video signal by one-third with little to no visual difference

2.1.3 Color Format 4:2:0

In 4:2:0, the horizontal sampling is doubled compared to 4:1:1, but as the Cb and Cr channels are only sampled on each alternate line in this scheme, the vertical resolution is halved. The data rate is thus the same. Cb and Cr are each sub sampled at a factor of 2 both horizontally and vertically. There are three variants of 4:2:0 schemes, having different horizontal and vertical siting.

In MPEG-2, Cb and Cr are cosited horizontally. Cb and Cr are sited between pixels in the vertical direction (sited interstitially).

In JPEG/JFIF, H.261, and MPEG-1, Cb and Cr are sited interstitially, halfway between alternate luma samples.

In 4:2:0 DV, Cb and Cr are co-sited in the horizontal direction. In the vertical direction, they are co-sited on alternating lines.

2.2 Various Video Units

A picture is divided into one or more tile rows and one or more tile columns. A tile is a sequence of CTUs that covers a rectangular region of a picture.

A tile is divided into one or more bricks, each of which consisting of a number of CTU rows within the tile.

A tile that is not partitioned into multiple bricks is also referred to as a brick. However, a brick that is a true subset of a tile is not referred to as a tile.

A slice either contains a number of tiles of a picture or a number of bricks of a tile.

Two modes of slices are supported, namely the raster-scan slice mode and the rectangular slice mode. In the raster-scan slice mode, a slice contains a sequence of tiles in a tile raster scan of a picture. In the rectangular slice mode, a slice contains a number of bricks of a picture that collectively form a rectangular region of the picture. The bricks within a rectangular slice are in the order of brick raster scan of the slice.

FIG. 1 shows an example of raster-scan slice partitioning of a picture, where the picture is divided into 12 tiles and 3 raster-scan slices.

Figure 2:
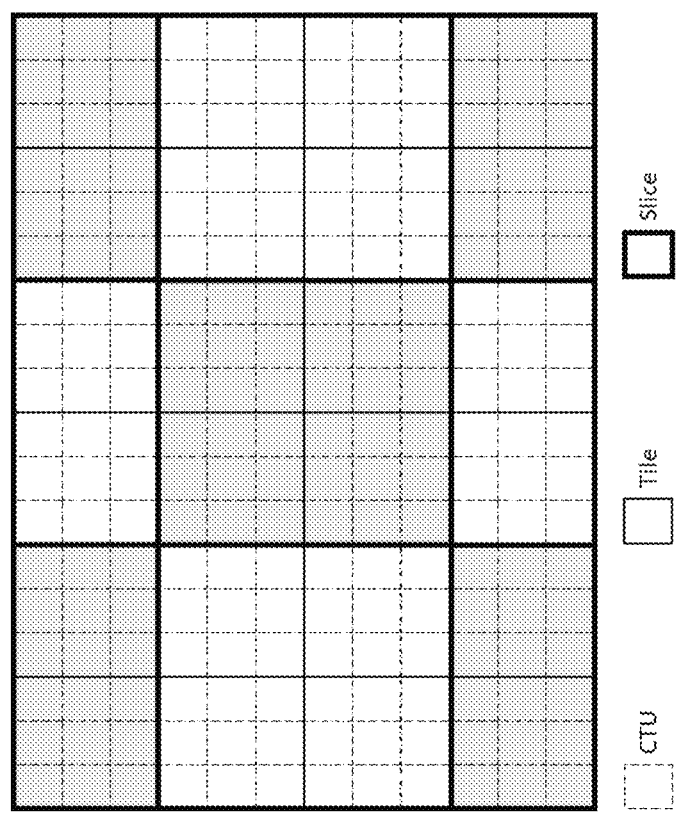
FIG. 2 shows an example of a picture with 18 by 12 luma CTUs that is partitioned into 24 tiles and 9 rectangular slices.

FIG. 2 shows an example of rectangular slice partitioning of a picture, where the picture is divided into 24 tiles (6 tile columns and 4 tile rows) and 9 rectangular slices.

Figure 3:
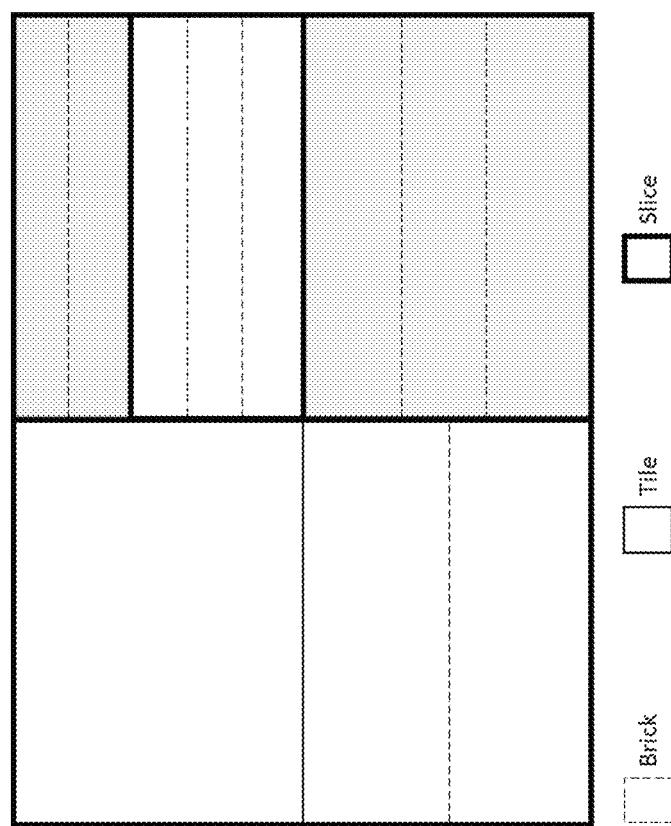
FIG. 3 shows an example of a picture that is partitioned into 4 tiles, 11 bricks, and 4 rectangular slices.

FIG. 3 shows an example of a picture partitioned into tiles, bricks, and rectangular slices, where the picture is divided into 4 tiles (2 tile columns and 2 tile rows), 11 bricks (the top-left tile contains 1 brick, the top-right tile contains 5 bricks, the bottom-left tile contains 2 bricks, and the bottom-right tile contain 3 bricks), and 4 rectangular slices.

2.2.1 CTU/CTB Sizes

In VVC, the CTU size, signaled in SPS by the syntax element log2_ctu_size_minus2, could be as small as 4×4.

| 7.3.2.3Sequence parameter set RBSP syntax | |
|---|---|
| seq_parameter_set_rbsp( ) { | Descriptor |
|     sps_decoding_parameter_set_id | u(4) |
|     sps_video_parameter_set_id | u(4) |
|     sps_max_sub_layers_minus1 | u(3) |
|     sps_reserved_zero_5bits | u(5) |
|     profile_tier_level( sps_max_sub_layers_minus1 ) | |
|     gra_enabled_flag | u(1) |
|     sps_seq_parameter_set_id | ue(v) |
|     chroma_format_idc | ue(v) |
|     if( chroma_format_idc == 3 ) | |

7.3.2.3 Sequence parameter set RBSP syntax

| seq_parameter_set_rbsp( ) { | Descriptor |
|---|---|
|     separate_colour_plane_flag | u(1) |
|     pic_width_in_luma_samples | ue(v) |
|     pic_height_in_luma_samples | ue(v) |
|     conformance_window_flag | u(1) |
|     if( conformance_window_flag) { | |
|       conf_win_left_offset | ue(v) |
|       conf_win_right_offset | ue(v) |
|       conf_win_top_offset | ue(v) |
|       conf_win_bottom_offset | ue(v) |
|     } | |
|     bit_depth_luma_minus8 | ue(v) |
|     bit_depth_chroma_minus8 | ue(v) |
|     log2_max_pic_order_cnt_lsb_minus4 | ue(v) |
|     sps_sub_layer_ordering_info_present_flag | u(1) |
|     for( i = ( sps_sub_layer_ordering_info_present_flag ? 0 : sps_max_sub_layers_minus1 ); | |
|         i <= sps_max_sub_layers_minus1 ; i++ ) { | |
|       sps_max_dec_pic_buffering_minus1[i] | ue(v) |
|       sps_max_num_reorder_pics[i] | ue(v) |
|       sps_max_latency_increase_plus1[i] | ue(v) |
|     } | |
|     long_term_ref_pics_flag | u(1) |
|     sps_idr_rpl_present_flag | u(1) |
|     rpl1_same_as_rpl0_flag | u(1) |
|     for( i = 0; i < !rpl1_same_as_rpl0_flag ? 2 : 1;i++ ) { | |
|       num_ref_pic_lists_in_sps[i] | ue(v) |
|       for(j = 0;j < num_ref_pic_lists_in_sps[ i]; j++) | |
|         ref_pic_list_struct(i, j ) | |
|     } | |
|     qtbtt_dual_tree_intra_flag | u(1) |
|     log2_ctu_size_minus2 | ue(v) |
|     log2_min_luma_coding_block_size_minus2 | ue(v) |
|     partition_constraints_override_enabled_flag | u(1) |
|     sps_log2_diff_min_qt_min_cb_intra_slice_luma | ue(v) |
|     sps_log2_diff_min_qt_min_cb_inter_slice | ue(v) |
|     sps_max_mtt_hierarchy_depth_inter_slice | ue(v) |
|     sps_max_mtt_hierarchy_depth_intra_slice_luma | ue(v) |
|     if( sps_max_mtt_hierarchy_depth_intra_slice_luma!- 0 ) { | |
|       sps_log2_diff_max_bt_min_qt_intra_slice_luma | ue(v) |
|       sps_log2_diff_max_tt_min_qt_intra_slice_luma | ue(v) |
|     } | |
|     if( sps_max_mtt_hierarchy_depth_inter_slices != 0 ) { | |
|       sps_log2_diff_max_bt_min_qt_inter_slice | ue(v) |
|       sps_log2_diff_max_tt_min_qt_inter_slice | ue(v) |
|     } | |
|     if( qtbtt_dual_tree_intra_flag ) { | |
|       sps_log2_diff_min_qt_min_cb_intra_slice_chroma | ue(v) |
|       sps_max_mtt_hierarchy_depth_intra_slice_chroma | ue(v) |
|       if ( sps_max_mtt_hierarchy_depth_intra_slice_chroma != 0 ) { | |
|         sps_log2_diff_max_bt_min_qt_intra_slice_chroma | ue(v) |
|         sps_log2_diff_max_tt_min_qt_intra_slice_chroma | ue(v) |
|       } | |
|     } | |
| ... | |
|     rbsp_trailing_bits( ) | |
| } | | log2_ctu_size_minus2 plus 2 specifies the luma coding tree block size of each CTU.

log2_min_luma_coding_block_size_minus2 plus 2 specifies the minimum luma coding block size.

The variables CtbLog2SizeY, CtbSizeY, MinCbLog2SizeY, MinCbSizeY, Min TbLog2 SizeY, MaxTbLog2SizeY, MinTbSizeY, MaxTbSizeY, PicWidthInCtbsY, PicHeightInCtbsY, PicSizeInCtbsY, PicWidthInMinCbsY, PicHeightInMinCbsY, PicSizeInMinCbsY, PicSizeInSamplesY, PicWidthInSamplesC and PicHeightInSamplesC are derived as follows:

$$Ctb\ Log2SizeY = log2\_ctu\_size\_minus2 + 2 \quad (7\text{-}9)$$

$$CtbSizeY = 1 \ll Ctb\ Log2SizeY \quad (7\text{-}10)$$

$$MinCbLog2SizeY = log2min\_luma\_coding\_block\_size\_minus2 + 2\text{-}11)$$

$$MinCbSizeY = 1 \ll MinCbLog2SizeY \quad (7\text{-}12)$$

$$MinTbLog2SizeY = 2 \quad (7\text{-}13)$$

$$MaxTbLog2SizeY = 6 \quad (7\text{-}14)$$

$$MinTbSizeY = 1 \ll MinTbLog2SizeY \quad (7\text{-}15)$$

$$MaxTbSizeY = 1 \ll MaxTbLog2SizeY \quad (7\text{-}16)$$

$$PicWidthInCtbsY = Ceil(pic\_width\_in\_luma\_samples \div CtbSizeY) \quad (7\text{-}17)$$

$$PicHeightInCtbsY = Ceil(pic\_height\_in\_luma\_samples \div CtbSizeY) \quad (7\text{-}18)$$

PicSizeInCtbsY=PicWidthInCtbsY*PicHeightInCtbsY   (7-19)

PicWidthInMinCbsY=pic_width_in_luma_samples/
    MinCbSizeY   (7-20)

PicHeightInMinCbsY=pic_height_in_luma_samples/
    MinCbSizeY   (7-21)

PicSizeInMinCbsY=PicWidthInMinCbsY*
    PicHeightInMinCbsY   (7-22)

PicSizeInSamplesY=pic_width_in_luma_
    samples*pic_height_in_luma_samples   (7-23)

PicWidthInSamplesC=pic_width_in_luma_samples/
    SubWidthC   (7-24)

PicHeightInSamplesC=pic_height_in_luma_samples/
    SubHeightC   (7-25)

2.2.2 CTUs in a Picture

Suppose the CTB/LCU size indicated by M×N (typically M is equal to N, as defined in HEVC/VVC), and for a CTB located at picture (or tile or slice or other kinds of types, picture border is taken as an example) border, K×L samples are within picture border wherein either K<M or L<N. For those CTBs as depicted in FIG. 4A-4C, the CTB size is still equal to M×N, however, the bottom boundary/right boundary of the CTB is outside the picture.

Figure 4A:
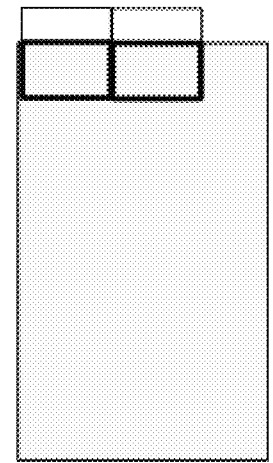
FIG. 4A shows an example of coding tree blocks CTBs crossing picture borders when K=M, L<N.
Figure 4C:
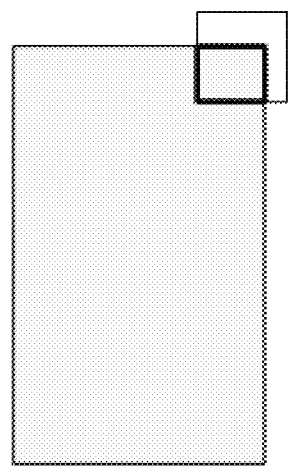
FIG. 4C shows an example of coding tree blocks CTBs crossing picture borders when K<M, L<N.
Figure 4B:
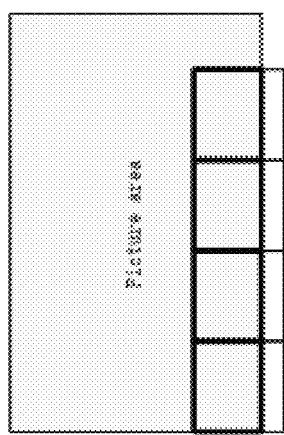
FIG. 4B shows an example of coding tree blocks CTBs crossing picture borders when K<M, L=N.
Figure 5:
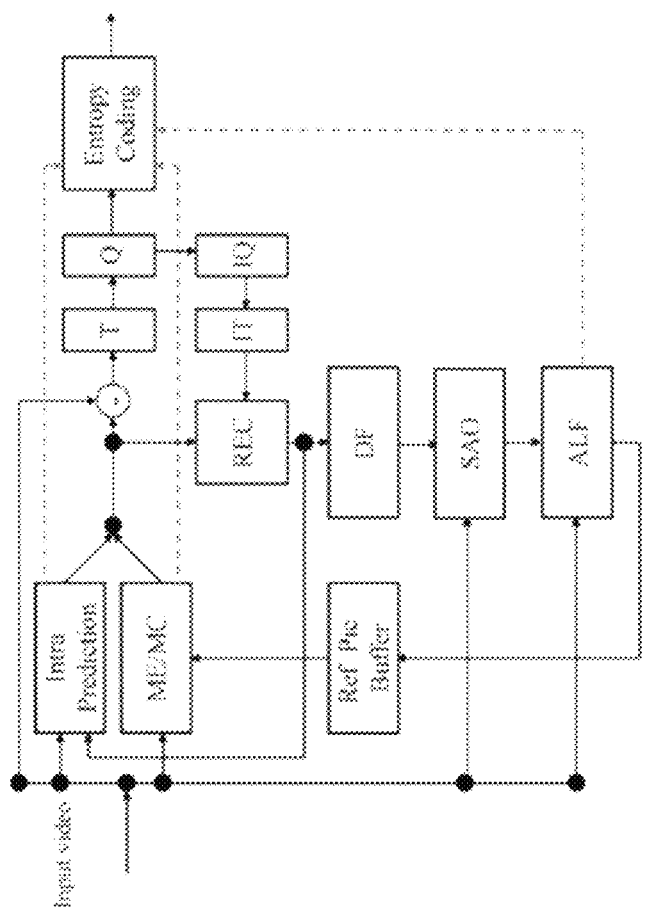
FIG. 5 shows an example of encoder block diagram.

FIG. 4A shows CTBs crossing the bottom picture border. FIG. 4B shows CTBs crossing the right picture border. FIG. 4C shows CTBs crossing the right bottom picture border FIGS. 4A-4C show examples of CTBs crossing picture borders, (a) K=M, L<N; (b) K<M, L=N; (c) K<M, L<N 2.3 Coding Flow of a Typical Video Codec FIG. 5 shows an example of encoder block diagram of VVC, which contains three in-loop filtering blocks: deblocking filter (DF), sample adaptive offset (SAO) and ALF. Unlike DF, which uses predefined filters, SAO and ALF utilize the original samples of the current picture to reduce the mean square errors between the original samples and the reconstructed samples by adding an offset and by applying a finite impulse response (FIR) filter, respectively, with coded side information signaling the offsets and filter coefficients. ALF is located at the last processing stage of each picture and can be regarded as a tool trying to catch and fix artifacts created by the previous stages.

2.4 Deblocking Filter (DB)

The input of DB is the reconstructed samples before in-loop filters.

The vertical edges in a picture are filtered first. Then the horizontal edges in a picture are filtered with samples modified by the vertical edge filtering process as input. The vertical and horizontal edges in the CTBs of each CTU are processed separately on a coding unit basis. The vertical edges of the coding blocks in a coding unit are filtered starting with the edge on the left-hand side of the coding blocks proceeding through the edges towards the right-hand side of the coding blocks in their geometrical order. The horizontal edges of the coding blocks in a coding unit are filtered starting with the edge on the top of the coding blocks proceeding through the edges towards the bottom of the coding blocks in their geometrical order.

Figure 6:
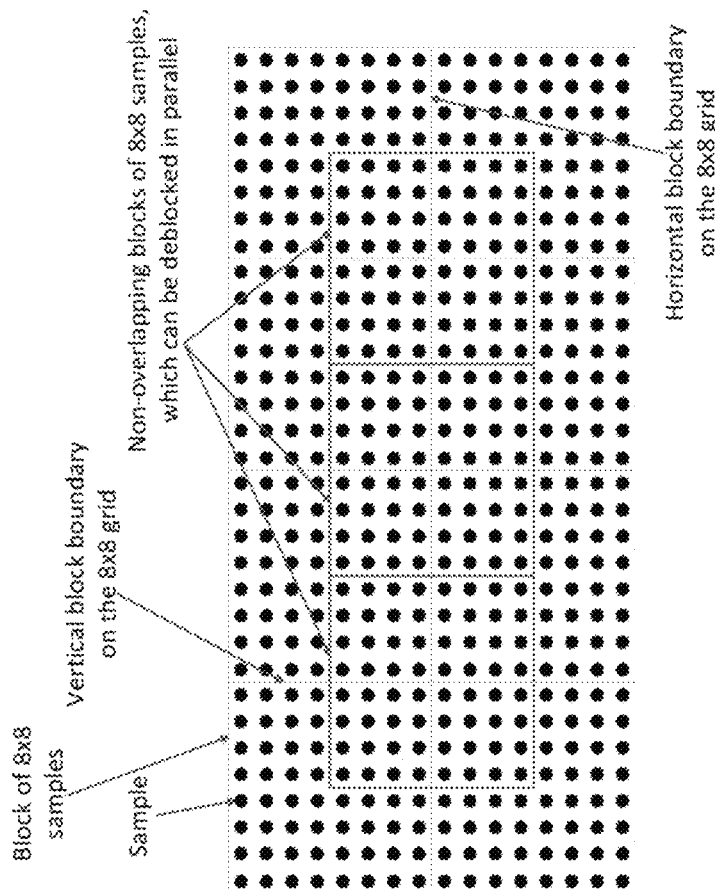
FIG. 6 is an illustration of picture samples and horizontal and vertical block boundaries on the 8×8 grid, and the nonoverlapping blocks of the 8×8 samples, which can be deblocked in parallel.

FIG. 6 is an illustration of picture samples and horizontal and vertical block boundaries on the 8×8 grid, and the nonoverlapping blocks of the 8×8 samples, which can be deblocked in parallel.

2.4.1. Boundary Decision

Filtering is applied to 8×8 block boundaries. In addition, it must be a transform block boundary or a coding subblock boundary (e.g., due to usage of Affine motion prediction, ATMVP). For those which are not such boundaries, filter is disabled.

2.4.1 Boundary Strength Calculation

For a transform block boundary/coding subblock boundary, if it is located in the 8×8 grid, it may be filtered and the setting of bS[xD$_i$][yD$_j$] (wherein [xD$_i$][yD$_j$] denotes the coordinate) for this edge is defined in Table 1 and Table 2, respectively.

TABLE 1

Boundary strength (when SPS IBC is disabled)

| Priority | Conditions | Y | U | V |
|---|---|---|---|---|
| 5 | At least one of the adjacent blocks is intra | 2 | 2 | 2 |
| 4 | TU boundary and at least one of the adjacent blocks has non-zero transform coefficients | 1 | 1 | 1 |
| 3 | Reference pictures or number of MVs (1 for uni-prediction, 2 for bi-prediction) of the adjacent blocks are different | 1 | N/A | N/A |
| 2 | Absolute difference between the motion vectors of same reference picture that belong to the adjacent blocks is greater than or equal to one integer luma sample | 1 | N/A | N/A |
| 1 | Otherwise | 0 | 0 | 0 |

TABLE 2

Boundary strength (when SPS IBC is enabled)

| Priority | Conditions | Y | U | V |
|---|---|---|---|---|
| 8 | At least one of the adjacent blocks is intra | 2 | 2 | 2 |
| 7 | TU boundary and at least one of the adjacent blocks has non-zero transform coefficients | 1 | 1 | 1 |
| 6 | Prediction mode of adjacent blocks is different (e.g., one is IBC, one is inter) | 1 | | |
| 5 | Both IBC and absolute difference between the motion vectors that belong to the adjacent blocks is greater than or equal to one integer luma sample | 1 | N/A | N/A |
| 4 | Reference pictures or number of MVs (1 for uni-prediction, 2 for bi-prediction) of the adjacent blocks are different | 1 | N/A | N/A |
| 3 | Absolute difference between the motion vectors of same reference picture that belong to the adjacent blocks is greater than or equal to one integer luma sample | 1 | N/A | N/A |
| 1 | Otherwise | 0 | 0 | 0 |

2.4.3 Deblocking Decision for Luma Component

The deblocking decision process is described in this sub-section.

Figure 7:
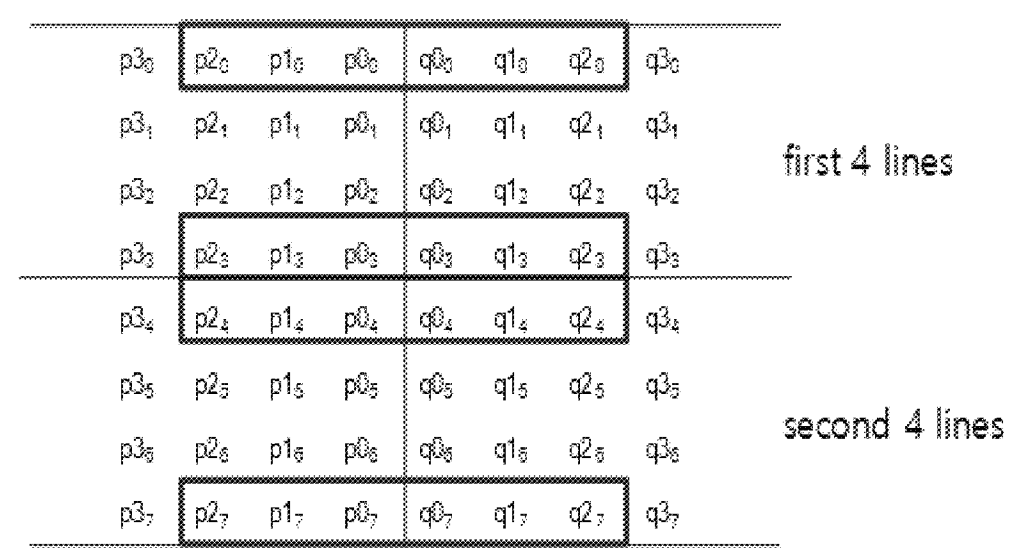

FIG. 7 shows examples of pixels involved in filter on/off decision and strong/weak filter selection.

Wider-stronger luma filter is filters are used only if all the Condition 1, Condition2 and Condition 3 are TRUE.

The condition 1 is the "large block condition". This condition detects whether the samples at P-side and Q-side belong to large blocks, which are represented by the variable bSidePisLargeBlk and bSideQisLargeBlk respectively. The bSidePisLargeBlk and bSideQisLargeBlk are defined as follows.

bSidePisLargeBlk=((edge type is vertical and $p_0$
    belongs to CU with width >=32)||(edge type
    is horizontal and $p_0$ belongs to CU with
    height >=32))? TRUE: FALSE bSideQisLargeBlk=((edge type is vertical and $q_0$ belongs to $CU$ with width >=32)||(edge type is horizontal and $q_0$ belongs to $CU$ with height >=32))? TRUE: FALSE Based on bSidePisLargeBlk and bSideQisLargeBlk, the condition 1 is defined as follows.

Condition1=(bSidePisLargeBlk||bSidePisLargeBlk)? TRUE: FALSE

Next, if Condition 1 is true, the condition 2 will be further checked. First, the following variables are derived:
dp0, dp3, dq0, dq3 are first derived as in HEVC
if (p side is greater than or equal to 32)

$$dp0=(dp0+\text{Abs}(p5_0-2*p4_0+p3_0)+1)\gg 1$$

$$dp3=(dp3+\text{Abs}(p5_3-2*p4_3+p3_3)+1)\gg 1$$

if (q side is greater than or equal to 32)

$$dq0=(dq0+\text{Abs}(q5_0-2*q4_0+q3_0)+1)\gg 1$$

$$dq3=(dq3+\text{Abs}(q5_3-2*q4_3+q3_3)+1)\gg 1$$

Condition2=$(d<\beta)$? TRUE: FALSE where d=dp0+dq0+dp3+dq3.

If Condition 1 and Condition 2 are valid, whether any of the blocks uses sub-blocks is further checked:
If (bSidePisLargeBlk)
{
 If (mode block P==SUBBLOCKMODE)
  Sp=5
 else
  Sp=7
}
else
Sp=3
If (bSideQisLargeBlk)
{
 If (mode block Q==SUBBLOCKMODE)
  Sq=5
 else
  Sq=7
}
else
Sq=3

Finally, if both the Condition 1 and Condition 2 are valid, the proposed deblocking method will check the condition 3 (the large block strong filter condition), which is defined as follows.

In the Condition3 StrongFilterCondition, the following variables are derived:
dpq is derived as in HEVC.
$sp_3=\text{Abs}(p_3-p_0)$, derived as in HEVC
if (p side is greater than or equal to 32)
if (Sp==5)
 $sp_3=(sp_3+\text{Abs}(p_5-p_3)+1)\gg 1$
else
 $sp_3=(sp_3+\text{Abs}(p_7-p_3)+1)\gg 1$
$sq_3=\text{Abs}(q_0-q_3)$, derived as in HEVC
if (q side is greater than or equal to 32)
If (Sq==5)
 $sq_3=(sq_3+\text{Abs}(q_5-q_3)+1)\gg 1$
else
 $sq_3=(sq_3+\text{Abs}(q_7-q_3)+1)\gg 1$ As in HEVC, StrongFilterCondition=(dpq is less than ($\beta\gg 2$), $sp_3+sq_3$ is less than ($3*\beta\gg 5$), and $\text{Abs}(p_0-q_0)$ is less than $(5*t_C+1)\gg 1$)? TRUE: FALSE.

2.4.4 Stronger Deblocking Filter for Luma (Designed for Larger Blocks)

Bilinear filter is used when samples at either one side of a boundary belong to a large block. A sample belonging to a large block is defined as when the width >=32 for a vertical edge, and when height >=32 for a horizontal edge.

The bilinear filter is listed below.

Block boundary samples $p_i$ for i=0 to Sp−1 and $q_i$ for j=0 to Sq−1 (pi and qi are the i-th sample within a row for filtering vertical edge, or the i-th sample within a column for filtering horizontal edge) in HEVC deblocking described above) are then replaced by linear interpolation as follows:

$$p_i'=(f_i*\text{Middle}_{s,t}+(64-f_i)*P_s+32)\gg 6), \text{ clipped to } p_i\pm\text{tcPD}_i$$

$$q_j'=(g_j*\text{Middle}_{s,t}+(64-g_j)*Q_s+32)\gg 6), \text{ clipped to } q_j\pm\text{tcPD}_j$$

where $\text{tcPD}_i$ and $\text{tcPD}_j$ term is a position dependent clipping described in Section 2.4.7 and $g_j$, $f_i$, $\text{Middle}_{s,t}$, $P_s$ and $Q_s$ are given below:

2.4.5 Deblocking Control for Chroma

The chroma strong filters are used on both sides of the block boundary. Here, the chroma filter is selected when both sides of the chroma edge are greater than or equal to 8 (chroma position), and the following decision with three conditions are satisfied: the first one is for decision of boundary strength as well as large block. The proposed filter can be applied when the block width or height which orthogonally crosses the block edge is equal to or larger than 8 in chroma sample domain. The second and third one is basically the same as for HEVC luma deblocking decision, which are on/off decision and strong filter decision, respectively.

In the first decision, boundary strength (bS) is modified for chroma filtering and the conditions are checked sequentially. If a condition is satisfied, then the remaining conditions with lower priorities are skipped.

Chroma deblocking is performed when bS is equal to 2, or b S is equal to 1 when a large block boundary is detected.

The second and third condition is basically the same as HEVC luma strong filter decision as follows.

In the second condition:
d is then derived as in HEVC luma deblocking.
The second condition will be TRUE when d is less than $\beta$.

In the third condition StrongFilterCondition is derived as follows:
dpq is derived as in HEVC.
$sp_3=\text{Abs}(p_3-p_0)$, derived as in HEVC
$sq_3=\text{Abs}(q_0-q_3)$, derived as in HEVC
As in HEVC design, StrongFilterCondition=(dpq is less than ($\beta\gg 2$), $sp_3+sq_3$ is less than ($\beta\gg 3$), and $\text{Abs}(p_0-q_0)$ is less than $(5*t_C+1)\gg 1$)

2.4.6 Strong Deblocking Filter for Chroma

The following strong deblocking filter for chroma is defined:
$p_2'=(3*p_3+2*p_2+p_1+p_0+q_0+4)\gg 3$
$p_1'=(2*p_3+p_2+2*p_1+p_0+q_0+q_1+4)\gg 3$
$p_0'=(p_3+p_2+p_1+2*p_0+q_0+q_1+q_2+4)\gg 3$
The proposed chroma filter performs deblocking on a 4×4 chroma sample grid.

2.4.7 Position Dependent Clipping

The position dependent clipping tcPD is applied to the output samples of the luma filtering process involving strong and long filters that are modifying 7, 5 and 3 samples at the boundary. Assuming quantization error distribution, it is proposed to increase clipping value for samples which are expected to have higher quantization noise, thus expected to have higher deviation of the reconstructed sample value from the true sample value.

For each P or Q boundary filtered with asymmetrical filter, depending on the result of decision-making process in section 2.4.2, position dependent threshold table is selected from two tables (e.g., Tc7 and Tc3 tabulated below) that are provided to decoder as a side information:
Tc7={6, 5, 4, 3, 2, 1, 1}; Tc3={6, 4, 2};
tcPD=(Sp==3)? Tc3: Tc7;
tcQD=(Sq==3)? Tc3: Tc7;

For the P or Q boundaries being filtered with a short symmetrical filter, position dependent threshold of lower magnitude is applied:
Tc3=‡3, 2, 1};

Following defining the threshold, filtered p'i and q'i sample values are clipped according to tcP and tcQ clipping values:
p"i=chp3(p'i+tcP$_i$, p'$_i$−tcP$_i$, p'$_i$);
q"j=Clip3(q'$_j$+tcQ$_j$, q'$_j$−tcQ$_j$, q'$_j$);
where p'$_i$ and q'$_i$ are filtered sample values, p"$_i$ and q"$_j$ are output sample value after the clipping and tcP$_i$ tcP$_i$ are clipping thresholds that are derived from the VVC tc parameter and tcPD and tcQD. The function Clip3 is a clipping function as it is specified in VVC.

2.4.8 Sub-Block Deblocking Adjustment

To enable parallel friendly deblocking using both long filters and sub-block deblocking the long filters is restricted to modify at most 5 samples on a side that uses sub-block deblocking (AFFINE or ATMVP or DMVR) as shown in the luma control for long filters. Additionally, the sub-block deblocking is adjusted such that that sub-block boundaries on an 8×8 grid that are close to a CU or an implicit TU boundary is restricted to modify at most two samples on each side.

Following applies to sub-block boundaries that not are aligned with the CU boundary.
If (mode block Q==SUBBLOCKMODE && edge !=0) {
  if (!(implicitTU && (edge=(64/4))))
    if (edge=2||edge (orthogonalLength−2)||edge==(56/4)
      ||edge==(72/4))
      Sp=Sq=2;
    else
      Sp=Sq=3;
  else
    Sp=Sq=bSideQisLargeBlk?5:3
}

Where edge equal to 0 corresponds to CU boundary, edge equal to 2 or equal to orthogonalLength-2 corresponds to sub-block boundary 8 samples from a CU boundary etc. Where implicit TU is true if implicit split of TU is used.

2.5 SAO

The input of SAO is the reconstructed samples after DB. The concept of SAO is to reduce mean sample distortion of a region by first classifying the region samples into multiple categories with a selected classifier, obtaining an offset for each category, and then adding the offset to each sample of the category, where the classifier index and the offsets of the region are coded in the bitstream. In HEVC and VVC, the region (the unit for SAO parameters signaling) is defined to be a CTU.

Two SAO types that can satisfy the requirements of low complexity are adopted in HEVC. Those two types are edge offset (EO) and band offset (BO), which are discussed in further detail below. An index of an SAO type is coded (which is in the range of [0, 2]). For EO, the sample classification is based on comparison between current samples and neighboring samples according to 1-D directional patterns: horizontal, vertical, 135° diagonal, and 45° diagonal.

Figure 8:
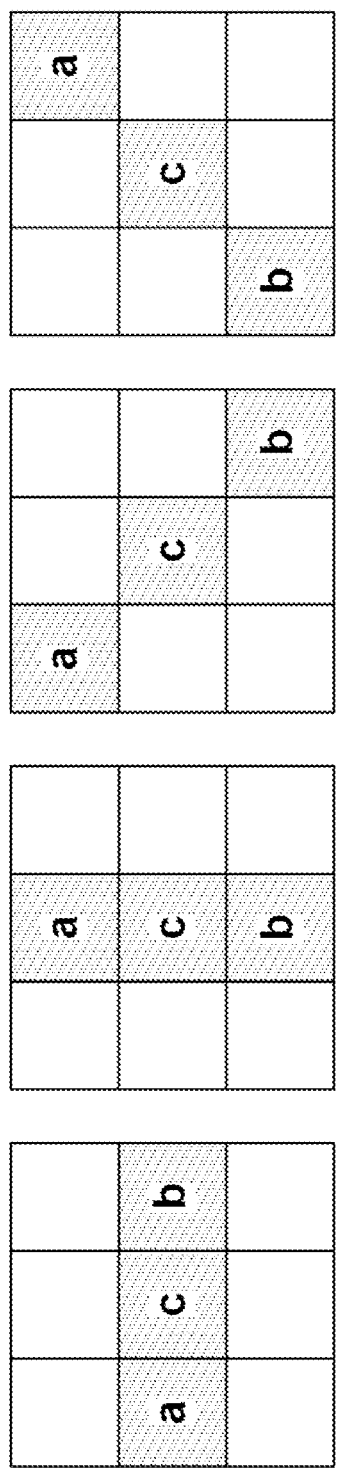
FIG. 8 shows four 1-D directional patterns.

FIG. 8 shows four 1-D directional patterns for EO sample classification: horizontal (EO class=0), vertical (EO class=1), 135° diagonal (EO class=2), and 45° diagonal (EO class=3)

For a given EO class, each sample inside the CTB is classified into one of five categories. The current sample value, labeled as "c," is compared with its two neighbors along the selected 1-D pattern. The classification rules for each sample are summarized in Table I. Categories 1 and 4 are associated with a local valley and a local peak along the selected 1-D pattern, respectively. Categories 2 and 3 are associated with concave and convex corners along the selected 1-D pattern, respectively. If the current sample does not belong to EO categories 1-4, then it is category 0 and SAO is not applied.

TABLE 3

Sample Classification Rules for Edge Offset

| Category | Condition |
| --- | --- |
| 1 | c < a and c < b |
| 2 | (c < a && c == b) ||(c == a && c < b) |
| 3 | (c > a && c == b) ||(c == a && c > b) |
| 4 | c > a && c > b |
| 5 | None of above |

2.6 Geometry Transformation-Based Adaptive Loop Filter

The input of DB is the reconstructed samples after DB and SAO. The sample classification and filtering process are based on the reconstructed samples after DB and SAO.

In some embodiments, a geometry transformation-based adaptive loop filter (GALF) with block-based filter adaption is applied. For the luma component, one among 25 filters is selected for each 2×2 block, based on the direction and activity of local gradients.

2.6.1 Filter Shape

Figure 9:
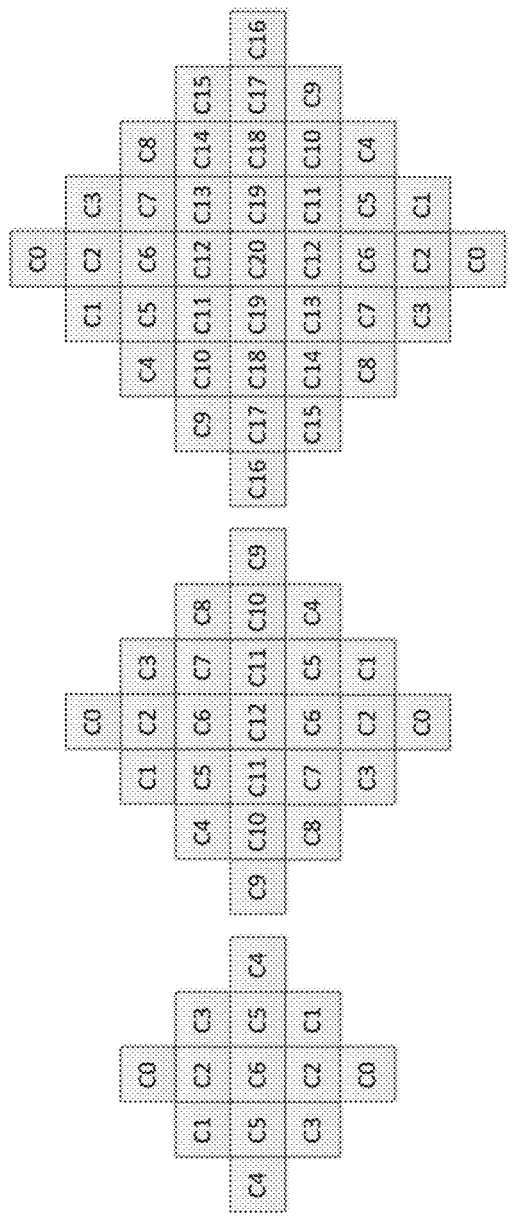
FIG. 9 shows examples of geometric adaptive loop filtering (GALF) filter shapes (left: 5×5 diamond, middle: 7×7 diamond, right: 9×9 diamond).

In some embodiments, up to three diamond filter shapes (as shown in FIG. 9) can be selected for the luma component. An index is signalled at the picture level to indicate the filter shape used for the luma component. Each square represents a sample, and Ci (i being 0-6 (left), 0-12 (middle), 0-20 (right)) denotes the coefficient to be applied to the sample. For chroma components in a picture, the 5×5 diamond shape is always used.

2.6.1.1 Block Classification

Each 2×2 block is categorized into one out of 25 classes. The classification index C is derived based on its directionality D and a quantized value of activity Â, as follows:

$$C = 5D + \hat{A}. \tag{1}$$

To calculate D and Â, gradients of the horizontal, vertical and two diagonal direction are first calculated using 1-D Laplacian:

$$g_v = \sum_{k=i-2}^{i+3} \sum_{l=j-2}^{j+3} V_{k,l}, \quad V_{k,l} = |2R(k, l) - R(k, l-1) - R(k, l+1)|, \tag{2}$$

-continued $$g_h = \sum_{k=i-2}^{i+3}\sum_{l=j-2}^{j+3} H_{k,l}, H_{k,l} = |2R(k,l) - R(k-1,l) - R(k+1,l)|, \quad (3)$$

$$g_{d1} = \sum_{k=i-2}^{i+3}\sum_{l=j-3}^{j+3} D1_{k,l}, \quad (4)$$

$$D1_{k,l} = |2R(k,l) - R(k-1,l-1) - R(k+1,l+1)|$$

$$g_{d2} = \sum_{k=i-2}^{i+3}\sum_{j=j-2}^{j+3} D2_{k,l}, \quad (5)$$

$$D2_{k,l} = |2R(k,l) - R(k-1,l+1) - R(k+1,l-1)|$$

Indices i and j refer to the coordinates of the upper left sample in the 2×2 block and R (i, j) indicates a reconstructed sample at coordinate (i, j).

Then D maximum and minimum values of the gradients of horizontal and vertical directions are set as:

$$g_{h,v}^{max} = \max(g_h, g_v), = g_{h,v}^{min} = \min(g_h, g_v), \quad (6)$$

and the maximum and minimum values of the gradient of two diagonal directions are set as:

$$g_{d0,d1}^{max}\% = \max(g_{d0}, g_{d1}), g_{d0,d1}^{min} = \min(g_{d0}, g_{d1}), \quad (7)$$

To derive the value of the directionality D, these values are compared against each other and with two thresholds $t_1$ and $t_2$:

Step 1. If both $g_{h,v}^{max} \leq t_1 \cdot g_{h,v}^{min}$ and $g_{d0,d1}^{max} \leq t_1 \cdot g_{d0,d1}^{min}$ are true, D is set to 0.

Step 2. If $g_{h,v}^{max}/g_{h,v}^{min} > g_{d0,d1}^{max}/g_{d0,d1}^{min}$, continue from Step 3; otherwise continue from Step 4.

Step 3. If $g_{h,v}^{max} > t_2 \cdot g_{h,v}^{min}$, D is set to 2; otherwise D is set to 1.

Step 4. If $g_{d0,d1}^{max} > t_2 \cdot g_{d0,d1}^{min}$, D is set to 4; otherwise D is set to 3.

The activity value A is calculated as:

$$A = \sum_{k=i-2}^{i+3}\sum_{l=j-2}^{j+3}(V_{k,l} + H_{k,l}). \quad (8)$$

A is further quantized to the range of 0 to 4, inclusively, and the quantized value is denoted as Â.

For both chroma components in a picture, no classification method is applied, e.g. a single set of ALF coefficients is applied for each chroma component.

2.6.1.2 Geometric Transformations of Filter Coefficients

Figure 10:
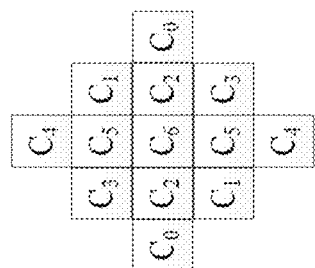
FIG. 10 shows relative coordinates for the 5×5 diamond filter support.
Figure 10:
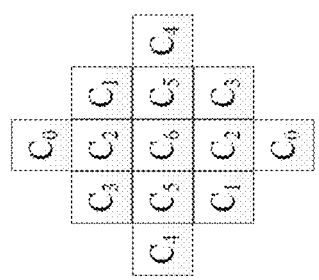
Figure 10:
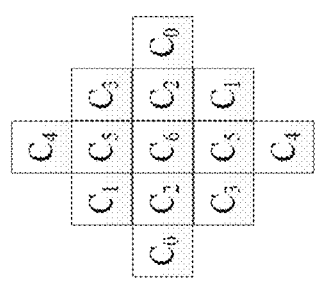

FIG. 10 shows relative coordinator for the 5×5 diamond filter support: Left: Diagonal Center: Vertical flip, Right: Rotation.

Before filtering each 2×2 block, geometric transformations such as rotation or diagonal and vertical flipping are applied to the filter coefficients f (k, l), which is associated with the coordinate (k, l), depending on gradient values calculated for that block. This is equivalent to applying these transformations to the samples in the filter support region. The idea is to make different blocks to which ALF is applied more similar by aligning their directionality.

Three geometric transformations, including diagonal, vertical flip and rotation are introduced:

Diagonal: $f_D(k,l) = f(l,k)$,

Vertical flip: $f_V(k,l) = f(k, K-l-1)$,

Rotation: $f_R(k,l) = f(K-l-1, k)$. (9)

where K is the size of the filter and $0 \leq k$, $l \leq K-1$ are coefficients coordinates, such that location (0,0) is at the upper left corner and location (K-1, K-1) is at the lower right corner. The transformations are applied to the filter coefficients f(k, l) depending on gradient values calculated for that block. The relationship between the transformation and the four gradients of the four directions are summarized in Table 4. FIG. 9 shows the transformed coefficients for each position based on the 5×5 diamond.

TABLE 4

| Mapping of the gradient calculated for one block and the transformations | |
|---|---|
| Gradient values | Transformation |
| $g_{d2} < g_{d1}$ and $g_h < g_v$ | No transformation |
| $g_{d2} < g_{d1}$ and $g_v < g_h$ | Diagonal |
| $g_{d1} < g_{d2}$ and $g_h < g_v$ | Vertical flip |
| $g_{d1} < g_{d2}$ and $g_v < g_h$ | Rotation |

2.6.1.3 Filter Parameters Signalling

In some embodiments, GALF filter parameters are signalled for the first CTU, e.g., after the slice header and before the SAO parameters of the first CTU. Up to 25 sets of luma filter coefficients could be signalled. To reduce bits overhead, filter coefficients of different classification can be merged. Also, the GALF coefficients of reference pictures are stored and allowed to be reused as GALF coefficients of a current picture. The current picture may choose to use GALF coefficients stored for the reference pictures and bypass the GALF coefficients signalling. In this case, only an index to one of the reference pictures is signalled, and the stored GALF coefficients of the indicated reference picture are inherited for the current picture.

To support GALF temporal prediction, a candidate list of GALF filter sets is maintained. At the beginning of decoding a new sequence, the candidate list is empty. After decoding one picture, the corresponding set of filters may be added to the candidate list. Once the size of the candidate list reaches the maximum allowed value (e.g., 6), a new set of filters overwrites the oldest set in decoding order, and that is, first-in-first-out (FIFO) rule is applied to update the candidate list. To avoid duplications, a set could only be added to the list when the corresponding picture doesn't use GALF temporal prediction. To support temporal scalability, there are multiple candidate lists of filter sets, and each candidate list is associated with a temporal layer. More specifically, each array assigned by temporal layer index (TempIdx) may compose filter sets of previously decoded pictures with equal to lower TempIdx. For example, the k-th array is assigned to be associated with TempIdx equal to k, and it only contains filter sets from pictures with TempIdx smaller than or equal to k. After coding a certain picture, the filter sets associated with the picture will be used to update those arrays associated with equal or higher TempIdx.

Temporal prediction of GALF coefficients is used for inter coded frames to minimize signalling overhead. For intra frames, temporal prediction is not available, and a set of 16 fixed filters is assigned to each class. To indicate the usage of the fixed filter, a flag for each class is signalled and if required, the index of the chosen fixed filter. Even when the fixed filter is selected for a given class, the coefficients of the adaptive filter f(k, l) can still be sent for this class in which case the coefficients of the filter which will be applied to the reconstructed image are sum of both sets of coefficients.

The filtering process of luma component can controlled at CU level. A flag is signalled to indicate whether GALF is applied to the luma component of a CU. For chroma component, whether GALF is applied or not is indicated at picture level only.

2.6.1.4 Filtering Process

At decoder side, when GALF is enabled for a block, each sample R(i, j) within the block is filtered, resulting in sample value R'(i,j) as shown below, where L denotes filter length, $f_{m,n}$ represents filter coefficient, and f(k, l) denotes the decoded filter coefficients.

$$R'(i, j) = \sum_{k=-L/2}^{L/2} \sum_{l=-L/2}^{L/2} f(k, l) \times R(i+k, j+l) \quad (10)$$

Figure 11:
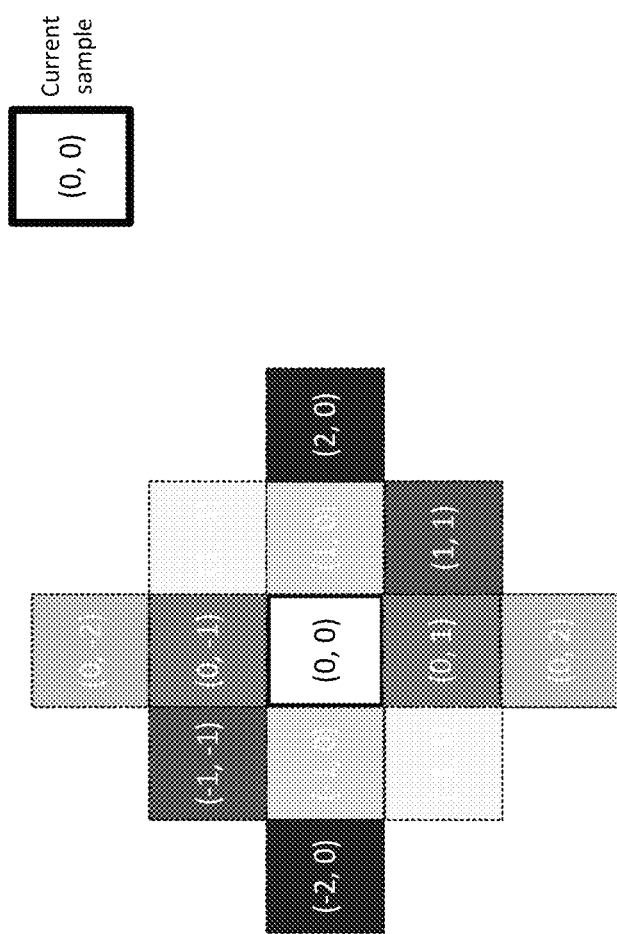
FIG. 11 shows examples of relative coordinates for the 5×5 diamond filter support.

FIG. 11 shows an example of relative coordinates used for 5×5 diamond filter support supposing the current sample's coordinate (i, j) to be (0, 0). Samples in different coordinates filled with the same color are multiplied with the same filter coefficients.

2.7 Geometry Transformation-Based Adaptive Loop Filter (GALF)

2.7.1 Example GALF

In some embodiments, the filtering process of the Adaptive Loop Filter, is performed as follows:

$$O(x,y) = \Sigma_{(i,j)} w(i,j) \cdot I(x+i, y+j), \quad (11)$$

where samples I(x+i,y+j) are input samples, O(x, y) is the filtered output sample (e.g. filter result), and w(i,j) denotes the filter coefficients. In practice, in VTM4.0 it is implemented using integer arithmetic for fixed point precision computations:

$$O(x, y) = \left( \sum_{i=-\frac{L}{2}}^{\frac{L}{2}} \sum_{j=-\frac{L}{2}}^{\frac{L}{2}} w(i, j) \cdot I(x+i, y+j) + 64 \right) \gg 7, \quad (12)$$

where L denotes the filter length, and where w(i,j) are the filter coefficients in fixed point precision.

The current design of GALF in VVC has the following major changes:

(1) The adaptive filter shape is removed. Only 7×7 filter shape is allowed for luma component and 5×5 filter shape is allowed for chroma component.

(2) Signaling of ALF parameters in removed from slice/picture level to CTU level.

(3) Calculation of class index is performed in 4×4 level instead of 2×2. In addition, in some embodiments, sub-sampled Laplacian calculation method for ALF classification is utilized. More specifically, there is no need to calculate the horizontal/vertical/45 diagonal/135 degree gradients for each sample within one block. Instead, 1:2 sub-sampling is utilized.

Figures 12A, 12B, 12C, 12D:
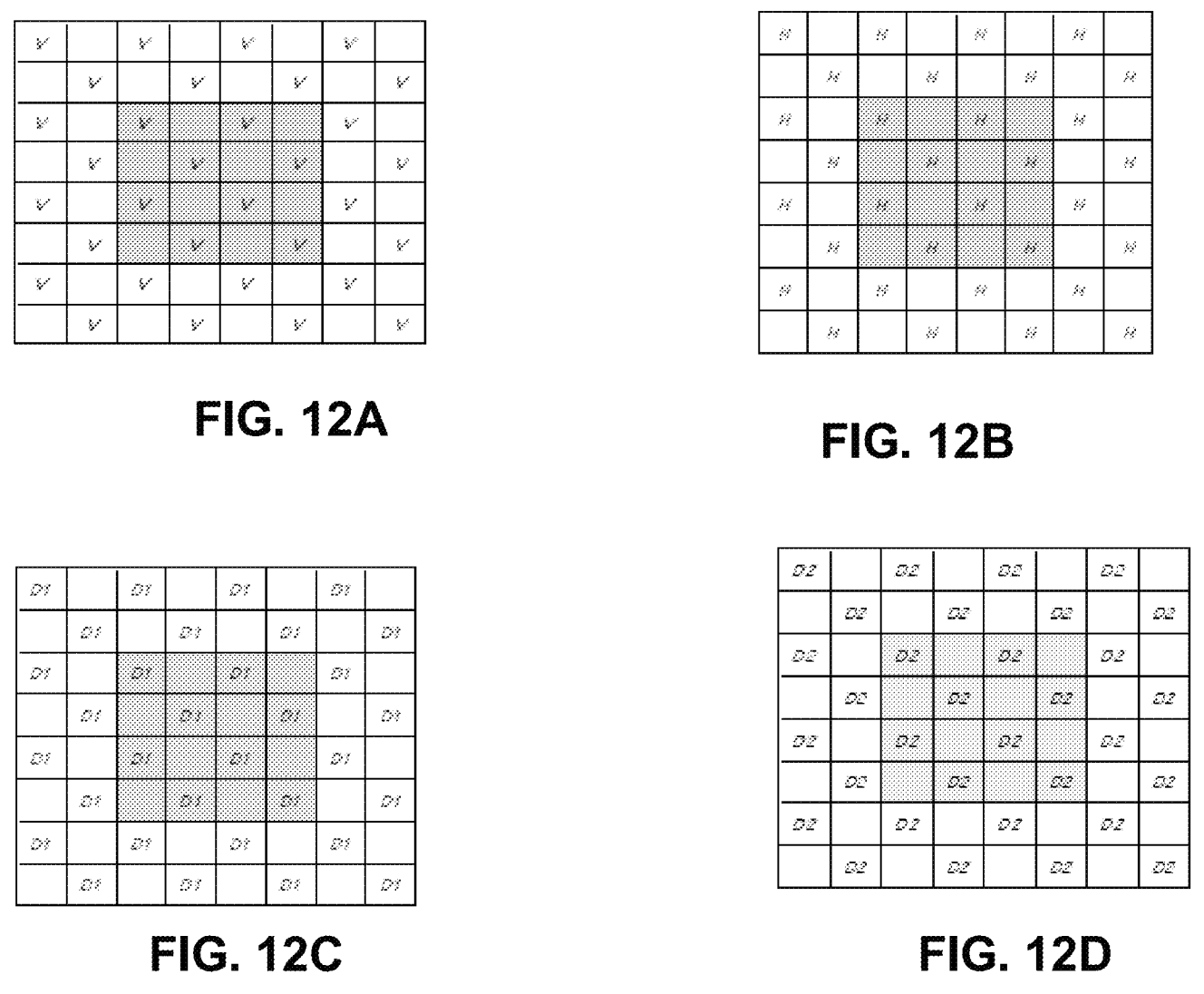

FIG. 12A-12D show Sub sampled Laplacian calculation for CE2.6.2. FIG. 12A illustrates sub sampled positions for vertical gradient, FIG. 12 illustrates sub sampled positions for horizontal gradient, FIG. 12C illustrates sub sampled positions for diagonal gradient, and FIG. 12D illustrates sub sampled positions for diagonal gradient.

2.8 Non-Linear ALF 2.8.1 Filtering Reformulation

Equation (11) can be reformulated, without coding efficiency impact, in the following expression:

$$O(x,y) = I(x,y) + \Sigma_{(i,j) \neq (0,0)} w(i,j) \cdot (I(x+i, y+j) - I(x,y)), \quad (13)$$

where w(i,j) are the same filter coefficients as in equation (11) [excepted w(0,0) which is equal to 1 in equation (13) while it is equal to $1 - \Sigma_{(i,j) \neq (0,0)} w(i,j)$ in equation (11)].

Using this above filter formula of (13), VVC introduces the non-linearity to make ALF more efficient by using a simple clipping function to reduce the impact of neighbor sample values (I(x+i, y+j)) when they are too different with the current sample value (I(x, y)) being filtered.

More specifically, the ALF filter is modified as follows:

$$O'(x,y) = I(x,y) + \Sigma_{(i,j) \neq (0,0)} w(i,j) \cdot K(I(x+i, y+j) - I(x,y), k(i,j)), \quad (14)$$

where K(d, b)=min (b, max(−b, d)) is the clipping function, and k(i, j) are clipping parameters, which depends on the (i, j) filter coefficient. The encoder performs the optimization to find the best k(i, j).

In some embodiments, the clipping parameters k(i, j) are specified for each ALF filter, one clipping value is signaled per filter coefficient. It means that up to 12 clipping values can be signalled in the bitstream per Luma filter and up to 6 clipping values for the Chroma filter.

In order to limit the signaling cost and the encoder complexity, only 4 fixed values which are the same for INTER and INTRA slices are used.

Because the variance of the local differences is often higher for Luma than for Chroma, two different sets for the Luma and Chroma filters are applied. The maximum sample value (here 1024 for 10 bits bit-depth) in each set is also introduced, so that clipping can be disabled if it is not necessary.

The sets of clipping values used in some embodiments are provided in the Table 5. The 4 values have been selected by roughly equally splitting, in the logarithmic domain, the full range of the sample values (coded on 10 bits) for Luma, and the range from 4 to 1024 for Chroma.

More precisely, the Luma table of clipping values have been obtained by the following formula:

$$AlfClip_L = \left\{ \text{round}\left( \left((M)^{\frac{1}{N}}\right)^{N-n+1} \right) \text{ for } n \in 1 \ldots N] \right\}, \quad (15)$$

with $M = 2^{10}$ and $N = 4$.

Similarly, the Chroma tables of clipping values is obtained according to the following formula:

$$AlfClip_C = \left\{ \text{round}\left( A \cdot \left(\left(\frac{M}{A}\right)^{\frac{1}{N-1}}\right)^{N-n} \right) \text{ for } n \in 1 \ldots N] \right\}, \quad (16)$$

with $M = 2^{10}$, $N = 4$ and $A = 4$.

TABLE 5

| Authorized clipping values | |
|---|---|
| | INTRA/INTER tile group |
| LUMA | {1024, 181, 32, 6} |
| CHROMA | {1024, 161, 25, 4} |

The selected clipping values are coded in the "alf_data" syntax element by using a Golomb encoding scheme corresponding to the index of the clipping value in the above Table 5. This encoding scheme is the same as the encoding scheme for the filter index.

2.9 Virtual Boundary

In hardware and embedded software, picture-based processing is practically unacceptable due to its high picture buffer requirement. Using on-chip picture buffers is very expensive and using off-chip picture buffers significantly increases external memory access, power consumption, and data access latency. Therefore, DF, SAO, and ALF will be changed from picture-based to LCU-based decoding in real products. When LCU-based processing is used for DF, SAO, and ALF, the entire decoding process can be done LCU by LCU in a raster scan with an LCU-pipelining fashion for parallel processing of multiple LCUs. In this case, line buffers are required for DF, SAO, and ALF because processing one LCU row requires pixels from the above LCU row. If off-chip line buffers (e.g. DRAM) are used, the external memory bandwidth and power consumption will be increased; if on-chip line buffers (e.g. SRAM) are used, the chip area will be increased. Therefore, although line buffers are already much smaller than picture buffers, it is still desirable to reduce line buffers.

Figure 13:
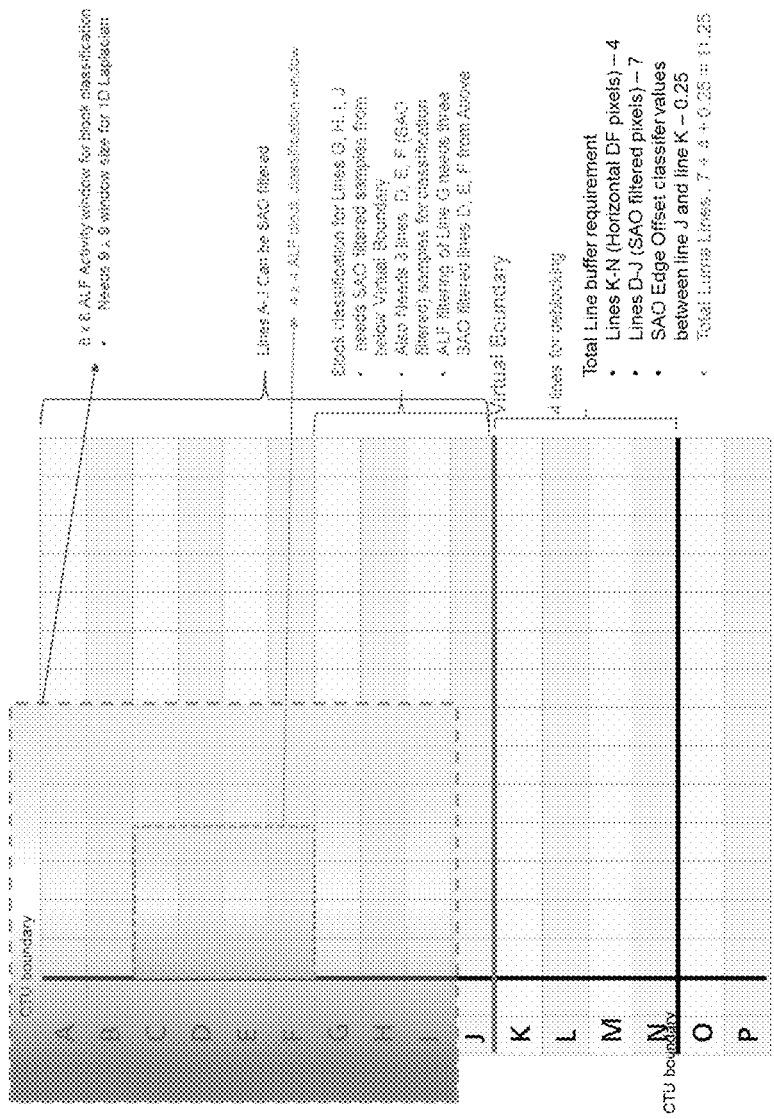
FIG. 13 shows an example of a loop filter line buffer requirement in VTM-4.0 for Luma component.

In some embodiments, as shown in FIG. 13, the total number of line buffers required is 11.25 lines for the Luma component. The explanation of the line buffer requirement is as follows: The deblocking of horizontal edge overlapping with CTU edge cannot be performed as the decisions and filtering require lines K, L, M, M from the first CTU and Lines O, P from the bottom CTU. Therefore, the deblocking of the horizontal edges overlapping with the CTU boundary is postponed until the lower CTU comes. Therefore for the lines K, L, M, N reconstructed luma samples have to be stored in the line buffer (4 lines). Then the SAO filtering can be performed for lines A till J. The line J can be SAO filtered as deblocking does not change the samples in line K. For SAO filtering of line K, the edge offset classification decision is only stored in the line buffer (which is 0.25 Luma lines). The ALF filtering can only be performed for lines A-F. As shown in FIG. 13, the ALF classification is performed for each 4×4 block. Each 4×4 block classification needs an activity window of size 8×8 which in turn needs a 9×9 window to compute the 1d Laplacian to determine the gradient.

Therefore, for the block classification of the 4×4 block overlapping with lines G, H, J needs, SAO filtered samples below the Virtual boundary. In addition, the SAO filtered samples of lines D, E, F are required for ALF classification. Moreover, the ALF filtering of Line G needs three SAO filtered lines D, E, F from above lines. Therefore, the total line buffer requirement is as follows:

Lines K-N(Horizontal DF pixels): 4 lines
Lines D-J (SAO filtered pixels): 7 lines
SAO Edge offset classifier values between line J and line K: 0.25 line Therefore, the total number of luma lines required is 7+4+0.25=11.25.

Figure 14:
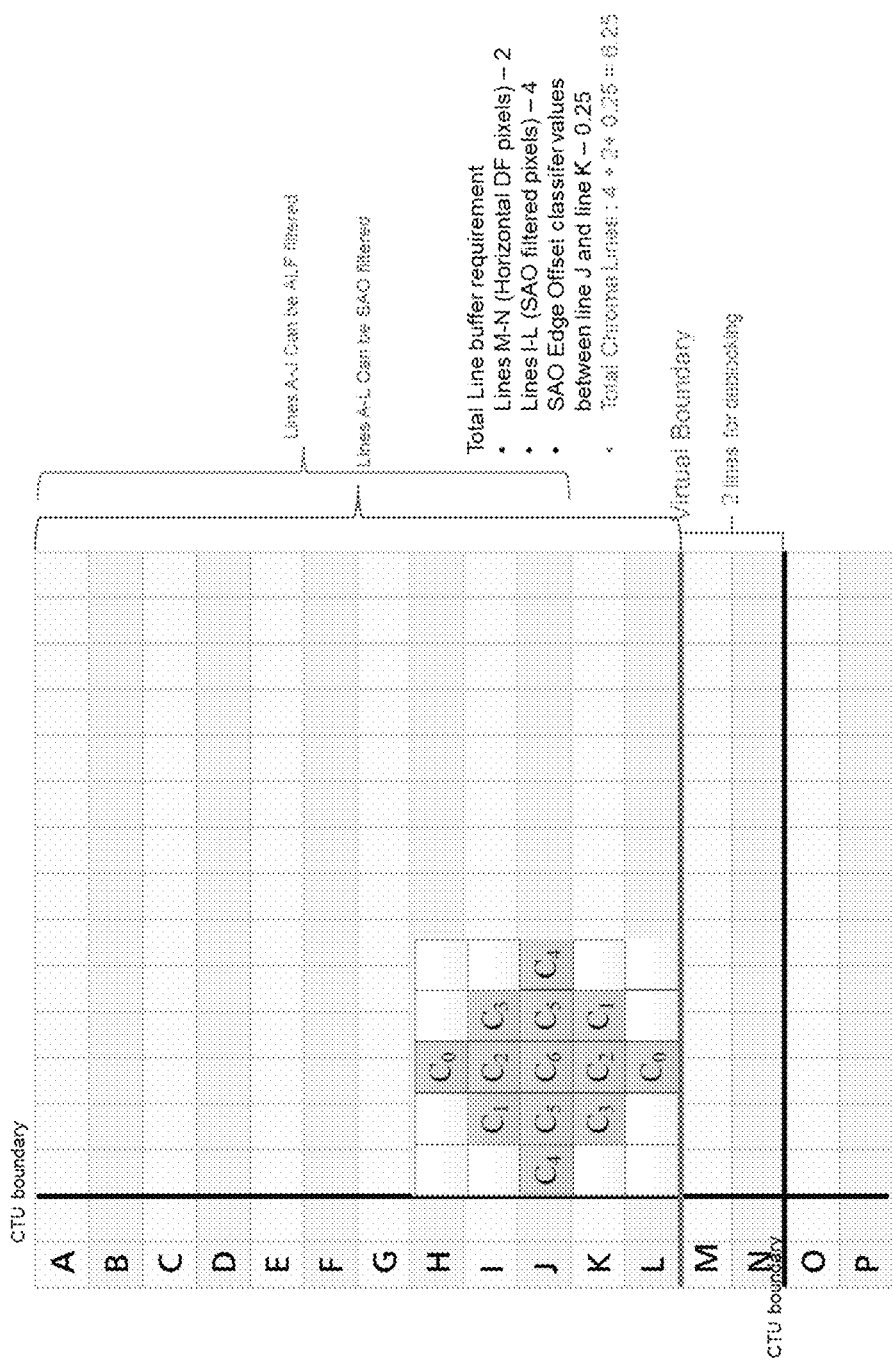
FIG. 14 shows an example of a loop filter line buffer requirement in VTM-4.0 for Chroma component.

Similarly, the line buffer requirement of the Chroma component is illustrated in FIG. 14. The line buffer requirement for Chroma component is evaluated to be 6.25 lines.

In order to eliminate the line buffer requirements of SAO and ALF, the concept of virtual boundary (VB) is introduced in the latest VVC. As shown in FIG. 13, VBs are upward shifted horizontal LCU boundaries by N pixels. For each LCU, SAO and ALF can process pixels above the VB before the lower LCU comes but cannot process pixels below the VB until the lower LCU comes, which is caused by DF. With consideration of the hardware implementation cost, the space between the proposed VB and the horizontal LCU boundary is set as four pixels for luma (e.g. N=4 in FIG. 13) and two pixels for chroma (e.g. N=2 in FIG. 9).

2.9.1 Modified ALF Block Classification when VB Size N is 4

Figures 15A, 15B:
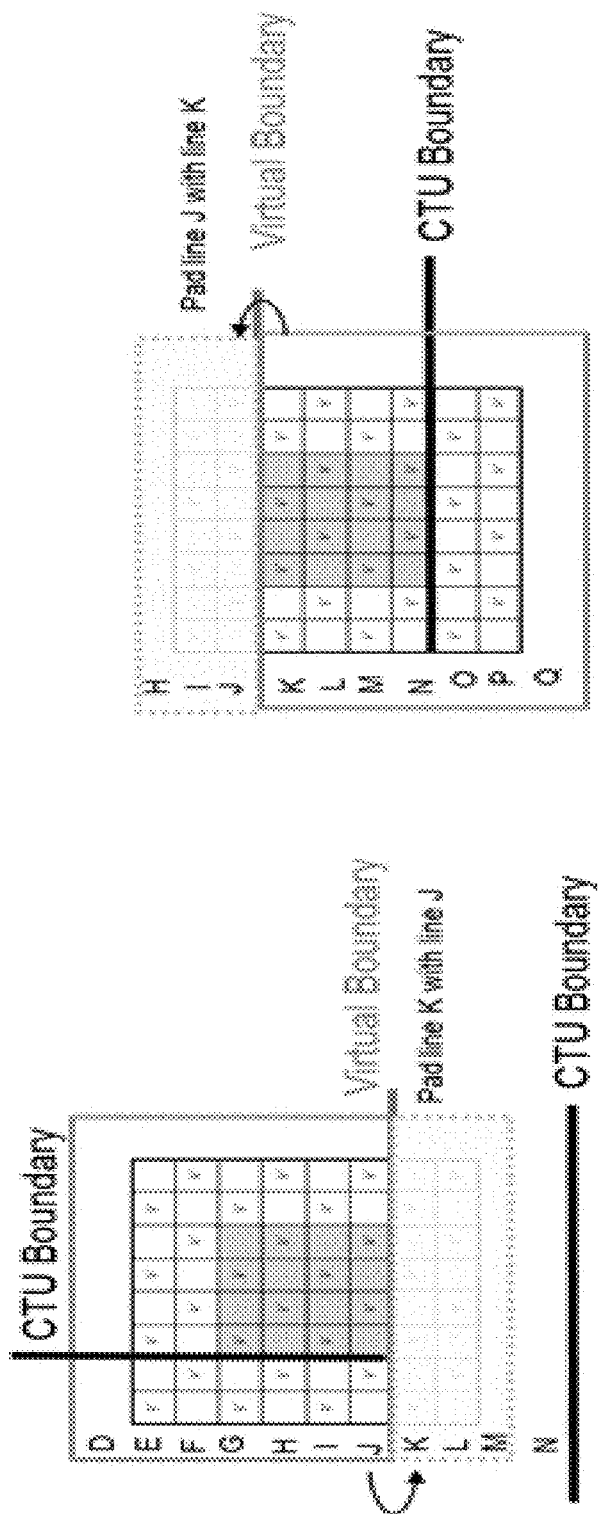
FIG. 15A shows an example of ALF block classification at virtual boundary when N=4.
FIG. 15B shows another example of ALF block classification at virtual boundary when N=4.

FIGS. 15A-15B depict modified block classification for the case when the virtual boundary is 4 lines above the CTU boundary (N=4). As depicted in FIG. 15A, for the 4×4 block starting at line G, the block classification only uses the lines E till J. However Laplacian gradient calculation for the samples belonging to line J requires one more line below (line K). Therefore, line K is padded with line J.

Similarly, as depicted in FIG. 15B, for the 4×4 block starting at line K, the block classification only uses the lines K till P. However Laplacian gradient calculation for the samples belonging to line K require one more line above (line J). Therefore, line J is padded with line K.

2.9.2 Two-Side Padding for Samples Cross Virtual Boundaries

Figure 16A:
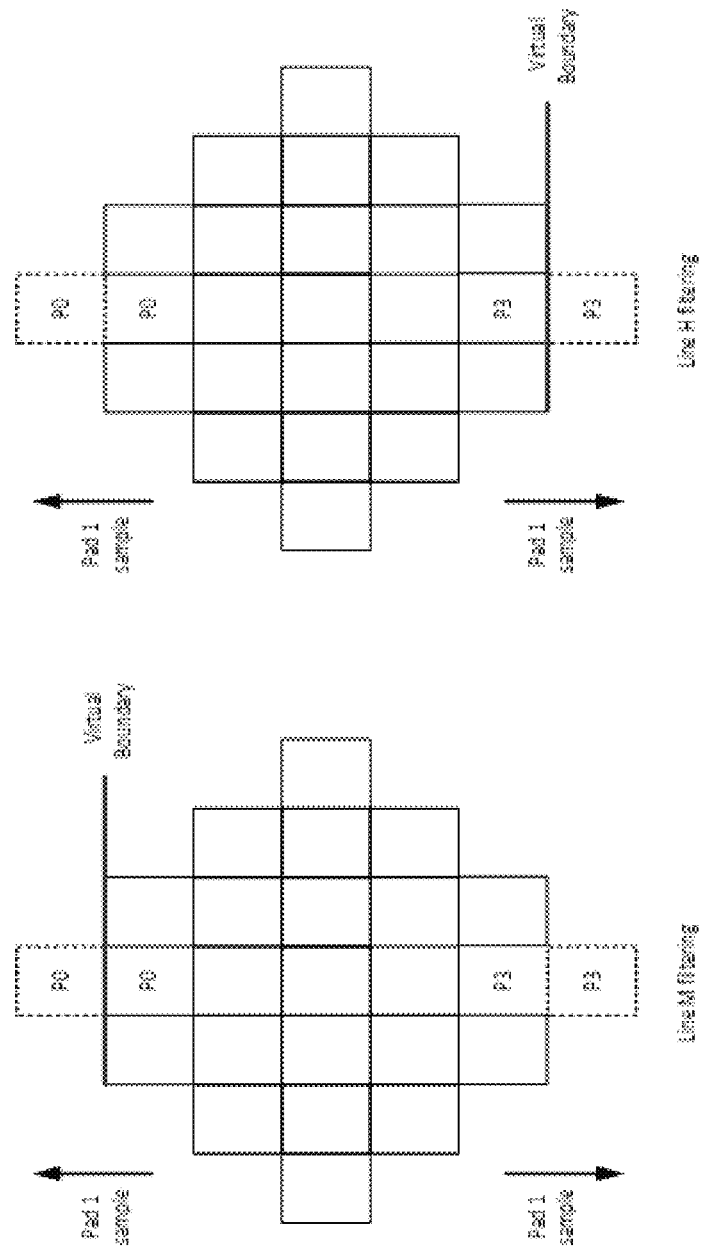
FIG. 16A illustrate an example of modified luma ALF filtering at virtual boundary.
Figure 16B:
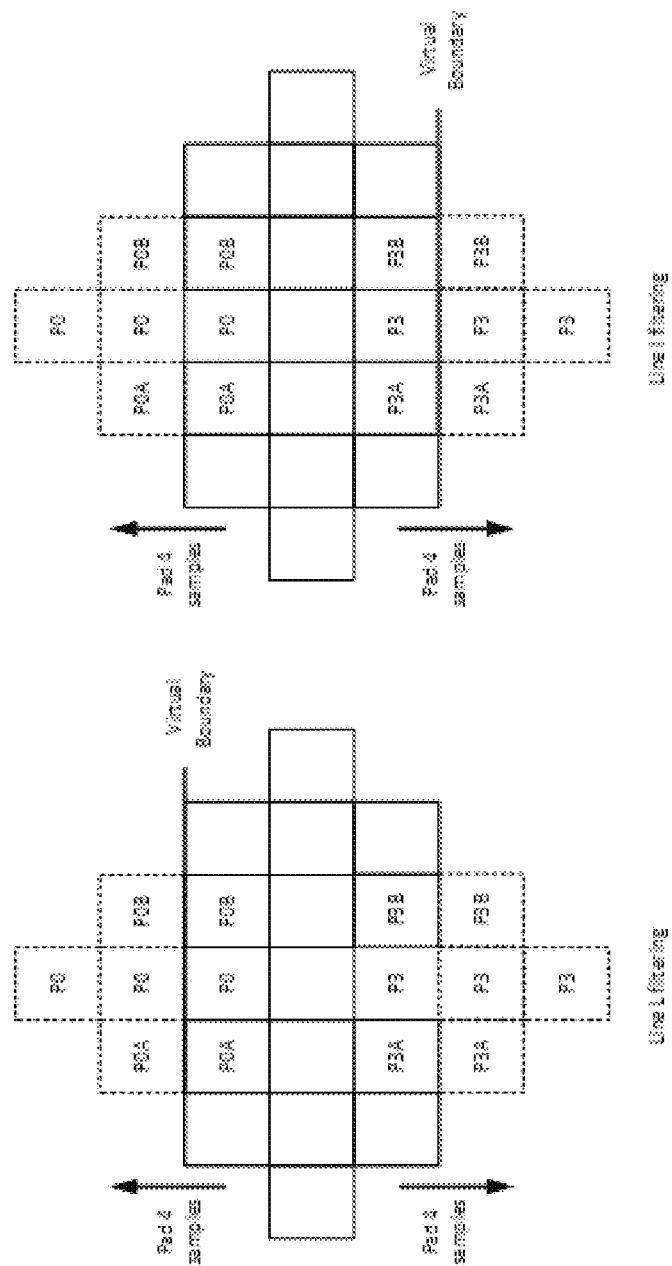
FIG. 16B illustrate another example of modified luma ALF filtering at virtual boundary.
Figure 16C:
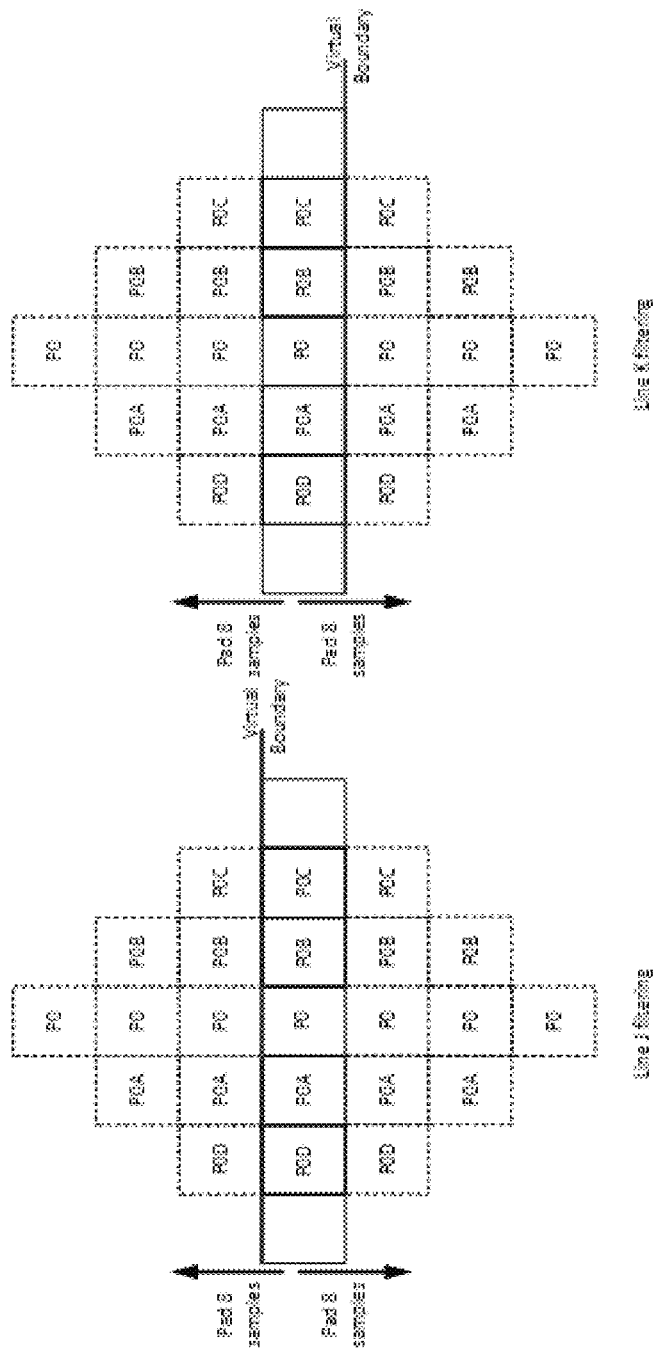
FIG. 16C illustrate yet another example of modified luma ALF filtering at virtual boundary.

As depicted in FIGS. 16A-16C, truncated version of the filters is used for filtering of the luma samples belonging to the lines close to the virtual boundaries. Taking FIG. 16A for example, when filtering the line M as denoted in FIG. 13, e.g., the center sample of the 7×7 diamond support is in the line M. it requires to access one line above the VB (denoted by bold line). In this case, the samples above the VB is copied from the right below sample below the VB, such as the P0 sample in the solid line is copied to the above dash position. Symmetrically, P3 sample in the solid line is also copied to the right below dashed position even the sample for that position is available. The copied samples are only used in the luma filtering process.

The padding method used for ALF virtual boundaries may be denoted as 'Two-side Padding' wherein if one sample located at (i, j) (e.g., the P0A with dash line in FIG. 16B) is padded, then the corresponding sample located at (m, n) (e.g., the P3B with dash line in FIG. 16B) which share the same filter coefficient is also padded even the sample is available, as depicted in FIGS. 16A-16C and FIGS. 17A-17B. In FIGS. 16A-16C, 7×7 diamond filter support, center is the current sample to be filtered. FIG. 16A shows one required line above/below VB need to be padded. FIG. 16B shows 2 required lines above/below VB need to be padded. FIG. 16C shows 3 required lines above/below VB need to be padded.

Figure 17A:
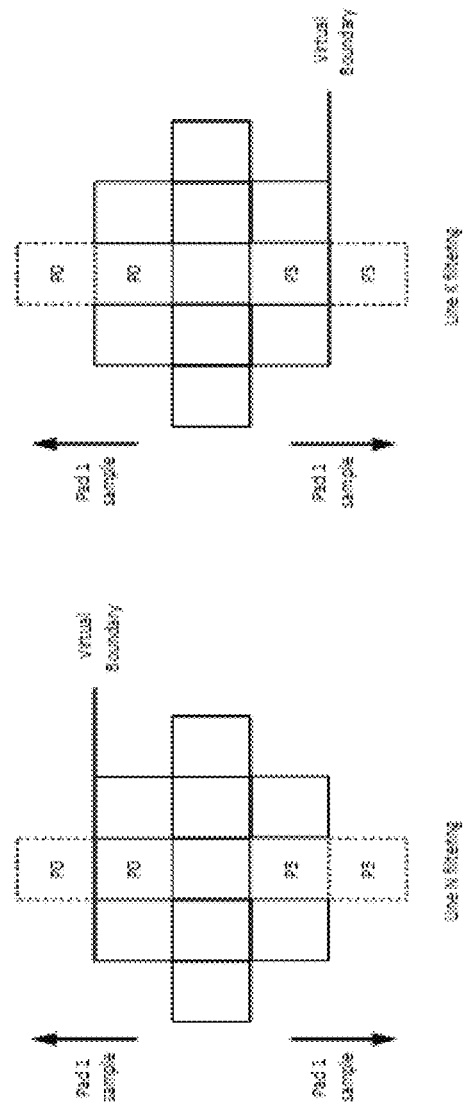
FIG. 17A shows an example of modified chroma ALF filtering at virtual boundary.
Figure 17B:
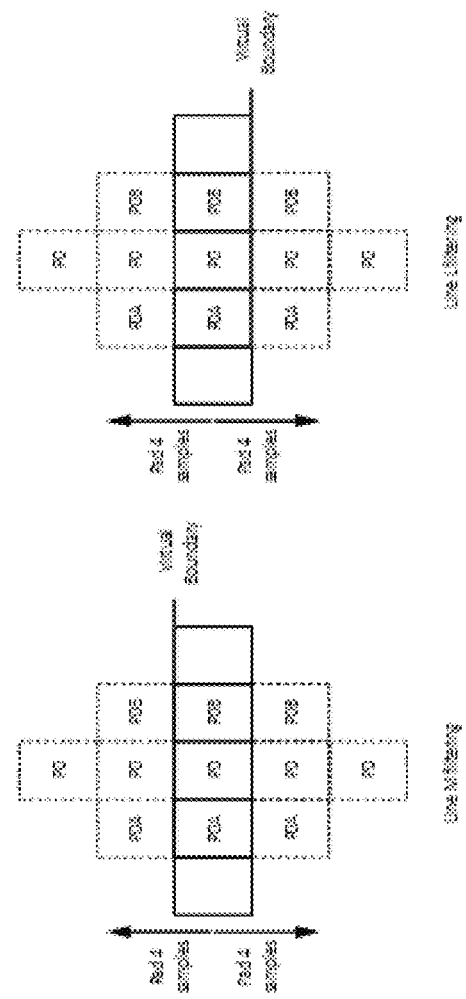
FIG. 17B shows another example of modified chroma ALF filtering at virtual boundary.

Similarly, as depicted in FIGS. 17A-17B, the two-side padding method is also used for chroma ALF filtering. FIGS. 17A-17B show modified chroma ALF filtering at virtual boundary (5×5 diamond filter support, center is the current sample to be filtered). FIG. 17A shows 1 required lines above/below VB need to be padded. FIG. 17B shows 2 required lines above/below VB need to be padded.

Figure 18A:
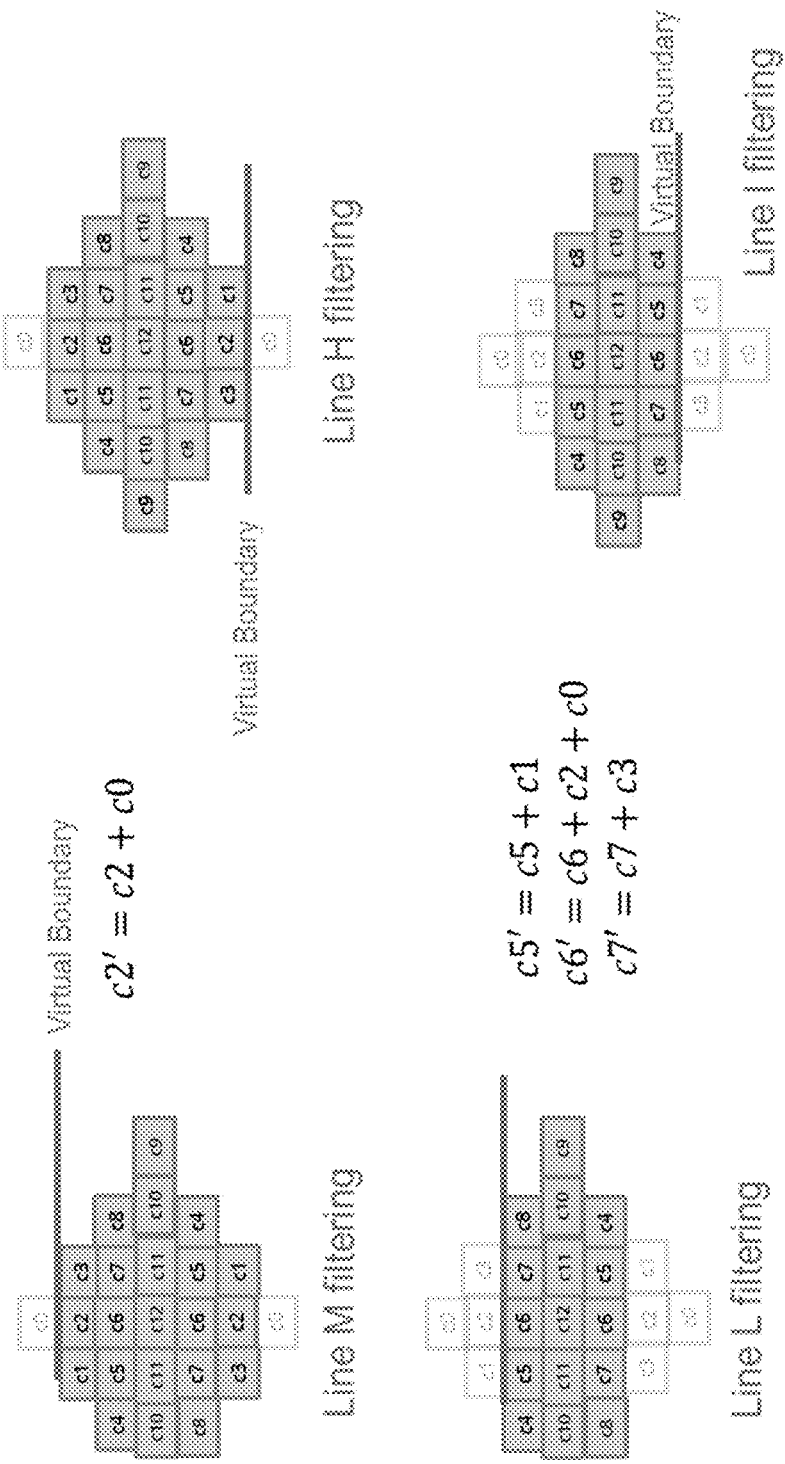
FIG. 18A shows an example of horizontal wrap around motion compensation.

2.9.3 Alternative Way for Implementation of the Two-Side Padding when Non-Linear ALF is Disabled When the non-linear ALF is disabled fora CTB, e.g., the clipping parameters k(i,j) in equation (14) are equal to (1«Bitdepth), the padding process could be replaced by modifying the filter coefficients (a.k.a modified-coeff based ALF, MALF). For example, when filtering samples in line L/I, the filter coefficient c5 is modified to c5', in this case, there is no need to copy the luma samples from the solid P0A to dashed P0A and solid P3B to dashed P3B FIG. 18A. In this case, the two-side padding and MALF will generate the same results, assuming the current sample to be filtered is located at (x, y).

$$c5.K(I(x-1,y-1)-I(x,y),k(-1,-1))+c1.K(I(x-1,y-2)-I(x,y),k(-1,-2))=(c5+c1).K(I(x-1,y-1)/(x,y),k(-1,-1))$$ (17)

since K(d, b)=d and I(x−1, y−1)=I(x−1, y−2) due to padding.

However, when the non-linear ALF is enabled, MALF and two-side padding may generate different filtered results, since the non-linear parameters are associated with each coefficient, such as for filter coefficients c5 and c1, the clipping parameters are different Therefore, $$c5.K(I(x-1,y-1)/(x,y),k(-1,-1))+c1. K(I(x-1,y-2)-I(x,y),k(-1,-2)) !=(c5+c1).K(I(x-1,y-1)-I(x,y),k(-1,-1))$$

(18)

since K(d, b) !=d, even I(x−1, y−1)=I(x−1,y−2) due to padding.

2.10 Specification on ALF Filtering

Newly added parts are indicated in bold italicized underlined text. The deleted parts are indicated using.

| 7.3.2.4 Picture parameter set RBSP syntax | |
|---|---|
| pic_parameter_set_rbsp( ) { | Descriptor |
|   pps_pic_parameter_set_id | ue(v) |
|   pps_seq_parameter_set_id | ue(v) |
|   output_flag_present_flag | u(1) |
|   single_tile_in_pic_flag | u(1) |
|   if( !single_tile_in_pic_flag ) { | |
|     uniform_tile_spacing_flag | u(1) |
|     if( uniform_tile_spacing_flag ) { | |
|       tile_cols_width_minus1 | ue(v) |
|       tile_rows_height_minus1 | ue(v) |
|     } else { | |
|       num_tile_columns_minus1 | ue(v) |
|       num_tile_rows_minus1 | ue(v) |
|       for( i = 0; i < num_file_columns_minus1; i++ ) | |
|         tile_column_width_minus1[ i ] | ue(v) |
|       for( i = 0; i < num_tile_rows_minus1; i++ ) | |
|         tile_row_height_minus1[ i ] | ue(v) |
|     } | |
|     brick_splitting_present_flag | u(1) |
|     for( i = 0; brick_splitting_present_flag && i < Num TilesInPic; i++ ) | |
| { | |
|       brick_split_flag[ i ] | u(1) |
|       if( brick_split_flag[ i ] ) { | |
|         uniform_brick_spacing_flag[ i ] | u(1) |
|         if( uniform_brick_spacing_flag[ i ] ) | |
|           brick_height_minus1[ i ] | ue(v) |
|         else { | |
|           num_brick_rows_minus1[ i ] | ue(v) |
|           for(j = 0;j < num_brick_rows_minus1[ i ]; j++ ) | |
|             brick_row_height_minus1 [ i ][ j ] | ue(v) |
|         } | |
|       } | |
|     } | |
|     single_brick_per_slice_flag | u(1) |
|     if( !single_brick_per_slice_flag ) | |
|       rect_slice_flag | u(1) |
|     if( rect_slice_flag && !single_brick_per_slice_flag ) { | |
|       num_slices_in_pic_minus1 | ue(v) |
|       for( i = 0; i <= num_slices_in_pic_minus1; i++ ) { | |
|         if( i > 0 ) | |
|           top_left_brick_idx [ i ] | u(v) |
|         bottom_right_brick_idx_delta[ i ] | u(v) |
|       } | |
|     } | |
|     <u>*loop_filter_across_bricks_enabled_flag*</u> | <u>*u(1)*</u> |
|     <u>*if(loop_filter_across_bricks_enabled_flag)*</u> | |
|       <u>*loop_filter_across_slices_enabled_flag*</u> | <u>*u(1)*</u> |
|   } | |
|   if( rect_slice_flag ) { | |
|     signalled_slice_id_flag | u(1) |
|     if( signalled_slice_id_flag ) { | |
|       signalled_slice_id_length_minus1 | ue(v) |
|       for( i = 0; i <= num_slices_in_pic_minus1; i++ ) | |
|         slice_id[ i ] | u(v) |
|     } | |
|   } | |
|   entropy_coding_sync_enabled_flag | u(1) |
|   cabac_init_present_flag | u(1) |
|   for( i = 0; i < 2; i++ ) | |
|     num_ref_idx_default_active_minus1[ i ] | ue(v) |
|   rpl1_idx_present_flag | u(1) |
|   init_qp_minus26 | se(v) |
|   transform_skip_enabled_flag | u(1) |
|   if( transform_skip_enabled_flag ) | |

-continued

| 7.3.2.4 Picture parameter set RBSP syntax | |
|---|---|
| pic_parameter_set_rbsp( ) { | Descriptor |
|    log2_transform_skip_max_size_minus2 | ue(v) |
|    cu_qp_delta_enabled_flag | u(1) |
|    if( cu_qp_delta_enabled_flag ) | |
|       cu_qp_delta_subdiv | ue(v) |
|    pps_cb_qp_offset | se(v) |
|    pps_cr_qp_offset | se(v) |
|    pps_joint_cbcr_qp_offset | se(v) |
|    pps_slice_chroma_qp_offsets_present_flag | u(1) |
|    weighted_pred_flag | u(1) |
|    weighted_bipred_flag | u(1) |
|    deblocking_filter_control_present_flag | u(1) |
|    if( deblocking_filter_control_present_flag ) { | |
|       deblocking_filter_override_enabled_flag | u(1) |
|       pps_deblocking_filter_disabled_flag | u(1) |
|       if( !pps_deblocking_filter_disabled_flag) { | |
|          pps_beta_offset_div2 | se(v) |
|          pps_tc_offset_div2 | se(v) |
|       } | |
|    } | |
|    pps_loop_filter_across_virtual_boundaries disabled_flag | u(1) |
|    if( pps_loop_filter_across_virtual_boundaries_disabled_flag ) { | |
|       pps_num_ver_virtual_boundaries | u(2) |
|       for( i = 0; i < pps_num_ver_virtual_boundaries; i++ ) | |
|          pps_virtual_boundaries_pos_x[ i ] | u(v) |
|       pps_num_hor_virtual_boundaries | u(2) |
|       for( i = 0; i < pps_num_hor_virtual_boundaries; i++ ) | |
|          pps_virtual_boundaries_pos_y[ i ] | u(v) |
|    } | |
|    pps_extension_flag | u(1) |
|    if( pps_extension_flag ) | |
|       while( more_rbsp_data( ) ) | |
|          pps_extension_data_flag | u(1) |
|    rbsp_trailing_bits( ) | |
| } | | loop_filter_across_bricks_enabled_flag equal to 1 specifies that in-loop filtering operations may be performed across brick boundaries in pictures referring to the PPS. loop_filter_across_bricks_enabled_flag equal to 0 specifies that in-loop filtering operations are not performed across brick boundaries in pictures referring to the PPS. The in-loop filtering operations include the deblocking filter, sample adaptive offset filter, and adaptive loop filter operations. When not present, the value of loop_filter_across_bricks_enabled_flag is inferred to be equal to 1.

loop_filter_across_slices_enabled_flag equal to 1 specifies that in-loop filtering operations may be performed across slice boundaries in pictures referring to the PPS. loop_filter_across_slice_enabled_flag equal to 0 specifies that in-loop filtering operations are not performed across slice boundaries in pictures referring to the PPS. The in-loop filtering operations include the deblocking filter, sample adaptive offset filter, and adaptive loop filter operations. When not present, the value of loop_filter_across_slices_enabled_flag is inferred to be equal to 0.

pps_loop_filter_across_virtual_boundaries_disabled_flag equal to 1 specifies that the in-loop filtering operations are disabled across the virtual boundaries in pictures referring to the PPS. pps_loop_filter_across_virtual_boundaries_disabled_flag equal to 0 specifies that no such disabling of in-loop filtering operations is applied in pictures referring to the PPS. The in-loop filtering operations include the deblocking filter, sample adaptive offset filter, and adaptive loop filter operations. When not present, the value of pps_loop_filter_across_virtual_boundaries_disabled_flag is inferred to be equal to 0.

pps_num_ver_virtual_boundaries specifies the number of pps_virtual_boundaries_pos_x[i] syntax elements that are present in the PPS. When pps_num_ver_virtual_boundaries is not present, it is inferred to be equal to 0.

8.8.5.2 Coding Tree Block Filtering Process For Luma Samples

Inputs of this process are:
  a reconstructed luma picture sample array $recPicture_L$ prior to the adaptive loop filtering process,
  a filtered reconstructed luma picture sample array $alfPicture_L$,
  a luma location (xCtb,yCtb) specifying the top-left sample of the current luma coding tree block relative to the top left sample of the current picture.

Output of this process is the modified filtered reconstructed luma picture sample array $alfPicture_L$.

The derivation process for filter index clause 8.8.5.3 is invoked with the location (xCtb, yCtb) and the reconstructed luma picture sample array $recPicture_L$ as inputs, and filtIdx[x][y] and transposeIdx[x][y] with x, y=0 . . . CtbSizeY−1 as outputs.

For the derivation of the filtered reconstructed luma samples $alfPicture_L$[x][y], each reconstructed luma sample inside the current luma coding tree block $recPicture_L$[x][y] is filtered as follows with x, y=0 . . . CtbSizeY−1:

The array of luma filter coefficients f[j] and the array of luma clipping values c[j] corresponding to the filter specified by filtIdx[x][y] is derived as follows with j=0 . . . 11:
      If   AlfCtbFiltSetIdxY[xCtb»Log2Ctb   Size][yCtb»Log2CtbSize] is less than 16, the following applies:

$i = \text{AlfCtbFiltSetIdxY}[x\text{Ctb} \gg \text{Log2CtbSize}]$
      $[y\text{Ctb} \gg \text{Log2CtbSize}]$                                  (8-1172)

$f[j] = \text{AlfFixFiltCoeff}[\text{AlfClassToFiltMap}[i][\text{filtidx}]][j]$    (8-1173)

$c[j] = 2^{BitdepthY}$                                                        (8-1174)

Otherwise (AlfCtbFiltSetIdxY[xCtb»Log2CtbSize][yCtb»Log2Ctb Size] is greater than or equal to 16, the following applies:

$i = \text{slice\_alf\_aps\_id\_luma}[\text{AlfCtbFiltSetIdxY}$
      $[x\text{Ctb} \gg \text{Log2CtbSize}][y\text{Ctb} \gg \text{Log2CtbSize}]-16]$    (8-1175)

$f[j] = \text{AlfCoeff}_L[i][\text{filtIdx}[x][y]][j]$                           (8-1176)

$c[j] = \text{AlfClip}_L[i][\text{filtIdx}[x][y]][j]$                            (8-1177)

The luma filter coefficients and clipping values index idx are derived depending on transposeIdx[x][y] as follows:
  If transposeIndex[x][y] is equal to 1, the following applies:

$idx[\ ] = \{9,4,10,8,1,5,11,7,3,0,2,6\}$                                     (8-1178)

Otherwise, if transposeIndex[x][y] is equal to 2, the following applies:

$idx[\ ] = \{0,3,2,1,8,7,6,5,4,9,10,11\}$                                     (8-1179)

Otherwise, if transposeIndex[x][y] is equal to 3, the following applies:

$idx[\ ] = \{9,8,10,4,3,7,11,5,1,0,2,6\}$                                     (8-1180)

Otherwise, the following applies:

$idx[\ ] = \{0,1,2,3,4,5,6,7,8,9,10,11\}$                                     (8-1181)

The locations ($h_{x+i}$, $v_{y+j}$) for each of the corresponding luma samples (x,y) inside the given array recPicture of luma samples with i,j=−3 ... 3 are derived as follows:
  If pps_loop_filter_across_virtual_boundaries_disabled_flag is equal to 1 and xCtb+x−PpsVirtualBoundariesPosX[n] is greater than or equal to 0 and less than 3 for any n=0 ... pps_num_ver_virtual_boundaries−1, the following applies:

$h_{x+i} = \text{Clip3}(\text{PpsVirtualBoundariesPosX}[n],$
      $\text{pic\_width\_in\_luma\_samples}-1, x\text{Ctb}+x+i)$                (8-1182)

Otherwise, if pps_loop_filter_across_virtual_boundaries_disabled_flag is equal to 1 and PpsVirtualBoundariesPosX[n]−xCtb−x is greater than 0 and less than 4 for any n=0 ... pps_num_ver_virtual_boundaries−1, the following applies:

$h_{x+i} = \text{Clip3}(0, \text{PpsVirtualBoundariesPosX}[n]-1, x\text{Ctb}+x+i)$    (8-1183)

Otherwise, the following applies:

$h_{x+i} = \text{Clip3}(0, \text{pic\_width\_in\_luma\_samples}-1, x\text{Ctb}+x+i)$    (8-1184)

If pps_loop_filter_across_virtual_boundaries_disabled_flag is equal to 1 and yCtb+y−PpsVirtualBoundariesPosY[n] is greater than or equal to 0 and less than 3 for any n=0 ... pps_num_hor_virtual_boundaries−1, the following applies:

$v_{y+j} = \text{Clip3}(\text{PpsVirtualBoundariesPosY}[n], \text{pic\_height\_in\_luma\_samples}-1, y\text{Ctb}+y+j)$    (8-1185)

Otherwise, if pps_loop_filter_across_virtual_boundaries_disabled_flag is equal to 1 and PpsVirtualBoundariesPosY[n]−yCtb−y is greater than 0 and less than 4 for any n=0 ... pps_num_hor_virtual_boundaries−1, the following applies:

$v_{y+j} = \text{Clip3}(0, \text{PpsVirtualBoundariesPosY}[n]-1, y\text{Ctb}+y+j)$    (8-1186)

Otherwise, the following applies:

$v_{y+j} = \text{Clip3}(0, \text{pic\_height\_in\_luma\_samples}-1, y\text{Ctb}+y+j)$    (8-1187)

The variable applyVirtualBoundary is derived as follows:
  If one or more of the following conditions are true, applyVirtualBoundary is set equal to 0:
    The bottom boundary of the current coding tree block is the bottom boundary of the picture.
    The bottom boundary of the current coding tree block is the bottom boundary of the brick and loop_filter_across_bricks_enabled_flag is equal to 0.
    The bottom boundary of the current coding tree block is the bottom boundary of the slice and loop_filter_across_slices_enabled_flag is equal to 0.
    The bottom boundary of the current coding tree block is one of the bottom virtual boundaries of the picture and pps_loop_filter_across_virtual_boundaries_disabled_flag is equal to 1.
  Otherwise, applyVirtualBoundary is set equal to 1.

The reconstructed sample offsets r1, r2 and r3 are specified in Table 8-22 according to the horizontal luma sample position y and apply VirtualBoundary.

The variable curr is derived as follows:

$\text{curr} = \text{recPicture}_L[h_x, v_y]$                                  (8-1188)

The variable sum is derived as follows:

$\text{sum} = f[idx[0]]*(\text{Clip3}(-c[idx[0]], c[idx[0]], \text{recPicture}_L[h_x, v_{y+r3}]-\text{curr}) + \text{Clip3}(-c[idx[0]], c[idx[0]], \text{recPicture}_L[h_x, v_{y-r3}]-\text{curr})) +$ $f[idx[1]]*(\text{Clip3}(-c[idx[1]], c[idx[1]], \text{recPicture}_L[h_{x+1}, v_{y+r2}]-\text{curr}) + \text{Clip3}(-c[idx[1]], c[idx[1]], \text{recPicture}_L[h_{x-1}, v_{y-r2}]-\text{curr})) +$ $f[idx[2]]*(\text{Clip3}(-c[idx[2]], c[idx[2]], \text{recPicture}_L[h_x, v_{y+r2}]-\text{curr}) + \text{Clip3}(-c[idx[2]], c[idx[2]], \text{recPicture}_L[h_x, v_{y-r2}]-\text{curr})) +$ $f[idx[3]]*(\text{Clip3}(-c[idx[3]], c[idx[3]], \text{recPicture}_L[h_{x-1}, v_{y+r2}]-\text{curr}) + \text{Clip3}(c-[idx[3]], c[idx[3]], \text{recPicture}_L[h_{x+1}, v_{y-r2}]-\text{curr})) +$ $f[idx[4]]*(\text{Clip3}(-c[idx[4]], c[idx[4]], \text{recPicture}_L[h_{x+2}, v_{y+r1}]-\text{curr}) + \text{Clip3}(-c[idx[4]], c[idx[4]], \text{recPicture}_L[h_{x-2}, v_{y-r1}]-\text{curr})) +$ $f[idx[5]]*(\text{Clip3}(-c[idx[5]], c[idx[5]], \text{recPicture}_L[h_{x+1}, v_{y+r1}]-\text{curr}) + \text{Clip3}(-c[idx[5]], c[idx[5]], \text{recPicture}_L[h_{x-1}, v_{y-r1}]-\text{curr})) +$ $f[idx[6]]*(\text{Clip3}(-c[idx[6]], c[idx[6]], \text{recPicture}_L[h_x, v_{y+r1}]-\text{curr}) + \text{Clip3}(-c[idx[6]], c[idx[6]], \text{recPicture}_L[h_x, v_{y-r1}]-\text{curr})) +$    (8-1189)

$f[idx[7]]*(\text{Clip3}(-c[idx[7]], c[idx[7]], \text{recPicture}_L[h_{x-1}, v_{y+r1}]-\text{curr}) + \text{Clip3}(-c[idx[7]], c[idx[7]], \text{recPicture}_L[h_{x+1}, v_{y-r1}]-\text{curr})) +$ $f[idx[8]]*(\text{Clip3}(-c[idx[8]], c[idx[8]], \text{recPicture}_L[h_{x-2}, v_{y+r1}]-\text{curr}) + \text{Clip3}(-c[idx[8]], c[idx[8]], \text{recPicture}_L[h_{x+2}, v_{y-r1}]-\text{curr})) +$ $f[idx[9]]*(\text{Clip3}(-c[idx[9]], c[idx[9]], \text{recPicture}_L[h_{x+3}, v_y]-\text{curr}) + \text{Clip3}(-c[idx[9]], c[idx[9]], \text{recPicture}_L[h_{x-3}, v_y]-\text{curr})) +$ $f[idx[10]]*(\text{Clip3}(-c[idx[10]],c[idx[10]],\text{recPicture}_L[h_{x+2},v_y]-\text{curr})+\text{Clip3}(-c[idx[10]],c[idx[10]],\text{recPicture}_L[h_{x-2},v_y]-\text{curr}))+$ $f[idx[11]]*(\text{Clip3}(-c[idx[11]], c[idx[11]], \text{recPicture}_L[h_{x+1}, v_y]-\text{curr})+\text{Clip3}(-c[idx[11]], c[idx[11]], \text{recPicture}_L[h_{x-1}, v_y]-\text{curr}))$ sum=curr+((sum+64)»7)  (8-1190)

The modified filtered reconstructed luma picture sample alfPicture$_L$[xCtb+x][yCtb+y] is derived as follows:
If pcm_loop_filter_disabled_flag and pcm_flag[xCtb+x][yCtb+y] are both equal to 1, the following applies:

alfPicture$_L$[xCtb+x][yCtb+y]=recPicture$_L$[h$_x$,v$_y$]  (8-1191)

Otherwise (pcm_loop_filter_disabled_flag is equal to 0 or pcm_flag[x][y] is equal 0), the following applies:

alfPicture$_L$[xCtb+x][yCtb+y]=Clip3(0,(1«BitDepth$\gamma$)−1,sum)  (8-1192)

TABLE 8-22

Specification of r1, r2, and r3 according to the horizontal luma sample position y and applyVirtualBoundary

| condition | r1 | r2 | r3 |
|---|---|---|---|
| ( y = = CtbSizeY − 5 \|\| y = = CtbSizeY − 4 ) && ( applyVirtualBoundary = = 1 ) | 0 | 0 | 0 |
| ( y = = CtbSizeY − 6 \|\| y = = CtbSizeY − 3 ) && ( applyVirtualBoundary = = 1 ) | 1 | 1 | 1 |
| ( y = = CtbSizeY − 7 \|\| y = = CtbSizeY − 2 ) && ( apply VirtualBoundary = = 1 ) | 1 | 2 | 2 |
| otherwise | 1 | 2 | 3 |

8.8.5.4 Coding Tree Block Filtering Process For Chroma Samples

Inputs of this process are:
  a reconstructed chroma picture sample array recPicture prior to the adaptive loop filtering process,
  a filtered reconstructed chroma picture sample array alfPicture,
  a chroma location (xCtbC, yCtbC) specifying the top-left sample of the current chroma coding tree block relative to the top left sample of the current picture.

Output of this process is the modified filtered reconstructed chroma picture sample array alfPicture.

The width and height of the current chroma coding tree block ctbWidthC and ctbHeightC is derived as follows:

ctbWidthC=CtbSizeY/SubWidthC  (8-1230)

ctbHeightC=CtbSizeY/SubHeightC  (8-1231)

For the derivation of the filtered reconstructed chroma samples alfPicture[x][y], each reconstructed chroma sample inside the current chroma coding tree block recPicture[x][y] is filtered as follows with x=0 . . . ctbWidthC−1, y=0 . . . ctbHeightC−1:
  The locations (h$_{x+i}$, v$_{y+j}$) for each of the corresponding chroma samples (x,y) inside the given array recPicture of chroma samples with i, j=−2 . . . 2 are derived as follows:
    If pps_loop_filter_across_virtual_boundaries_disabled_flag is equal to 1 and xCtbC+x−PpsVirtualBoundariesPosX[n]/SubWidthC is greater than or equal to 0 and less than 2 for any n=0 . . . pps_num_ver_virtual_boundaries−1, the following applies:

h$_{x+i}$=Clip3(PpsVirtualBoundariesPosX[n]/SubWidthC  (8-1232)
pic_width_in_luma_samples/SubWidthC−1, xCtbC+x+i)

Otherwise, if pps_loop_filter_across_virtual_boundaries_disabled_flag is equal to 1 and PpsVirtualBoundariesPosX[n]/SubWidthC−xCtbC−x is greater than 0 and less than 3 for any n=0 . . . pps_num_ver_virtual_boundaries−1, the following applies:

h$_{x+i}$=Clip3(0, PpsVirtualBoundariesPosX[n]/SubWidthC−1, xCtbC+x+i)  (8-1233)

Otherwise, the following applies:

h$_{x+i}$=Clip3(0, pic_width_in_luma_samples/SubWidthC−1, xCtbC+x+i)  (8-1234)

If pps_loop_filter_across_virtual_boundaries_disabled_flag is equal to 1 and yCtbC+y−PpsVirtualBoundariesPosY[n]/SubHeightC is greater than or equal to 0 and less than 2 for any n=0 . . . pps_num_hor_virtual_boundaries−1, the following applies:

v$_{y+j}$=Clip3(PpsVirtualBoundariesPosY[n]/SubHeightC−1 pic_height_in_luma_samples/SubHeightC−1, yCtbC+y+j)  (8-1235)

Otherwise, if pps_loop_filter_across_virtual_boundaries_disabled_flag is equal to 1 and PpsVirtualBoundariesPosY[n]/SubHeightC−yCtbC−y is greater than 0 and less than 3 for any n=0 . . . pps_num_hor_virtual_boundaries−1, the following applies:

v$_{y+j}$=Clip3(0, PpsVirtuaBoundariesPosY[n]/SubHeightC−1, yCtbC+y+j)  (8-1236)

Otherwise, the following applies:

v$_{y+j}$=Clip3(0, pic_height_in_luma_samples/SubHeightC−1, yCtbC+y+j)  (8-1237)

The variable apply VirtualBoundary is derived as follows:
  If one or more of the following conditions are true, applyVirtualBoundary is set equal to 0:
    The bottom boundary of the current coding tree block is the bottom boundary of the picture.
    The bottom boundary of the current coding tree block is the bottom boundary of the brick and loop_filter_across_bricks_enabled_flag is equal to 0.
    The bottom boundary of the current coding tree block is the bottom boundary of the slice and loop_filter_across_slices_enabled_flag is equal to 0.
    The bottom boundary of the current coding tree block is one of the bottom virtual boundaries of the picture and pps_loop_filter_across_virtual_boundaries_disabled_flag is equal to 1.
  Otherwise, applyVirtualBoundary is set equal to 1.

The reconstructed sample offsets r1 and r2 are specified in Table 8-22 according to the horizontal luma sample position y and apply VirtualBoundary.

The variable curr is derived as follows:

curr=recPicture[h$_x$,v$_y$]  (8-1238)

The array of chromafilter coefficients f[j] and the array of chroma clipping values c[j] is derived as follows with j=0 . . . 5:

f[j]=AlfCoeff$_C$[slice_alf_aps_id_chroma][j]  (8-1239)

c[j]=AlfClip$_C$[slice_alf_aps_id_chroma][j]  (8-1240)

The variable sum is derived as follows:

$$\text{sum} = f[0]*(\text{Clip3}(-c[0],c[0],\text{recPicture}[h_x,v_{y+r2}]-\text{curr})+\text{Clip3}(-c[0], c[0], \text{recPicture}[h_x, v_{y-r2}]-\text{curr}))$$

$$f[1]*(\text{Clip3}(-c[1],c[1],\text{recPicture}[h_{x+1},v_{y+r1}]-\text{curr})+\text{Clip3}(-c[1],c[1],\text{recPicture}[h_{x-1},v_{y-r1}]-\text{curr}))$$

$$f[2]*(\text{Clip3}(-c[2],c[2],\text{recPicture}[h_x,v_{y+r1}]-\text{curr})+\text{Clip3}(-c[2],c[2],\text{recPicture}[h_x,v_{y-r1}]-\text{curr}))+ \quad (8\text{-}1241)$$

$$f[3]*(\text{Clip3}(-c[3],c[3],\text{recPicture}[h_{x-1},v_{y+r1}]-\text{curr})+\text{Clip3}(-c[3],c[3],\text{recPicture}[h_{x+1},v_{y-r1}]-\text{curr}))$$

$$f[4]*(\text{Clip3}(-c[4],c[4],\text{recPicture}[h_{x+2},v_y]-\text{curr})+\text{Clip3}(-c[4],c[4],\text{recPicture}[h_{x-2},v_y]-\text{curr}))$$

$$f[5]*(\text{Clip3}(-c[5],c[5],\text{recPicture}[h_{x+1},v_y]-\text{curr})+\text{Clip3}(-c[5],c[5],\text{recPicture}[h_{x-1},v_y]-\text{curr}))$$

$$\text{sum}=\text{curr}+(\text{sum}+64)\gg 7 \quad (8\text{-}1242)$$

The modified filtered reconstructed chroma picture sample alfPicture[xCtbC+x][yCtbC+y] is derived as follows:
  If pcm_loop_filter_disabled_flag and pcm_flag[(xCtbC+x)*SubWidthC][(yCtbC+y)*SubHeightC] are both equal to 1, the following applies:

$$\text{alfPicture}[xCtbC+x][yCtbC+y]=\text{recPicture}_L[h_x,v_y] \quad (8\text{-}1243)$$

Otherwise (pcm_loop_filter_disabled_flag is equal to 0 or pcm_flag[x][y] is equal 0), the following applies:

$$\text{alfPicture}[xCtbC+x][yCtbC+y]=\text{Clip3}(0,(1\ll\text{BitDepth}_C)-1,\text{sum}) \quad (8\text{-}1244)$$

2.11 Examples of CTU Processing

According to the current VVC design, if the bottom boundary of one CTB is a bottom boundary of a slice/brick, the ALF virtual boundary handling method is disabled. For example, one picture is split to multiple CTUs and 2 slices as depicted FIG. 19.

Suppose the CTU size is M×M (e.g., M=64), according to the virtual boundary definition, the last 4 lines within a CTB are treated below a virtual boundary. In hardware implementation, the following apply:
  If the bottom boundary of the CTB is the bottom boundary of a picture (e.g., CTU-D), it processes the (M+4)×M block including 4 lines from above CTU row and all lines in current CTU.
  Otherwise, if the bottom boundary of the CTB is the bottom boundary of a slice (or brick) (e.g., CTU-C) and loop_filter_across_slice_enabled_flag (or loop_filter_across_bricks_enabled_flag) is equal to 0, it processes the (M+4)×M block including 4 lines from above CTU row and all lines in current CTU.
  Otherwise, if a CTU/CTB in the first CTU row in a slice/brick/tile (e.g., CTU-A), it processes the M'(M−4) block excluding the last 4 lines.
  Otherwise, if a CTU/CTB in not in the first CTU row of a slice/brick/tile (e.g., CTU-B) and not in the last CTU row of a of a slice/brick/tile, it processes the M×M block including 4 lines from above CTU row and excluding the last 4 lines in current CTU.

Figure 19:
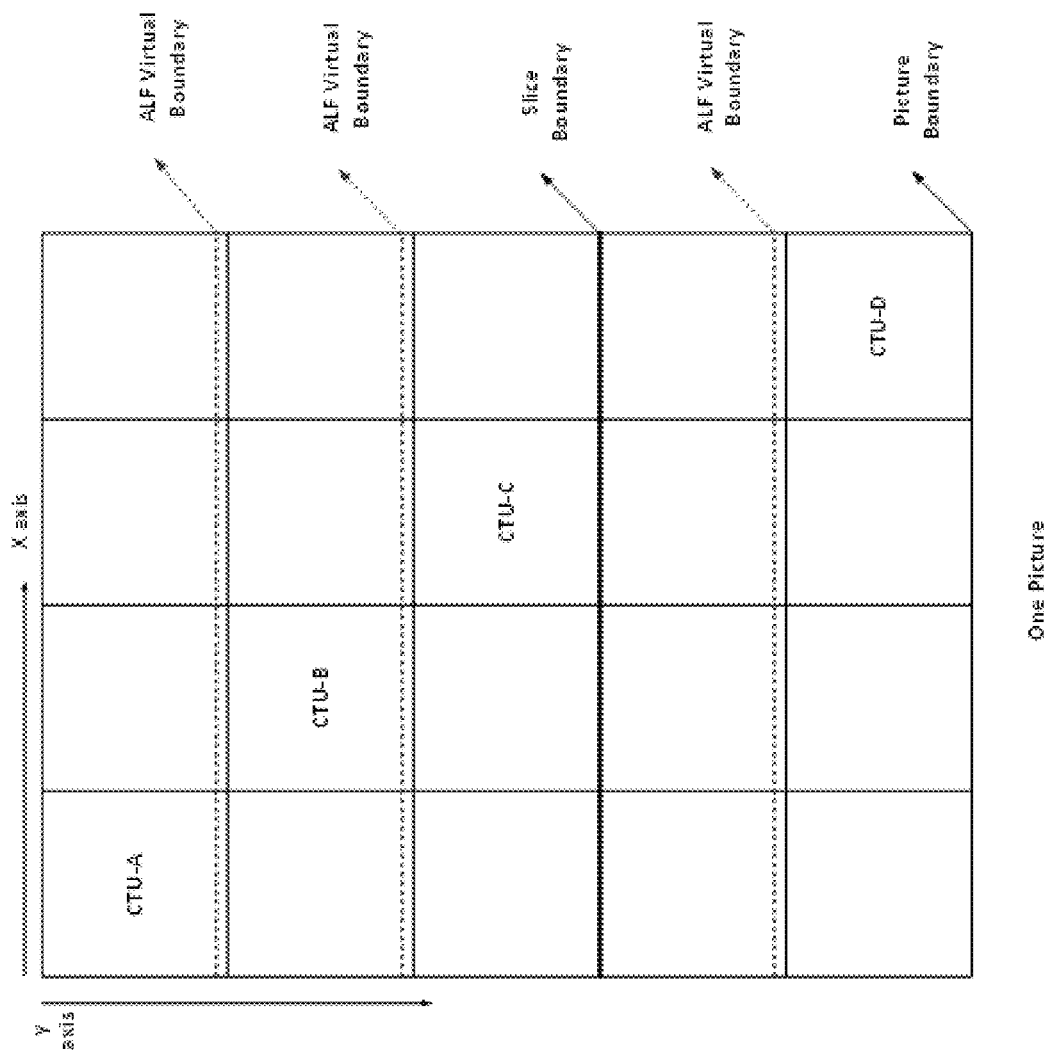
FIG. 19 illustrates an example of a modified adaptive loop filter.

FIG. 19 shows an example of processing of CTUs in a picture.

2.12 360-Degree Video Coding

The horizontal wrap around motion compensation in the VTM5 is a 360-specific coding tool designed to improve the visual quality of reconstructed 360-degree video in the equi-rectangular (ERP) projection format. In conventional motion compensation, when a motion vector refers to samples beyond the picture boundaries of the reference picture, repetitive padding is applied to derive the values of the out-of-bounds samples by copying from those nearest neighbors on the corresponding picture boundary. For 360-degree video, this method of repetitive padding is not suitable, and could cause visual artefacts called "seam artefacts" in a reconstructed viewport video. Because a 360-degree video is captured on a sphere and inherently has no "boundary," the reference samples that are out of the boundaries of a reference picture in the projected domain can always be obtained from neighboring samples in the spherical domain. For a general projection format, it may be difficult to derive the corresponding neighboring samples in the spherical domain, because it involves 2D-to-3D and 3D-to-2D coordinate conversion, as well as sample interpolation for fractional sample positions. This problem is much simpler for the left and right boundaries of the ERP projection format, as the spherical neighbors outside of the left picture boundary can be obtained from samples inside the right picture boundary, and vice versa.

Figure 20:
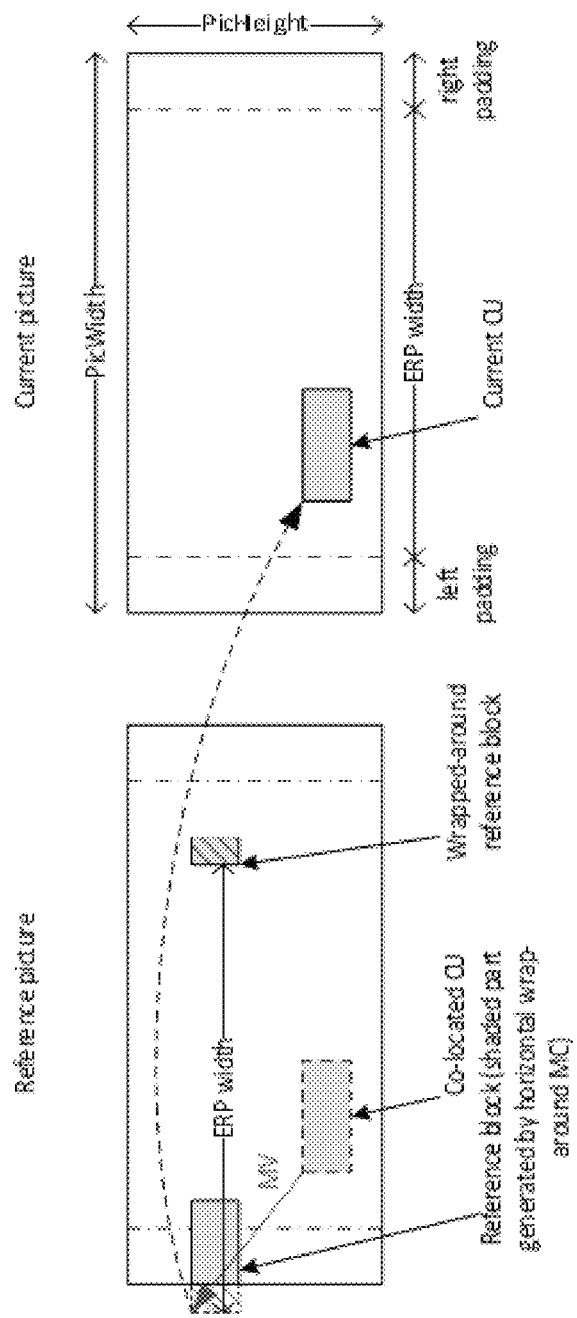
FIG. 20 shows example of processing CTUs in a video picture.

FIG. 20 shows an example of horizontal wrap around motion compensation in VVC.

The horizontal wrap around motion compensation process is as depicted in FIG. 20. When a part of the reference block is outside of the reference picture's left (or right) boundary in the projected domain, instead of repetitive padding, the "out-of-boundary" part is taken from the corresponding spherical neighbors that are of the reference picture toward the right (or left) boundary in the projected domain. Repetitive padding is only used for the top and bottom picture boundaries. As depicted in FIG. 20, the horizontal wrap around motion compensation can be combined with the non-normative padding method often used in 360-degree video coding In VVC, this is achieved by signaling a high-level syntax element to indicate the wrap-around offset, which should be set to the ERP picture width before padding; this syntax is used to adjust the position of horizontal wrap around accordingly. This syntax is not affected by the specific amount of padding on the left and right picture boundaries, and therefore naturally supports asymmetric padding of the ERP picture, e.g., when left and right padding are different. The horizontal wrap around motion compensation provides more meaningful information for motion compensation when the reference samples are outside of the reference picture's left and right boundaries.

Figure 24:
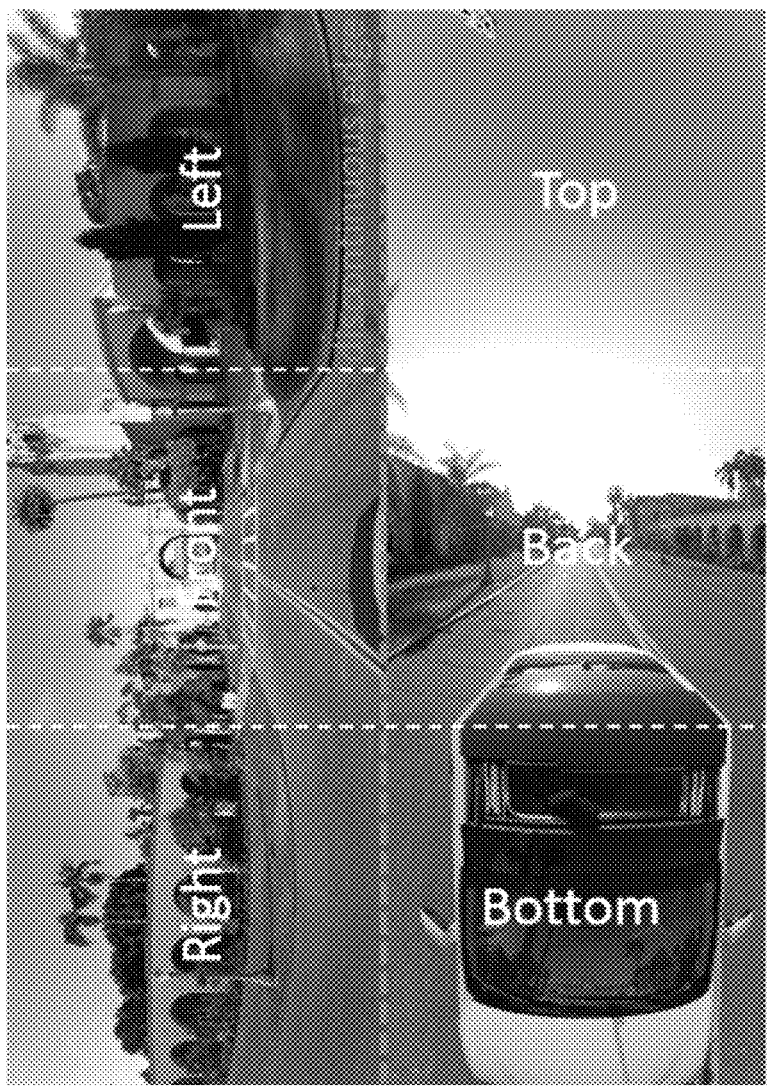
FIG. 24 shows an example of an image of HEC in 3×2 layout.

For projection formats composed of a plurality of faces, no matter what kind of compact frame packing arrangement is used, discontinuities appear between two or more adjacent faces in the frame packed picture. For example, considering the 3×2 frame packing configuration depicted in FIG. 24, the three faces in the top half are continuous in the 3D geometry, the three faces in the bottom half are continuous in the 3D geometry, but the top and bottom halves of the frame packed picture are discontinuous in the 3D geometry. If in-loop filtering operations are performed across this discontinuity, face seam artifacts may become visible in the reconstructed video.

To alleviate face seam artifacts, in-loop filtering operations may be disabled across discontinuities in the frame-packed picture. A syntax was proposed to signal vertical and/or horizontal virtual boundaries across which the in-loop filtering operations are disabled. Compared to using two tiles, one for each set of continuous faces, and to disable in-loop filtering operations across tiles, the proposed signaling method is more flexible as it does not require the face size to be a multiple of the CTU size 2.13 Example Sub-Picture Based Motion-Constrained Independent Regions In some embodiments, the following features are included:

1) Pictures may be divided into sub-pictures.

2) The indication of existence of sub-pictures is indicated in the SPS, along with other sequence-level information of sub-pictures.

3) Whether a sub-picture is treated as a picture in the decoding process (excluding in-loop filtering operations) can be controlled by the bitstream.

4) Whether in-loop filtering across sub-picture boundaries is disabled can be controlled by the bitstream for each sub-picture. The DBF, SAO, and ALF processes are updated for controlling of in-loop filtering operations across sub-picture boundaries.

5) For simplicity, as a starting point, the sub-picture width, height, horizontal offset, and vertical offset are signalled in units of luma samples in SPS. Sub-picture boundaries are constrained to be slice boundaries.

6) Treating a sub-picture as a picture in the decoding process (excluding in-loop filtering operations) is specified by slightly updating the coding_tree_unit( ) syntax, and updates to the following decoding processes:

The derivation process for (advanced) temporal luma motion vector prediction

The luma sample bilinear interpolation process

The luma sample 8-tap interpolation filtering process

The chroma sample interpolation process

7) Sub-picture IDs are explicitly specified in the SPS and included in the tile group headers to enable extraction of sub-picture sequences without the need of changing VCL NAL units.

Output sub-picture sets (OSPS) are proposed to specify normative extraction and conformance points for sub-pictures and sets thereof.

3. Technical Problems Solved by the Solutions Provided in the Present Document

The current VVC design has the following problems:

1. The current setting of enabling ALF virtual boundary is dependent on whether the bottom boundary of a CTB is a bottom boundary of a picture. If it is true, then ALF virtual boundary is disabled, such as CTU-D in FIG. 19. However, it is possible that a bottom boundary of a CTB is outside a bottom boundary of a picture, such as 256×240 picture is split to 4 128×128 CTUs, in this case, the ALF virtual boundary would be wrongly set to true for the last 2 CTUs which has samples outside of the bottom picture boundary.

2. The way for handling ALF virtual boundary is disabled for bottom picture boundary and slice/tile/brick boundary. Disabling VB along slice/brick boundary may create pipeline bubble or require processing 68 lines per Virtual pipeline data units (VPDU, 64×64 in VVC) assuming the LCU size to be 64×64. For example:

a. For decoders not knowing the slice/brick/tile boundaries upfront (w.e. low-delay applications), the ALF line buffers need to be restored. Whether the content in the line buffers get used or not for the ALF filtering depends on whether the current CTU is also a slice/brick/tile boundary CTU, this information, however, is unknown until the next slice/brick/tile is decoded.

b. For decoders knowing the slice/brick/tile boundaries upfront, either the decoders need to live with pipeline bubbles (very unlikely) or run the ALF at a speed of 68 lines per 64×64 VDPU all the time (overprovision), to avoid using the ALF line buffers.

Figure 25:
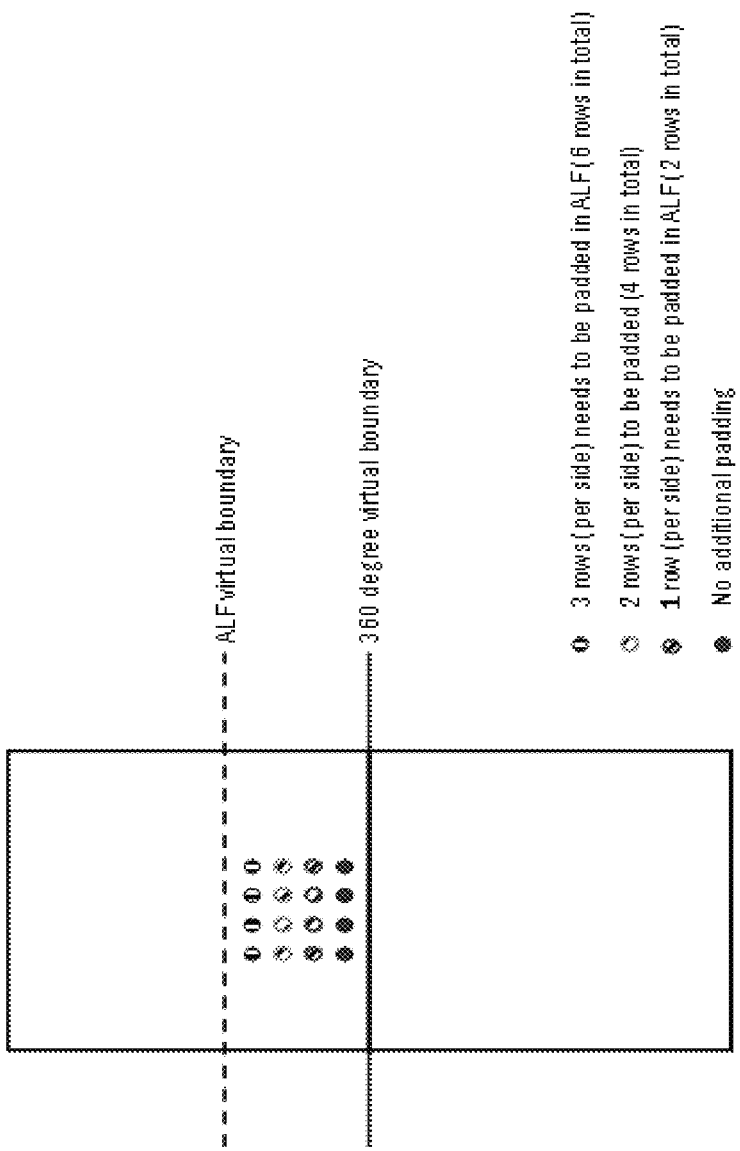
FIG. 25 shows an example of number of padded lines for samples of two kinds of boundaries.

3. Different ways for handling virtual boundary and video unit boundary, e.g., different padding methods are existing. Meanwhile, more than one padding methods may be performed for a line when it is at multiple boundaries.

a. In one example, if the bottom boundary of a block is a 360 degree virtual boundary and ALF virtual boundary is also applied to this block, in this case, the padding method for 360 degree virtual boundary may be firstly applied to generate virtual samples below the 360 degree virtual boundary. Afterwards, these virtual samples located below the 360 degree virtual boundary are treated as being available. And the ALF 2-side padding method may be further applied according to FIG. 16 A-C. An example is depicted in FIG. 25.

4. The way for handling virtual boundary may be sub-optimal, since padded samples are utilized which may be less efficient.

5. When the non-linear ALF is disabled, the MALF and two-side padding methods would be able to generate the same results for filtering a sample which requires to access samples crossing virtual boundary. However, when the non-linear ALF is enabled, the two methods would bring different results. It would be beneficial to align the two cases.

4. Examples of Techniques and Embodiments

The listing below should be considered as examples to explain general concepts. The listed techniques should not be interpreted in a narrow way. Furthermore, these techniques can be combined in any manner.

The padding method used for ALF virtual boundaries may be denoted as 'Two-side Padding' wherein if one sample located at (i, j) is padded, then the corresponding sample located at (m, n) which share the same filter coefficient is also padded even the sample is available, as depicted in FIGS. 12-13.

The padding method used for picture boundaries/360-degree video virtual boundaries, normal boundaries (e.g. top and bottom boundaries) may be denoted as 'One-side Padding' wherein if one sample to be used is outside the boundaries, it is copied from an available one inside the picture.

The padding method used for 360-degree video left and right boundaries may be denoted as 'wrapping-base Padding' wherein if one sample to be used is outside the boundaries, it is copied using the motion compensated results.

In the following discussion, a sample is "at a boundary of a video unit" may mean that the distance between the sample and the boundary of the video unit is less or no greater than a threshold. A "line" may refer to samples at one same horizontal position or samples at one same vertical position. (e.g., samples in the same row and/or samples in the same column). Function Abs(x) is defined as follows:

$$\text{Abs}(x) = \begin{cases} x & ; \ x >= 0 \\ -x & ; \ x < 0 \end{cases}.$$

In the following discussion, a "virtual sample" refers to a generated sample which may be different from the reconstructed sample (may be processed by deblocking and/or SAO). A virtual sample may be used to conduct ALF for another sample. The virtual sample may be generated by padding.

'ALF virtual boundary handling method is enabled for one block' may indicate that applyVirtualBoundary in the specification is set to true. 'Enabling virtual boundary' may indicate that the current block is split to at least two parts by a virtual boundary and the samples located in one part are disallowed to utilize samples in the other part in the filtering process (e.g., ALF). The virtual boundary may be K rows above the bottom boundary of one block.

In the following descriptions, the neighboring samples may be those which are required for the filter classification and/or filtering process.

In the disclosure, a neighbouring sample is "unavailable" if it is out of the current picture, or current sub-picture, or current tile, or current slice, or current brick, or current CTU, or current processing unit (such as ALF processing unit or narrow ALF processing unit), or any other current video unit.

Figure 18B:
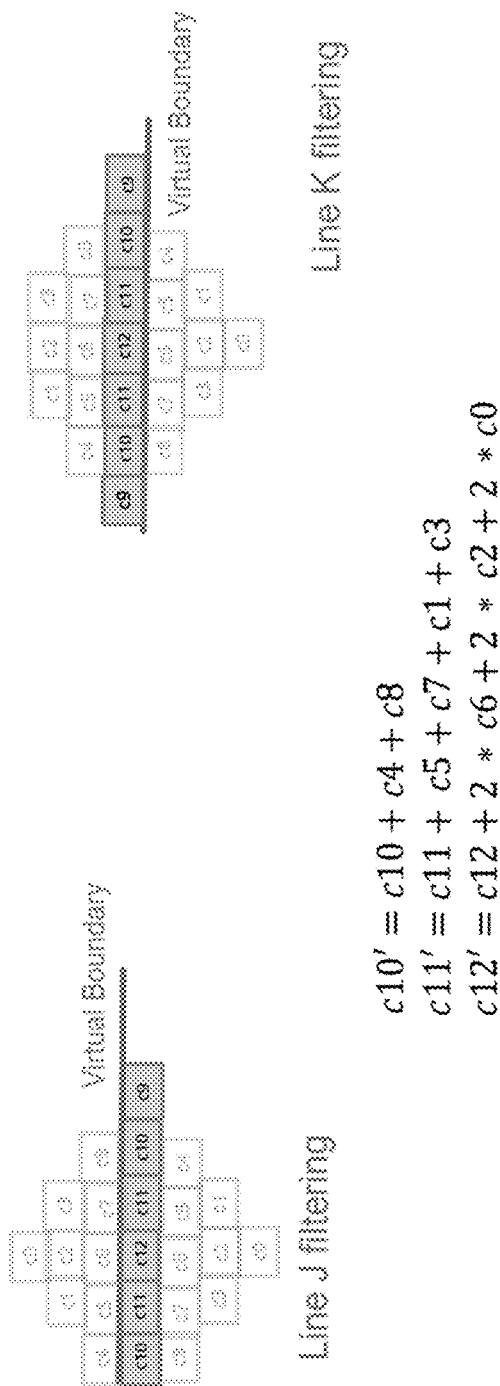
FIG. 18B shows an example of horizontal wrap around motion compensation.

1. The determination of 'The bottom boundary of the current coding tree block is the bottom boundary of the picture' is replaced by 'The bottom boundary of the current coding tree block is the bottom boundary of the picture or outside the picture'.
    a. Alternatively, furthermore, in this case, the ALF virtual boundary handling method may be disabled.
2. Whether to enable the usage of virtual samples (e.g., whether to enable virtual boundary (e.g., set applyVirtualBoundary to true or false)) in the in-loop filtering process may depend on the CTB size.
    a. In one example, applyVirtualBoundary is always set to false for a given CTU/CTB size, e.g., for the CTU/CTB size equal to K×L (e.g., K=L=4).
    b. In one example, applyVirtualBoundary is always set to false for certain CTU/CTB sizes no greater than or smaller than K×L (e.g., K=L=8).
    c. Alternatively, ALF is disabled for certain CTU/CTB sizes, such as 4×4, 8×8.
3. Whether to enable the usage of virtual samples (e.g., padded from reconstructed samples) in the in-loop filtering processes (e.g., ALF) may depend on whether the bottom boundary of the block is the bottom boundary of a video unit which is in a finer granularity compared to a picture (e.g., slice/tile/brick) or a virtual boundary.
    a. In one example, the ALF virtual boundary handling method maybe enabled (e.g, applyVirtualBoundary is set to true) for a coding tree block (CTB) if the bottom boundary of the CTB is the boundary of the video unit or a virtual boundary.
        i. Alternatively, furthermore, if the bottom boundary is not a bottom picture boundary or if the bottom boundary is outside the picture, the above method is enabled.
    b. When the bottom boundary of the current coding tree block is one of the bottom virtual boundaries of the picture and pps_loop_filter_across_virtual_boundaries_disabled_flag is equal to 1, the ALF virtual boundary handling method may still be enabled (e.g., applyVirtualBoundary is set to true).
    c. In one example, whether to enable the ALF virtual boundary handling method (e.g., value of applyVirtualBoundary) for a CTB may only depend on the relationship between the bottom boundary of the CTB and the bottom boundary of a picture.
        i. In one example, applyVirtualBoundary is set to false only if the bottom boundary of the CTB is the bottom boundary of a picture containing the CTB or if the bottom boundary is outside the picture.
        ii. In one example, applyVirtualBoundary is set to true when the bottom boundary of the CTB is NOT the bottom boundary of a picture containing the CTB.
    d. In one example, for when decoding the CTU-C in FIGS. 18A-18C, M×M samples may be filtered with K lines from above CTU and excluding K lines below the virtual boundary.
4. It is proposed to disable the usage of samples across brick/slice boundaries in the filtering process (e.g., ALF) even when the signaled controlling usage flags for loop filters crossing brick/slice boundaries (e.g., loop_filter_across_bricks_enabled_flag/loop_filter_across_slices_enabled_flag) is true.
    a. Alternatively, furthermore, the signaled loop_filter_across_bricks_enabled_flag/loop_filter_across_slices_enabled_f lag may only control the filtering process of deb locking filter and SAO excluding ALF.
    b. In one example, a virtual sample may be used instead of the reconstructed sample at the corresponding position to conduct ALF for another sample.
5. When one block (e.g., CTB) contains a sample located at a boundary of a video unit (such as slice/brick/tile/360-degree video virtual or normal boundaries boundaries/picture boundary), how to generate the virtual sample inside or outside the video unit (e.g., padding methods) for in-loop filtering such as ALF may be unified for different kinds of boundaries.
    a. Alternatively, furthermore, the method of virtual boundaries (e.g., the Two-side Padding method) may be applied to the block to handle the sample at boundary for in-loop filtering.
    b. Alternatively, furthermore, the above methods may be applied when the block contains a sample located at the bottom boundary of the video unit.
    c. In one example, when decoding the K lines of one block, if the K lines below the virtual boundary of the block (e.g., the last K lines in CTU-B of FIGS. 17A-17B) and the bottom boundary of the block is the bottom boundary of a video unit, virtual samples may be generated in the ALF classification/filtering process to avoid usage of other samples outside these K lines, e.g., the Two-side Padding method may be applied.
        i. Alternatively, ALF may be disabled for those last K lines.
    d. In one example, when one block is at multiple boundaries, pixels/samples used for ALF classification may be restricted to not across any of these multiple boundaries.
        i. In one example, for a sample, if certain neighboring sample of it is "unavailable" (e.g., across any of the multiple boundaries), alone or all kinds of gradients/directionality may not be calculated for the sample.
            1. In one example, gradients of the sample may be treated as zero.
            2. In one example, gradients of the sample may be treated as "unavailable" and may not be added to the activity (e.g., defined in Eq. (8) of section 2.6.1.1) derived in the ALF classification process.
        ii. In one example, the activity/directionality derived in the ALF classification process may be scaled by a factor when only partial samples used in ALF classification process are "available" (e.g., not across any of these boundaries).
  iii. In one example, for a boundary block, suppose the gradients/directionality are required to be calculated for N samples in the ALF classification process, and the gradients can only be calculated for M samples (e.g., if certain neighboring sample of a sample is not "available", then the gradient cannot be calculated for it), then the activity may be multiplied by N/M.
    1. Alternatively, it may be multiplied by a factor dependent on N/M. E.g., the number may be of MN (N is an integer), for example, M=2.
  e. In one example, when one line is at multiple boundaries (e.g., the distance between the line to the boundary is less than a threshold), the padding process is performed only once regardless how many boundaries it may belong to.
    i. Alternatively, furthermore, how many neighboring lines shall be padded may be dependent on the position of the current line relative to all the boundaries.
    ii. For example, how many neighboring lines shall be padded may be decided by the distances between the current line and the two boundaries, such as when the current line is within two boundaries, with the two boundaries being above and below.
    iii. For example, how many neighboring lines shall be padded may be decided by the distance between the current line and the nearest boundary, such as when the current line is within two boundaries, with the two boundaries being above and below.
    iv. For example, how many neighboring lines shall be padded may be calculated for each boundary independently, and the maximum one is selected as the final padded line number.
    v. In one example, how many neighboring lines shall be padded may be decided for each side (e.g., the above side and the below side) of the line.
    vi. In one example, for the two-side padding method, how many neighboring lines shall be padded may be decided jointly for the two sides.
    vii. Alternatively, furthermore, the 2-side padding method used by ALF is applied.
  f. In one example, when one line is at multiple boundaries and there is at least one boundary in each side (e.g., the above side and the below side) of the line, ALF may be disabled for it.
  g. In one example, when the number of the padded lines required by the current line is larger than a threshold, ALF may be disabled for the current line.
    i. In one example, when the number of the padded lines in any side is larger than a threshold, ALF may be disabled for the current line.
    ii. In one example, when the total number of the padded lines in both sides is larger than a threshold, ALF may be disabled for the current line.
  h. Alternatively, furthermore, the above methods may be applied when the block contains a sample located at the bottom boundary of the video unit and the in-loop filtering such as ALF is enabled for the block.
  i. Alternatively, furthermore, the above methods may be applied under certain conditions, such as when the block contains a sample located at the bottom boundary of the video unit and filtering crossing the boundaries is disallowed (e.g., pps_loop_filter_across_virtual_boundaries_disabled_flag/loop_filter_across_slices_enabled_flag/loop_filter_across_slices_enabled_flag is true).
  j. Proposed method is also applicable to samples/blocks located at vertical boundaries.
6. When a sample is of at least two boundaries of one block (e.g., at least one which is above current line is the ALF Virtual boundary, and below is the other boundary), how many lines to be padded is not purely decided by the distance between current line relative to the ALF virtual boundary. Instead, it is determined by the distances between current line relative to the two boundaries.
  a. In one example, the number of lines for per-side padding is set to (M−min (D0, D1)).
  b. In one example, the number of lines for per-side padding is set to (M−max (D0, D1)).
  c. For above example, D0, D1 denote the distance between current line and the above/below boundaries.
  d. For above example, M denote the number of lines that ALF virtual boundary is from the bottom of one CTU.
7. At least two ways of selecting samples in the ALF classification and/or ALF linear or non-linear filtering process may be defined, with one of them selects samples before any in-loop filtering method is applied; and the other selects samples after one or multiple in-loop filtering methods are applied but before ALF is applied.
  a. In one example, the selection of different ways may depend on the location of samples to be filtered.
  b. In one example, a sample at the bottom boundary of a video unit (such as CTB) may be selected with the first method when it is used in ALF for another sample. Otherwise (it is not at the boundary), the second method is selected.
8. It is proposed to disable the usage of samples crossing a VPDU boundary (e.g., a 64×64 region) in the filtering process.
  a. In one example, when a sample required by the ALF classification process is outside the VPDU boundary, or below the virtual boundary, it may be replaced by a virtual sample or the classification results for the sample may be copied from that associated with other samples, such as padded from available ones.
  b. In one example, when a sample required by a filtering process is outside the VPDU boundary, or below the virtual boundary, it may be replaced by a virtual sample, such as padded from available ones.
  c. In one example, the ALF virtual boundary handling method may be enabled (e.g, apply VirtualBoundary is set to true) for a block if it contains samples located at the boundary of a VPDU.
  d. Alternatively, usage of samples crossing a horizontal VPDU boundary may be disabled in the filtering process.
    i. In one example, when a sample required by a filtering process is below the horizontal VPDU boundary, or below the virtual boundary, it may be replaced by a virtual sample, such as padded from available ones.
  e. Alternatively, usage of samples crossing a vertical VPDU boundary may be disabled in the filtering process.
    i. In one example, when a sample required by a filtering process is outside the vertical VPDU boundary, or below the virtual boundary, it may be replaced by a virtual sample, such as padded from available ones.
9. Instead of using padded samples (e.g., not unavailable, above/below virtual boundaries, above/below boundaries of a video unit) in the ALF classification/filtering process, it is proposed to use the reconstructed samples before all in-loop filters.
   a. Alternatively, furthermore, the concept of two-side padding is applied via padding samples from the reconstructed samples before all in-loop filters.
      i. In one example, if a sample in a filter support is from reconstructed samples before all in-loop filters, the symmetric (e.g., symmetrical about the origin, e.g., the current sample) sample in the filter support shall also uses the reconstructed one before all in-loop filters.
         1. Suppose the coordinate of the current sample to be filtered is (0, 0) and the sample located at (i, j) is the reconstructed one before all in-loop filters, then the sample located at (−i, −j) is the reconstructed one before all in-loop filters.
         2. Suppose the coordinate of the current sample to be filtered is (x, y) and the sample located at (x+i, y+j) is the reconstructed one before all in-loop filters, then the sample located at (x−i, y−j) is the reconstructed one before all in-loop filters.
   b. Alternatively, furthermore, when In-loop reshaping (a.k.a LMCS) is enabled, the reconstructed samples before all in-loop filters are those in the original domain converted from the reshaped domain.
10. Instead of using padded samples (e.g., not unavailable, above/below virtual boundaries, above/below boundaries of a video unit) in the ALF filtering process, it is proposed to employ different ALF filter supports.
    a. In one example, suppose a sample needs to be padded in the above method, instead of performing the padding, filter coefficient associated with the sample is set to be zero.
       i. In this case, the filter support is modified by excluding samples which require to be padded.
       ii. Alternatively, furthermore, the filter coefficients applied to other samples except the current sample is kept unchanged, however, the filter coefficient applied to current sample may be modified, such as ((1«C_BD)−sum of all filter coefficients applied to samples which don't need to be padded) wherein C_BD indicates the filter coefficient's bit-depth.
          1. Taking FIGS. 18A-18B for example, when filtering lines L and I, the filter coefficient c12 applied to current sample is modified to be ((1«C_BD)−2*(c4+c5+c6+c7+c8+c9+c10+c11)).
    b. In one example, suppose a sample (x1, y1) is padded from (x2, y2) in above method, instead of performing the padding, filter coefficient associated with (x1, y1) is added to that of the position (x2, y2) regardless the non-linear filter is enabled or disabled.
       i. Alternatively, furthermore, the clipping parameter for (x2, y2) may be derived on-the-fly.
          1. In one example, it may be set equal to the decoded clipping parameter for (x2, y2).
          2. Alternatively, it may be set to the returned value of a function with the decoded clipping parameters for (x1, y1) and (x2, y2) as inputs, such as larger value or smaller value.
11. Selection of clipping parameters/filter coefficients/filter supports may be dependent on whether filtering a sample need to access padded samples (e.g., not unavailable, above/below virtual boundaries, above/below boundaries of a video unit).
    a. In one example, different clipping parameters/filter coefficients/filter supports may be utilized for samples with same class index but for some of them require accessing padded samples and other don't.
    b. In one example, the clipping parameters/filter coefficients/filter supports for filtering samples which require to access padded samples may be signaled in CTU/region/slice/tile level.
    c. In one example, the clipping parameters/filter coefficients/filter supports for filtering samples which require to access padded samples may be derived from that used for filtering samples which don't require to access padded samples.
       i. In one example, bullets 9a or 9b may be applied.
12. How to handle a sample at a boundary for in-loop filtering (such as ALF) may depend on the color component and/or color format.
    a. For example, the definition of "at boundary" may be different for different color components. In one example, a luma sample is at the bottom boundary if the distance between it and the bottom boundary is less than T1; a chroma sample is at the bottom boundary if the distance between it and the bottom boundary is less than T2. T1 and T2 may be different.
       i. In one example, T1 and T2 may be different when the color format is not 4:4:4.
13. When bottom/top/left/right boundary of one CTU/VPDU is also a boundary of a slice/tile/brick/sub-region with independent coding, a fixed order of multiple padding processes is applied.
    a. In one example, in a first step, the padding method (e.g., 1-side padding) of slice/tile/brick is firstly applied. Afterwards, the padding method for handling ALF virtual boundaries (e.g., 2-side padding method) is further applied during a second step. In this case, the padded samples after the first step are marked as available and may be used to decide how many lines to be padded in the ALF virtual boundary process. The same rule (e.g., FIG. 16) for handling CTUs which are not located at those boundaries are utilized.
14. The proposed methods may be applied to one or multiple boundaries between two sub-pictures.
    a. The boundary applying the proposed methods may be a horizontal boundary.
    b. The boundary applying the proposed methods may be a vertical boundary.
15. The above proposed methods may be applied to samples/blocks at vertical boundaries.
16. Whether or/and how proposed method is applied at "360 virtual boundary" may be dependent on the position of the "360 virtual boundary".
    a. In one example, when the "360 virtual boundary" coincides with a CTU boundary, proposed method may be applied. E.g., Only the 2-side padding may be applied in ALF for samples at "360 virtual boundary".
    b. In one example, when the "360 virtual boundary" does not coincide with a CTU boundary, proposed method may not be applied. E.g., only the 1-side padding may be applied in ALF for samples at "360 virtual boundary".
  c. In one example, for samples at multiple boundaries wherein at least one boundary is a "360 virtual boundary" and at least one of the "360 virtual boundary" does not coincide with a CTU boundary, proposed method may not be applied.
    i. For example, samples across any of these multiple boundaries may be padded by 1-side padding.
      1. Alternatively, furthermore, if there is a "virtual boundary", 2-side padding may be applied in ALF after the 1-side padding.

5. Embodiments

In the sections below, some examples of how current version of the VVC standard be modified to accommodate some embodiments of disclosed technology is described. Newly added parts are indicated in bold italicized underlined text. The deleted parts are indicated using [[ ]].

5.1 Embodiment #1 loop_filter_across_bricks_enabled_flag equal to 1 specifies that in-loop filtering operations may be performed across brick boundaries in pictures referring to the PPS. loop_filter_across_bricks_enabled_flag equal to 0 specifies that in-loop filtering operations are not performed across brick boundaries in pictures referring to the PPS. The in-loop filtering operations include the deblocking filter, sample adaptive offset filter operations. When not present, the value of loop_filter_across_bricks_enabled_flag is inferred to be equal to 1. loop_fitter_across_slices_enabled_flag equal to 1 specifies that in-loop filtering operations may be performed across slice boundaries in pictures referring to the PPS. loop_filter_across_slice_enabled_flag equal to 0 specifies that in-loop filtering operations are not performed across slice boundaries in pictures referring to the PPS. The in-loop filtering operations include the deblocking filter, sample adaptive offset filter operations. When not present, the value of loop_filter_across_slices_enabled_flag is inferred to be equal to 0.

5.2 Embodiment #2

Figure 21:
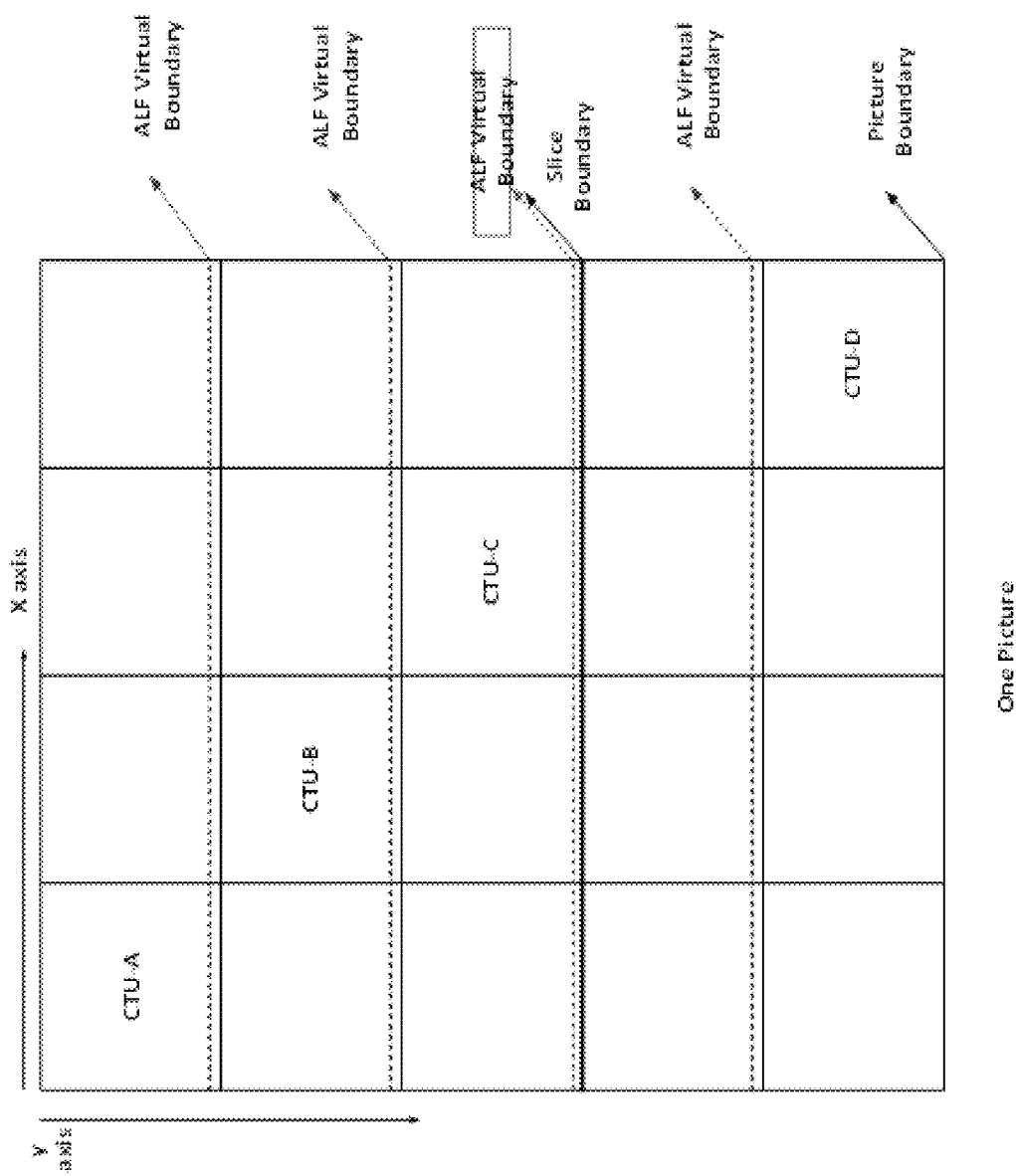
FIG. 21 shows an example of a modified adaptive loop filter boundary.

FIG. 21 shows processing of CTUs in a picture. The differences compared to FIG. 19 highlighted with the dashed lines.

5.3 Embodiment #3

8.8.5.2 Coding Tree Block Filtering Process for Luma Samples

Inputs of this process are:
  a reconstructed luma picture sample array recPicture$_L$ prior to the adaptive loop filtering process,
  a filtered reconstructed luma picture sample array alfPicture$_L$,
  a luma location (xCtb,yCtb) specifying the top-left sample of the current luma coding tree block relative to the top left sample of the current picture.

Output of this process is the modified filtered reconstructed luma picture sample array alfPicture$_L$.

The derivation process for filter index clause 8.8.5.3 is invoked with the location (xCtb,yCtb) and the reconstructed luma picture sample array recPicture$_L$ as inputs, and filtIdx[x][y] and transposeIdx[x][y] with x, y=0 . . . CtbSizeY−1 as outputs.

For the derivation of the filtered reconstructed luma samples alfPicture$_L$[x][y], each reconstructed luma sample inside the current luma coding tree block recPicture$_L$[x][y] is filtered as follows with x, y=0 . . . CtbSizeY−1:

The array of luma filter coefficients f[j] and the array of luma clipping values c[j] corresponding to the filter specified by filtIdx[x][y] is derived as follows with j=0 . . . 11:
. . .

The luma filter coefficients and clipping values index idx are derived depending on transposeIdx[x][y] as follows:
. . .

The locations ($h_{x+i}, v_{y+j}$) for each of the corresponding luma samples (x,y) inside the given array recPicture of luma samples with i,j=−3 . . . 3 are derived as follows:
. . .

The variable applyVirtualBoundary is derived as follows:
  If the following condition is true, applyVirtualBoundary is set equal to 0:
    The bottom boundary of the current coding tree block is the bottom boundary of the picture.
  Otherwise, applyVirtualBoundary is set equal to 1.

The reconstructed sample offsetsr1, r2 and r3 are specified in Table 8-22 according to the horizontal luma sample position y and apply VirtualBoundary.
. . .

8.8.5.4 Coding Tree Block Filtering Process for Chroma Samples

Inputs of this process are:
  a reconstructed chroma picture sample array recPicture prior to the adaptive loop filtering process,
  a filtered reconstructed chroma picture sample array alfPicture,
  a chroma location (xCtbC, yCtbC) specifying the top-left sample of the current chroma coding tree block relative to the top left sample of the current picture.

Output of this process is the modified filtered reconstructed chroma picture sample array alfPicture.

The width and height of the current chroma coding tree block ctbWidthC and ctbHeightC is derived as follows:

$$ctbWidthC = CtbSizeY/SubWidthC \qquad (8\text{-}1230)$$

$$ctbHeightC = CtbSizeY/SubHeightC \qquad (8\text{-}1231)$$

For the derivation of the filtered reconstructed chroma samples alfPicture[x][y], each reconstructed chroma sample inside the current chroma coding tree block recPicture[x][y] is filtered as follows with x=0 . . . ctbWidthC−1, y=0 . . . ctbHeightC−1:

The locations ($h_{x+i}, v_{y+j}$) for each of the corresponding chroma samples (x,y) inside the given array recPicture of chroma samples with i,j=−2 . . . 2 are derived as follows:
  If pps_loop_filter_across_virtual_boundaries_disabled_flag is equal to 1 and xCtbC+x−PpsVirtualBoundariesPosX[n]/SubWidthC is greater than or equal to 0 and less than 2 for any n=0 . . . pps_num_ver_virtual_boundaries−1, the following applies:

$$h_{x+i} = \text{Clip3}(\text{PpsVirtualBoundariesPosX}[n]/\text{SubWidthC}, pic\_width\_in\_luma\_samples/\text{SubWidthC}-1, xCtbC+x+i) \qquad (8\text{-}1232)$$

Otherwise, if pps_loop_filter_across_virtual_boundaries_disabled_flag is equal to 1 and PpsVirtualBoundariesPosX[n]/SubWidthC−xCtbC−x is greater than 0 and less than 3 for any n=0 . . . pps_num_ver_virtual_boundaries−1, the following applies:

$$h_{x+i} = \text{Clip3}(0, \text{PpsVirtualBoundariesPosX}[n]/\text{SubWidthC}-1, xCtbC+x+i) \qquad (8\text{-}1233)$$

Otherwise, the following applies:

$h_{x+i}$=Clip3(0,pic_width_in_luma_samples/SubWidthC−1,xCtbC+x+i) (8-1234)

If pps_loop_filter_across_virtual_boundaries_disabled_flag is equal to 1 and yCtbC+y−PpsVirtualBoundariesPosY[n]/SubHeightC is greater than or equal to 0 and less than 2 for any n=0 . . . pps_num_hor_virtual_boundaries−1, the following applies:

$v_{y+j}$=Clip3(PpsVirtualBoundariesPosY[$n$]/SubHeightC, pic_height_in_luma_samples/SubHeightC−1,yCtbC+y+j) (8-1235)

Otherwise, if pps_loop_filter_across_virtual_boundaries_disable_flag is equal to 1 and PpsVirtualBoundariesPosY[n]/SubHeightCyCtbC−y is greater than 0 and less than 3 for any n=0 . . . pps_num_hor_virtual_boundaries−1, the following applies:

$v_{y+j}$=Clip3(0,PpsVirtualBoundariesPosY[$n$]/SubHeightC−1,yCtbC+y+j) (8-1236)

Otherwise, the following applies:

$v_{y+j}$=Clip3(0,pic_height_in_luma_samples/SubHeightC−1,yCtbC+y+j) (8-1237)

The variable applyVirtualBoundary is derived as follows:
If the following condition is true, applyVirtualBoundary is set equal to 0:
The bottom boundary of the current coding tree block is the bottom boundary of the picture.
Otherwise, applyVirtualBoundary is set equal to 1.
The reconstructed sample offsets r1 and r2 are specified in Table 8-22 according to the horizontal luma sample position y and apply VirtualBoundary.

Alternatively, the condition "the bottom boundary of the current coding tree block is the bottom boundary of the picture" can be replaced by "the bottom boundary of the current coding tree block is the bottom boundary of the picture or outside the picture."

5.4 Embodiment #4
This embodiment shows an example of disallowing using samples below the VPDU region in the ALF classification process (corresponding to bullet 7 in section 4).
8.8.5.3 Derivation Process for ALF Transpose and Filter Index for Luma Samples
Inputs of this process are:
a luma location (xCtb,yCtb) specif ying the top-left sample of the current luma coding tree block relative to the top left sample of the current picture,
a reconstructed luma picture sample array recPicture$_L$ prior to the adaptive loop filtering process.
Outputs of this process are
the classification filter index array filtIdx[x][y] with x, y=0 . . . CtbSizeY−1,
the transpose index array transposeIdx[x][y] with x, y=0 . . . CtbSizeY−1.
The locations ($h_{x+i}$, $v_{y+j}$) for each of the corresponding luma samples (x,y) inside the given array recPicture of luma samples with i,j=−2 . . . 5 are derived as follows:
If pps_loop_filter_across_virtual_boundaries_disabled_flag is equal to 1 and xCtb+x PpsVirtualBoundariesPosX[n] is greater than or equal to 0 and less than 2 for any n=0 . . . pps_num_ver_virtual_boundaries−1, the following applies:

$h_{x+i}$=Clip3(PpsVirtualBoundariesPosX[$n$], pic_width_in_luma_samples−1,xCtb+x+i) (8-1193)

Otherwise, if pps_loop_filter_across_virtual_boundaries_disabled_flag is equal to 1 and PpsVirtualBoundaries-PosX[n]−xCtb−x is greater than 0 and less than 6 for any n=0 . . . pps_num_ver_virtual_boundaries−1, the following applies:

$h_{x+i}$=Clip3(0,PpsVirtualBoundariesPosX[$n$]−1,xCtb+x+i) (8-1194)

Otherwise, the following applies:

$h_{x+i}$=Clip3(0,pic_width_in_luma_samples−1,xCtb+x+i) (8-1195)

If pps_loop_filter_across_virtual_boundaries_disabled_flag is equal to 1 and yCtb+y−PpsVirtualBoundariesPosY[n] is greater than or equal to 0 and less than 2 for any n=0 . . . pps_num_hor_virtual_boundaries−1, the following applies:

$v_{y+j}$=Clip3(PpsVirtualBoundariesPosY[$n$],pic_height_in_luma_samples−1,yCtb+y+j) (8-1196)

Otherwise, if pps_loop_filter_across_virtual_boundaries_disabled_flag is equal to 1 and PpsVirtualBoundariesPosY[n]−yCtb−y is greater than 0 and less than 6 for any n=0 . . . pps_num_hor_virtual_boundaries−1, the following applies:

$v_{y+j}$=Clip3(0,PpsVirtualBoundariesPosY[$n$]−1,yCtb+y+j) (8-1197)

Otherwise, the following applies:
If yCtb+CtbSizeY is greater than or equal to pic_height_in_luma_samples, the following applies:

$v_{y+j}$=Clip3(0,pic_height_in_luma_samples−1,yCtb+y+j) (8-1198)

Otherwise, if y is less than CtbSizeY−4, the following applies:

$v_{y+j}$=Clip3(0,yCtb+CtbSizeY−5,yCtb+y+j) (8-1199)

Otherwise, the following applies:

$v_{y+j}$=Clip3(yCtb+CtbSizeY−4,pic_height_in_luma_samples−1,yCtb+y+j) (8-1200)

The classification filter index array filtIdx and the transpose index array transposeIdx are derived by the following ordered steps:
1. The variables filtH[x][y], filtV[x][y], filtD0[x][y] and filtD1[x][y] with x, y=−2 . . . CtbSizeY+1 are derived as follows:
If both x and y are even numbers or both x and y are uneven numbers, the following applies:

filtH[$x$][$y$]=Abs((recPicture[$h_x$,$v_y$]«1)−recPicture[$h_{x-1}$,$v_y$]−recPicture[$h_{x+1}$,$v_y$]) (8-1201)

filtV[$x$][$y$]=Abs((recPicture[$h_x$,$v_y$]«1)−recPicture[$h_x$,$v_{y-1}$]−recPicture[$h_x$,$v_{y+1}$]) (8-1202)

filtD0[$x$][$y$]=Abs((recPicture[$h_x$,$v_y$]«1)−recPicture[$h_{x-1}$,$v_{y-1}$]−recPicture[$h_{x+1}$,$v_{y+1}$]) (8-1203)

filtD1[$x$][$y$]=Abs((recPicture[$h_x$,$v_y$]«1)recPicture[$h_{x+1}$,$v_{y-1}$]recPicture[$h_{x-1}$,$v_{y+1}$]) (8-1204)

Otherwise, filtH[x][y], filtV[x][y], filtD0[x][y] and filtD1[x][y] are set equal to 0.
2. The variables minY, maxY and ac are derived as follows:
If (y«2) is equal to (min(CtbSizeY, 64)−8) and (yCtb+CtbSizeY) is less than pic_height_in_luma_samples−1, minY is set equal to 2, maxY is set equal to 3 and ac is set equal to 96.
Otherwise, if (y«2) is equal to (min(CtbSizeY, 64)−4) and (yCtb+CtbSizeY) is less than pic_height_in_luma_samples−1, minY is set equal to 0, maxY is set equal to 5 and ac is set equal to 96.

Otherwise, minY is set equal to −2 and maxY is set equal to 5 and ac is set equal to 64.

3. The variables varTempH1[x][y], varTempV1[x][y], varTempD01[x][y], varTempD11[x][y] and varTemp[x][y] with x, y=0 . . . (CtbSizeY−1)»2 are derived as follows:

$$\text{sumH}[x][y] = \Sigma_i \Sigma_j \text{filtH}[h_{(x\ll 2)+i}-\text{xCtb}][v_{(y\ll 2)+j}-\text{yCtb}] \text{ with } i=-2 \ldots 5, j=\text{minY} \ldots \text{maxY} \quad (8\text{-}1205)$$

$$\text{sumV}[x][y] = \Sigma_i \Sigma_j \text{filtV}[h_{(x\ll 2)+i}-\text{xCtb}][v_{(y\ll 2)+j}-\text{yCtb}] \text{ with } i=-2 \ldots 5, j=\text{minY} \ldots \text{maxY} \quad (8\text{-}1206)$$

$$\text{sumD0}[x][y] = \Sigma_i \Sigma_j \text{filtD0}[h_{(x\ll 2)+i}-\text{xCtb}][v_{(y\ll 2)+j}-y\text{Ctb}] \text{ with } i=-2 \ldots 5, j=\text{minY} \ldots \text{maxY} \quad (8\text{-}1207)$$

$$\text{sumD1}[x][y] = \Sigma_i \Sigma_j \text{filtD1}[h_{(x\ll 2)+i}-\text{xCtb}][v_{(y\ll 2)+j}-\text{yCtb}] \text{ with } i=-2 \ldots 5, j=\text{minY} \ldots \text{maxY} \quad (8\text{-}1208)$$

$$\text{sumOfHV}[x][y] = \text{sumH}[x][y] + \text{sumV}[x][y] \quad (8\text{-}1209)$$

4. The variables dir1[x][y], dir2[x][y] and dirS[x][y] with x, y=0 . . . CtbSizeY−1 are derived as follows:

The variables hv1, hv0 and dirHV are derived as follows:
. . .

The variables d1, d0 and dirD are derived as follows:
. . .

5. The variable avgVar[x][y] with x, y=0 . . . CtbSizeY−1 is derived as follows:

$$\text{varTab}[\ ] = \{0,1,2,2,2,2,2,3,3,3,3,3,3,3,4\} \quad (8\text{-}1227)$$

$$\text{avgVar}[x][y] = \text{varTab}[\text{Clip3}(0,15,(\text{sumOfHV}[x\gg 2][y\gg 2]*ac)\gg(3+\text{BitDepth}_Y))] \quad (8\text{-}1228)$$

6. The classification filter index array filtIdx[x][y] and the transpose index array transposeIdx[x][y] with x=y=0 . . . CtbSizeY−1 are derived as follows:

$$\text{transposeTable}[\ ] = \{0,1,0,2,2,3,1,3\}$$

$$\text{transposeIdx}[x][y] = \text{transposeTable}[\text{dir1}[x][y]*2+(\text{dir2}[x][y]\gg 1)]$$

$$\text{filtIdx}[x][y] = \text{avgVar}[x][y]$$

When dirS[x][y] is not equal to 0, filtIdx[x][y] is modified as follows:

$$\text{filtIdx}[x][y] += (((\text{dir1}[x][y]\&0\times 1)\ll 1) + \text{dirS}[x][y])*5 \quad (8\text{-}1229)$$

5.5 Embodiment #5

For samples locate at multiple kinds of boundaries (e.g., slice/brick boundary, 360-degree virtual boundary), the padding process is only invoked once. And how many lines to be padded per side is dependent on the location of current sample relative to the boundaries.

Figure 27:
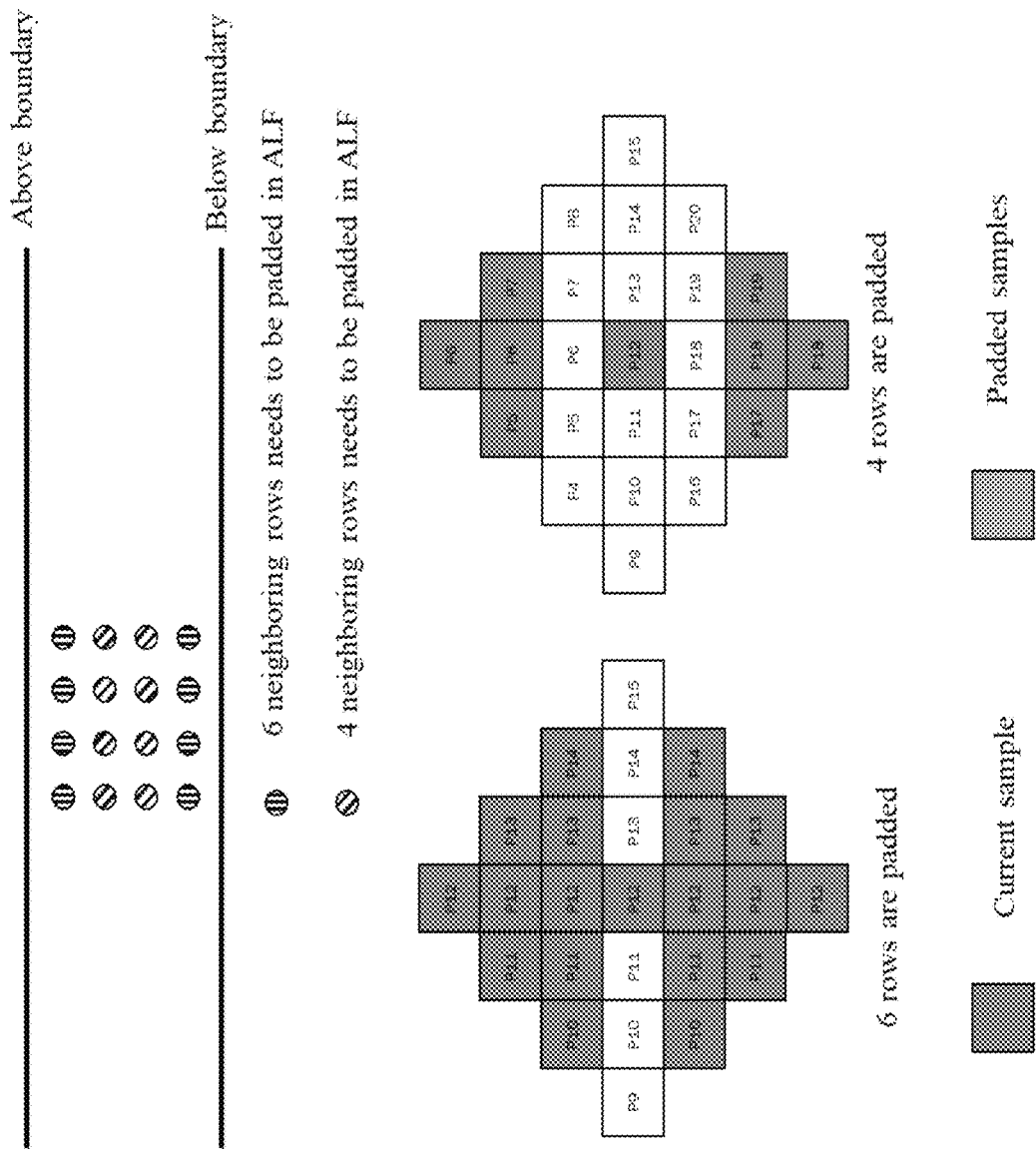
FIG. 27 shows another example of processing of CTUs in a picture.

In one example, the ALF 2-side padding method is applied. Alternatively, furthermore, In the symmetric 2-side padding method, when a sample is at two boundaries, e.g., one boundary in the above side and one boundary in the below side, how many samples are padded is decided by the nearer boundary as shown in FIG. 27. Meanwhile, when deriving the classification information, only the 4 lines between the two boundaries in FIG. 27 are used.

Figure 26:
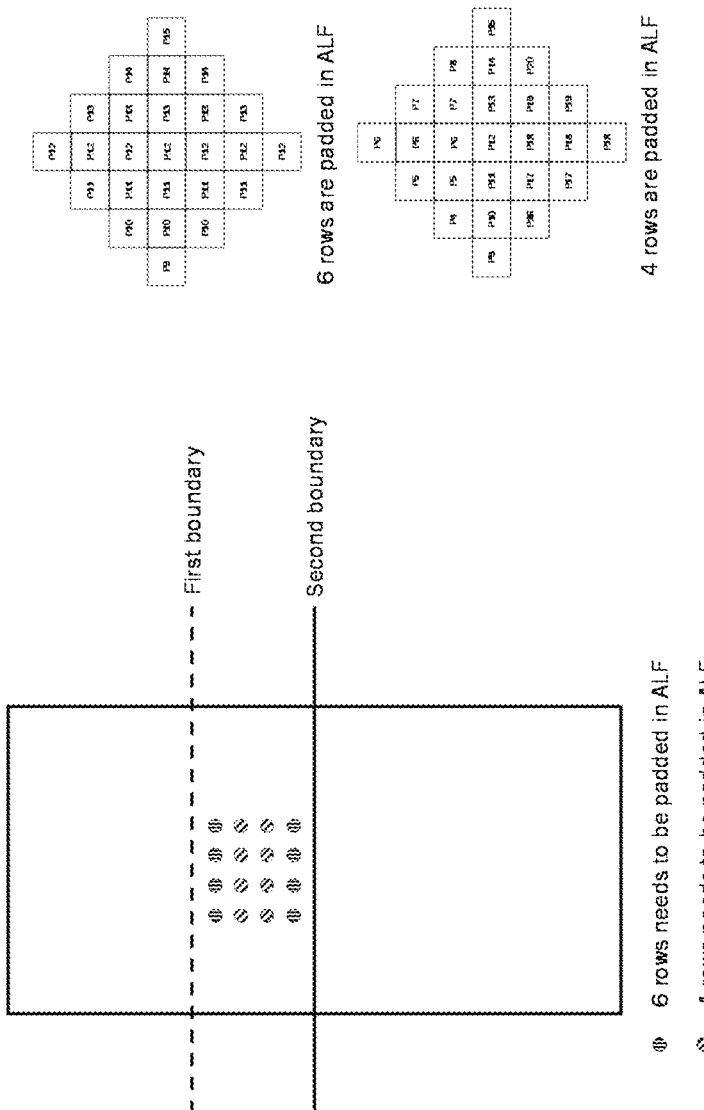
FIG. 26 shows an example of processing of CTUs in a picture.

FIG. 26 shows an example of the padding methods if 4 lines of samples are of two boundaries. In one example, the first boundary in FIG. 26 may be the ALF virtual boundary; the second boundary in FIG. 25 may be the slice/tile/brick boundary or the 360-degree virtual boundary.

5.6 Embodiment #6
8.8.5.2 Coding Tree Block Filtering Process for Luma Samples
Inputs of this process are:
a reconstructed luma picture sample array recPicture$_L$ prior to the adaptive loop filtering process,
a filtered reconstructed luma picture sample array alfPicture$_L$,
a luma location (xCtb,yCtb) specifying the top-left sample of the current luma coding tree block relative to the top left sample of the current picture.

Output of this process is the modified filtered reconstructed luma picture sample array alfPicture$_L$.

The derivation process for filter index clause 8.8.5.3 is invoked with the location (xCtb,yCtb) and the reconstructed luma picture sample array recPicture$_L$ as inputs, and filtIdx[x][y] and transposeIdx[x][y] with x, y=0 . . . CtbSizeY−1 as outputs.

The locations ($h_{x+i}$, $v_{y+j}$) for each of the corresponding luma samples (x, y) inside the given array recPicture of luma samples with i, j=−3 . . . 3 are derived as follows:
If pps_loop_filter_across_virtual_boundaries_disabled_flag is equal to 1 and xCtb+x−PpsVirtualBoundariesPosX[n] is greater than or equal to 0 and less than 3 for any n=0 . . . pps_num_ver_virtual_boundaries−1, the following applies:

$$h_{x+i} = \text{Clip3}(\text{PpsVirtualBoundariesPosX}[n], \text{pic\_width\_in\_luma\_samples}-1, \text{xCtb}+x+i) \quad (8\text{-}1197)$$

Otherwise, if pps_loop_filter_across_virtual_boundaries_disable_flag is equal to 1 and PpsVirtualBoundariesPosX[n]−xCtb−x is greater than 0 and less than 4 for any n=0 . . . pps_num_ver_virtual_boundaries−1, the following applies:

$$h_{x+i} = \text{Clip3}(0, \text{PpsVirtuaBoundariesPosX}[n]-1, \text{xCtb}+x+i) \quad (8\text{-}1198)$$

Otherwise, the following applies:

$$h_{x+i} = \text{Clip3}(0, \text{pic\_width\_in\_luma\_samples}-1, \text{xCtb}+x+i) \quad (8\text{-}1199)$$

[[If pps_loop_filter_across_virtual_boundaries_disabled_flag is equal to 1 and yCtb+y−PpsVirtualBoundariesPosY[n] is greater than or equal to 0 and less than 3 for any n=0 . . . pps_num_hor_virtual_boundaries−1, the following applies:

$$v_{y+j} = \text{Clip3}(\text{PpsVirtualBoundariesPosY}[n], \text{pic\_height\_in\_luma\_samples}-1, \text{yCtb}+y+j) \quad (8\text{-}1200)$$

Otherwise, if pps_loop_filter_across_virtual_boundaries_disable_flag is equal to 1 and PpsVirtualBoundariesPosY[n]−yCtb−y is greater than 0 and less than 4 for any n=0 . . . pps_num_hor_virtual_boundaries−1, the following applies:

$$v_{y+j} = \text{Clip3}(0, \text{PpsVirtualBoundariesPos}Y[n]-1, y\text{Ctb}+y+j) \quad (8\text{-}1201)]]$$

[[Otherwise, t]] The following applies:

$$v_{y+j} = \text{Clip3}(0, \text{pic\_height\_in\_luma\_samples}-1, \text{yCtb}+y+j) \quad (8\text{-}1202)$$

[[The variable applyVirtualBoundary is derived as follows:
If one or more of the following conditions are true, applyVirtualBoundary is set equal to 0:
The bottom boundary of the current coding tree block is the bottom boundary of the picture.

The bottom boundary of the current coding tree block is the bottom boundary of the brick and loop_filter_across_bricks_enabled_flag is equal to 0.

The bottom boundary of the current coding tree block is the bottom boundary of the slice and loop_filter_across_slices_enabled_flag is equal to 0.

The bottom boundary of the current coding tree block is one of the bottom virtual boundaries of the picture and pps_loop_filter_across_virtual_boundaries_disabled_flag is equal to 1.

Otherwise, apply VirtualBoundary is set equal to 1.]]

The variable boundaryPos1 and boundaryPos2 are derived by invoking the vertical boundary position derivation process for luma samples as specified in 8.8.5.5 with yCtb equal to yCtb and y equal to y.

PosX[n]−xCtb−x is greater than 0 and less than 6 for any n=0 . . . pps_num_ver_virtual_boundaries−1, the following applies:

$h_{x+i}$=Clip3(0,PpsVirtualBoundaries
PosX[n]−1,xCtb+x+i)  (8-1209)

Otherwise, the following applies:

$h_{x+i}$=Clip3(0,pic_width_in_luma_
samples−1,xCtb+x+i)  (8-1210)

[[If pps_loop_filter_across_virtual_boundaries_disabled_flag is equal to 1 and yCtb+y−PpsVirtualBoundariesPosY[n] is greater than or equal to 0 and less than 2 for any n=0 . . . pps_num_hor_virtual_boundaries−1, the following applies:

$v_{y+j}$=Clip3(PpsVirtualBoundariesPosY[n],pic_
height_in_luma_samples−1,yCtb+y+j)  (8-1211)

TABLE 8-24

Specification of r1, r2, and r3 according to the horizontal luma sample position y and [[applyVirtualBoundary]] *boundaryPos1 and boundaryPos2.*

| condition | r1 | r2 | r3 |
|---|---|---|---|
| ( y = = CtbSizeY − 5 \|\| y = = CtbSizeY − 4 ) && ( applyVirtualBoundary = = 1 ) | 0 | 0 | 0 |
| ( y = = CtbSizeY − 6 \|\| y = = CtbSizeY − 3 ) && ( applyVirtualBoundary = = 1 ) | 1 | 1 | 1 |
| ( y = = CtbSizeY − 7 \|\| y = = CtbSizeY − 2 ) && ( applyVirtualBoundary = = 1 ) | 1 | 2 | 2 |
| otherwise | 1 | 2 | 3 |
| *condition* | *r1* | *r2* | *r3* |
| *( y = = boundaryPos1 − 1 \|\| y = = boundaryPos1 ) && ( boundaryPos1 >−1 && ( boundaryPos2 ==−1 \|\| boundaryPos2 >= boundaryPos1 + 8 ))* | *0* | *0* | *0* |
| *( y = = boundaryPos1 − 2 \|\| y = = boundaryPos1 +1) && ( boundaryPos1 >−1 && ( boundaryPos2 ==−1 \|\| boundaryPos2 >= boundaryPos1 + 8 ))* | *1* | *1* | *1* |
| *( y = = boundaryPos1 − 3 \|\| y = = boundaryPos1 +2) && ( boundaryPos1 >−1 && ( boundaryPos2 ==−1 \|\| boundaryPos2 >= boundaryPos1 + 8 ))* | *1* | *2* | *2* |
| *( y = = boundaryPos1 − 1 \|\| y = = boundaryPos1 \|\| y = = boundaryPos2 − 1 \|\| y == boundaryPos2 + 1 ) &&( boundaryPos1 > −1 && boundaryPos2 == boundaryPos1 + 4 ))* | *0* | *0* | *0* |
| *( y = = boundaryPos1 − 2 \|\| y = = boundaryPos1 +1 \|\| y = = boundaryPos2 − 2 \|\| y == boundaryPos2 + 1 ) &&( boundaryPos1 > −1 && boundaryPos2 == boundaryPos1 + 4 ))* | *1* | *1* | *1* |
| *( y = = boundaryPos1 − 3 \|\| y = = boundaryPos2 +2) && ( boundaryPos1 >−1 && boundaryPos2 == boundaryPos1 + 4 ))* | *1* | *2* | *2* |
| *otherwise* | *1* | *2* | *3* |

8.8.5.3 Derivation Process for ALF Transpose and Filter Index for Luma Samples

Inputs of this process are:
  a luma location (xCtb,yCtb) specifying the top-left sample of the current luma coding tree block relative to the top left sample of the current picture,
  a reconstructed luma picture sample array recPicture$_L$ prior to the adaptive loop filtering process.

Outputs of this process are
  the classification filter index array filtIdx[x][y] with x, y=0 . . . CtbSizeY−1,
  the transpose index array transposeIdx[x][y] with x, y=0 . . . CtbSizeY−1.

The locations ($h_{x+i}$, $v_{y+j}$) for each of the corresponding luma samples (x,y) inside the given array recPicture of luma samples with i, j=2 . . . 5 are derived as follows:

If pps_loop_filter_across_virtual_boundaries_disabled_flag is equal to 1 and xCtb+x−PpsVirtualBoundariesPosX[n] is greater than or equal to 0 and less than 2 for any n=0 . . . pps_num_ver_virtual_boundaries−1, the following applies:

$h_{x+i}$=Clip3(PpsVirtualBoundariesPosX[n],
pic_width_in_luma_samples−1,xCtb+x+i)  (8-1208)

Otherwise, if pps_loop_filter_across_virtual_boundaries_disabled_flag is equal to 1 and PpsVirtualBoundariesPosY[n]−yCtb−y is greater than 0 and less than 6 for any n=0 . . . pps_num_hor_virtual_boundaries−1, the following applies:

$v_{y+j}$=Clip3(0,PpsVirtualBoundariesPosY
[n]−1,yCtb+y+j)  (8-1212)

Otherwise, the following applies:
  If yCtb+CtbSizeY is greater than or equal to pic_height_in_luma_samples, the following applies:

$v_{y+j}$=Clip3(0,pic_height_in_luma_
samples−1,yCtb+y+j)  (8-1213)

Otherwise, if y is less than CtbSizeY−4, the following applies:

$v_{y+j}$=Clip3(0,yCtb+CtbSizeY−5,yCtb+y+j)  (8-1214)

Otherwise, the following applies:

$v_{y+j}$=Clip3(yCtb+CtbSizeY−4,pic_height_in_
luma_samples−1,yCtb+y+j)  (8-1215)]]

The variable boundaryPos1 and boundaryPos2 are derived by invoking the vertical boundary position derivation process for luma samples as specified in 8.8.5.5 with yCtb equal to yCtb and y equal toy.

If boundaryPos1 is equal to 1 and boundaryPos2 is equal to −1, the following applies:

$$h_{x+i}=\text{Clip3}(0,\text{pic\_width\_in\_luma\_samples}-1,x\text{Ctb}+x+i) \quad (8\text{-}1211)$$

Otherwise, if boundaryPos1 is not equal to 1 and boundaryPos2 is equal to 1, the following applies:
If y is less than boundaryPos1, the following applies:

$$v_{y+j}=\text{Clip3}(0,y\text{Ctb}+\text{boundatyPos1},y\text{Ctb}+y+j) \quad (8\text{-}1215)$$

Otherwise, if y is equal to or greater than boundaryPos1, the following applies:

$$v_{y+j}=\text{Clip3}(y\text{Ctb}+\text{boundaryPos1},\text{pic\_height\_in\_luma\_samples}-1,y\text{Ctb}+y+j) \quad (8\text{-}1216)$$

Otherwise (boundaryPos1 is not equal to 1 and boundaryPos2 is not equal to 1), the following applies:
If y is less than boundaryPos1, the following applies:

$$v_{y+j}=\text{Clip3}(0,y\text{Ctb}+\text{boundaryPos1}-1,y\text{Ctb}+y+j) \quad (8\text{-}1215)$$

Otherwise, if y is equal to or greater than boundaryPos2, the following applies:

$$v_{y+j}=\text{Clip3}(y\text{Ctb}+\text{boundaryPos2},\text{pic\_height\_in\_luma\_samples}-1,y\text{Ctb}+y+j) \quad (8\text{-}1216)$$

Otherwise (v is greater than boundaryPos1 and is equal to or less than boundaryPos2), the following applies:

$$v_{y+j}=\text{Clip3}(y\text{Ctb}+\text{boundaryPos1},y\text{Ctb}+\text{boundaryPos2}-1,y\text{Ctb}+y+j) \quad (8\text{-}1216)$$

The classification filter index array filtIdx and the transpose index array transposeIdx are derived by the following ordered steps:
1. The variables filtH[x][y], filtV[x][y], filtD0 [x][y] and filtD1[x][y] with x, y=2 . . . CtbSizeY+1 are derived as follows:
   If both x and y are even numbers or both x and y are uneven numbers, the following applies:

$$\text{filtH}[x][y]=\text{Abs}((\text{recPicture}[h_x,v_y]\ll1)\text{recPicture}[h_{x-1},v_y]-\text{recPicture}[h_{x+1},v_y]) \quad (8\text{-}1216)$$

$$\text{filtV}[x][y]=\text{Abs}((\text{recPicture}[h_x,v_y]\ll1)\text{recPicture}[h_x,v_{y-1}]-\text{recPicture}[h_x,v_{y+1}]) \quad (8\text{-}1217)$$

$$\text{filtD0}[x][y]=\text{Abs}((\text{recPicture}[h_x,v_y]\ll1)\text{recPicture}[h_{x-1},v_{y-1}]-\text{recPicture}[h_{x+1},v_{y+1}]) \quad (8\text{-}1218)$$

$$\text{filtD1}[x][y]=\text{Abs}((\text{recPicture}[h_x,v_y]\ll1)-\text{recPicture}[h_{x+1},v_{y-1}]-\text{recPicture}[h_{x-1},v_{y+1}]) \quad (8\text{-}1219)$$

Otherwise, filtH[x][y], filtV[x][y], filtD0[x][y] and filtD1[x][y] are set equal to O.
2. The variables minY, maxY and ac are derived as follows:
   If (y≪2) is equal to (CtbSizeY−8) and (yCtb+CtbSizeY) is less than pic_height_in_luma_samples−1, minY is set equal to 2, maxY is set equal to 3 and ac is set equal to 96.
   Otherwise, if (y≪2) is equal to (CtbSizeY−4) and (yCtb+CtbSizeY) is less than pic_height_in_luma_samples−1, minY is set equal to 0, maxY is set equal to 5 and ac is set equal to 96.
   The variable boundaryPos1 and boundaryPos2 are derived by invoking the vertical boundary position derivation process for luma samples as specified in 8.8.5.5 with yCtb equal to yCtb and y equal to y.
   If boundaryPos1 is not equal to 1 and boundaryPos2 is equal to 1, the following applies:
      If y is equal to boundaryPos1−4, minY is set equal to 2, maxY is set equal to 3 and ac is set equal to 96.
      Otherwise, if y is equal to boundaryPos1, minY is set equal to 0, maxY is set equal to 5 and ac is set equal to 96.
      Otherwise, minY is set equal to 2 and maxY is set equal to 5 and acis set equal to 64.
   Otherwise, if boundaryPos1 is not equal to 1 and boundaryPos2 is not equal to 1, the following applies:
      If y is equal to boundaryPos1−4, minY is set equal to 2, maxY is set equal to 3 and ac is set equal to 96.
      Otherwise, if y is equal to boundaryPos2, minY is set equal to 0, maxY is set equal to 5 and ac is set equal to 96.
      Otherwise, if y is equal to boundaryPos1 and boundaryPos2 is equal to or greater than boundaryPos2+8, minY is set equal to 0, maxY is set equal to 5 and ac is set equal to 96.
      Otherwise, if y is equal to boundaryPos1 and boundaryPos2 is equal to boundaryPos2+4, minY is set equal to 0, maxY is set equal to 3 and ac is set equal to 128.
      Otherwise, if y is equal to boundaryPos2−4 and boundaryPos2 is equal to or greater than boundaryPos2+8, minY is set equal to −2, maxY is set equal to 3 and ac is set equal to 96.
      Otherwise, minY is set equal to −2 and maxY is set equal to 5 and ac is set equal to 64.
   Otherwise (boundaryPos1 is equal to −1 and boundaryPos2 is equal to −1), minY is set equal to −2 and maxY is set equal to 5 and ac is set equal to 64.
   [[Otherwise, minY is set equal to −2 and maxY is set equal to 5 and a c is set equal to 64.]]
3. The variables sumH[x][y], sumV[x][y], sumD0[x][y], sumD1[x][y] and sumOfHV[x][y] with x, y=0 . . . (CtbSizeY−1)≫2 are derived as follows:

$$\text{sumH}[x][y]=\Sigma_i\Sigma_j \text{filtH}[h_{(x\ll2)+i}-x\text{Ctb}][v_{(y\ll2)+j}-y\text{Ctb}]$$
$$\text{with } i=-2 \ldots 5, j=\text{minY} \ldots \text{maxY} \quad (8\text{-}1220)$$

$$\text{sumV}[x][y]=\Sigma_i\Sigma_j \text{filtV}[h_{(x\ll2)+i}-x\text{Ctb}][v_{(y\ll2)+j}\text{yCtb}]$$
$$\text{with } i=-2 \ldots 5, j=\text{minY} \ldots \text{maxY} \quad (8\text{-}1221)$$

$$\text{sumD0}[x][y]=\Sigma_i\Sigma_j \text{filtD0}[h_{(x\ll2)+i}-x\text{Ctb}][v_{(y\ll2)+j}-y\text{Ctb}]$$
$$\text{with } i=-2 \ldots 5, j=\text{minY} \ldots \text{maxY} \quad (8\text{-}1222)$$

$$\text{sumD1}[x][y]=\Sigma_i\Sigma_j \text{filtD1}[h_{(x\ll2)+i}-x\text{Ctb}][v_{(y\ll2)+j} y\text{Ctb}]$$
$$\text{with } i=-2 \ldots 5, j=\text{minY} \ldots \text{maxY} \quad (8\text{-}1223)$$

$$\text{sumOfHV}[x][y]=\text{sumH}[x][y]+\text{sum } V[x][y] \quad (8\text{-}1224)$$

8.8.5.4 Coding Tree Block Filtering Process for Chroma Samples

Inputs of this process are:
  a reconstructed chroma picture sample array recPicture prior to the adaptive loop filtering process,
  a filtered reconstructed chroma picture sample array alfPicture,
  a chroma location (xCtbC, yCtbC) specifying the top-left sample of the current chroma coding tree block relative to the top left sample of the current picture.
Output of this process is the modified filtered reconstructed chroma picture sample array alfPicture.
The width and height of the current chroma coding tree block ctbWidthC and ctbHeightC is derived as follows:

$$\text{ctbWidthC}=\text{CtbSizeY}/\text{SubWidthC} \quad (8\text{-}1245)$$

$$\text{ctbHeightC}=\text{CtbSizeY}/\text{SubHeightC} \quad (8\text{-}1246)$$

For the derivation of the filtered reconstructed chroma samples alfPicture[x][y], each reconstructed chroma sample inside the current chroma coding tree block recPicture[x][y] is filtered as follows with x=0 . . . ctbWidthC−1, y=0 . . . ctbHeightC−1:

The locations ($h_{x+i}$, $v_{y+j}$) for each of the corresponding chroma samples (x, y) inside the given array recPicture of chroma samples with i, j=−2 . . . 2 are derived as follows:

If pps_loop_filter_across_virtual_boundaries_disabled_flag is equal to 1 and xCtbC+x−PpsVirtualBoundariesPosX[n]/SubWidthC is greater than or equal to 0 and less than 2 for any n=0 . . . pps_num_ver_virtual_boundaries−1, the following applies:

$h_{x+i}$=Clip3(PpsVirtualBoundariesPosX[n]/SubWidthC, pic_width_in_luma_samples/SubWidthC−1,xCtbC+x+i)      (8-1247)

Otherwise, if pps_loop_filter_across_virtual_boundaries_disabled_flag is equal to 1 and PpsVirtualBoundariesPosX[n]/SubWidthC−xCtbC−x is greater than 0 and less than 3 for any n=0 . . . pps_num_ver_virtual_boundaries−1, the following applies:

$h_{x+i}$=Clip3(0,PpsVirtuaBoundariesPosX[n]/SubWidthC−1,xCtbC+x+i)      (8-1248)

Otherwise, the following applies:

$h_{x+i}$=Clip3(0,pic_width_in_luma_samples/SubWidthC−1,xCtbC+x+i)      (8-1249)

[[If pps_loop_filter_across_virtual_boundaries_disabled_flag is equal to 1 and yCtbC+y−PpsVirtualBoundariesPosY[n]/SubHeightC is greater than or equal to 0 and less than 2 for any n=0 . . . pps_num_hor_virtual_boundaries−1, the following applies:

$v_{y+j}$=Clip3(PpsVirtualBoundariesPosY[n]/SubHeightC, pic_height_in_luma_samples/SubHeightC−1,yCtbC+y+j)      (8-1250)

Otherwise, if pps_loop_filter_across_virtual_boundaries_disabled_flag is equal to 1 and PpsVirtualBoundariesPosY[n]/SubHeightC−yCtbC−y is greater than 0 and less than 3 for any n=0 . . . pps_num_hor_virtual_boundaries−1, the following applies:

$v_{y+j}$=Clip3(0,PpsVirtualBoundariesPosY[n]/SubHeightC−1,yCtbC+y+j)      (8-1251)

Otherwise, the]] The following applies:

$v_{y+j}$=Clip3(0,pic_height_in_luma_samples/SubHeightC−1,y CtbC+y+j)      (8-1252)

[[The variable apply VirtualBoundary is derived as follows:

If one or more of the following conditions are true, apply VirtualBoundary is set equal to 0:
- The bottom boundary of the current coding tree block is the bottom boundary of the picture.
- The bottom boundary of the current coding tree block is the bottom boundary of the brick and loop_filter_across_bricks_enabled_flag is equal to 0.
- The bottom boundary of the current coding tree block is the bottom boundary of the slice and loop_filter_across_slices_enabled_flag is equal to 0.
- The bottom boundary of the current coding tree block is one of the bottom virtual boundaries of the picture and pps_loop_filter_across_virtual_boundaries_disabled_flag is equal to 1.

Otherwise, apply VirtualBoundary is set equal to 1.]]

The variable boundaryPos1 and boundaryPos2 are derived by invoking the vertical boundary position derivation process for luma samples as specified in 8.8.5.5 with yCtb equal to yCtb and y equal to y.

The variable boundaryPos1 is set equal to boundaryPos1/SubWidthC.

The variable boundaryPos2 is set equal to boundaryPos2/SubWidthC.

The reconstructed sample offsets r1 and r2 are specified in Table 8-24 according to the horizontal luma sample position y and apply VirtualBoundary.

The variable curr is derived as follows:

curr=recPicture[$h_x$,$v_y$]      (8-1253)

The array of chroma filter coefficients f[j] and the array of chroma clipping values c[j] is derived as follows with j=0 . . . 5:

$f[j]$=AlfCoeff$_C$[slice_alf_aps_id_chroma][j]      (8-1254)

$c[j]$=AlfClip$_C$[slice_alf_aps_id_chroma][j]      (8-1255)

The variable sum is derived as follows:

sum=f[0]*(Clip3(−c[0],c[0],recPicture[$h_x$,$v_{y+r2}$]−curr)+Clip3(−c[0],c[0],recPicture[$h_x$,$v_{y−r2}$]−curr))+ f[1]*(Clip3(−c[1],c[1],recPicture[$h_{x+1}$,$v_{y+r1}$]−curr)+Clip3(−c[1],c[1],recPicture[$h_{x−1}$,$v_{y−r1}$]−curr))+ f[2]*(Clip3(−c[2], c[2], recPicture[$h_x$, $v_{y+r1}$]−curr)+Clip3(−c[2], c[2], recPicture[$h_x$,$v_{y−r1}$]−curr))+      (8-1256)

f[3]*(Clip3(−c[3],c[3],recPicture[$h_{x−1}$,$v_{y+r1}$]−curr)+Clip3(−c[3],c[3],recPicture[$h_{x+1}$,$v_{y−r1}$]−curr))+ f[4]*(Clip3(−c[4],c[4],recPicture[$h_{x+2}$,$v_y$]−curr)+Clip3(−c[4],c[4],recPicture[$h_{x−2}$,$v_y$]−curr))+ f[5]*(Clip3(−c[5],c[5],recPicture[$h_{x+1}$,$v_y$]−curr)+Clip3(−c[5],c[5],recPicture[$h_{x−1}$,$v_y$]−curr))

sum=curr+(sum+64)»7)      (8-1257)

The modified filtered reconstructed chroma picture sample alfPicture[xCtbC+x][yCtbC+y] is derived as follows:

If pcm_loop_filter_disabled_flag and pcm_flag[(xCtbC+x)*SubWidthC][(yCtbC+y)*SubHeightC] are both equal to 1, the following applies:

alfPicture[xCtbC+x][yCtbC+y]=recPicture$_L$[$h_x$,$v_y$]      (8-1258)

Otherwise (pcm_loop_filter_disabled_flag is equal to 0 or pcm_flag[x][y] is equal 0), the following applies:

alfPcture[xCtbC+x][yCtbC+y]=Clip3(0,(1«BitDepth$_C$)−1,sum)      (8-1259)

TABLE 8-25

Specification of r1 and r2 according to the horizontal luma sample position y and applyVirtualBoundary]]

| [[condition | r1 | r2 |
|---|---|---|
| ( y = = ctbHeightC − 2 \|\| y = = ctbHeightC − 3 ) && ( applyVirtualBoundary = = 1 ) | 0 | 0 |
| ( y = = ctbHeightC − 1 \|\| y = = ctbHeightC − 4 ) && ( applyVirtualBoundary = = 1 ) | 1 | 1 |
| otherwise | 1 | 2]]++ |

TABLE 8-25

Specification of r1 and r2 according to the horizontal lum sample position y and boundary Pos1 and boundary Pos2

| condition | r1 | r2 |
|---|---|---|
| ( y = = boundaryPos1 − 1 \|\| y = = boundary Pos1 ) && ( boundaryPos1 >−1 && ( boundaryPos2= = −1 \|\| boundaryPos2>=boundaryPos1 + 4 ) ) | 0 | 0 |
| ( y = = boundaryPos1 − 2 \|\| y = = boundaryPos1 + 1) && ( boundaryPos1>−1 && ( boundaryPos2= = −1 \|\| boundaryPos2>=boundaryPos1 + 4 ) ) | 1 | 1 |
| ( y = = boundaryPos − 1 \|\| y = = boundary Pos1 \|\| y = = boundaryPos2 − 1 \|\| y = = boundaryPos2 ) && ( boundaryPos1 >−1 &&boundaryPos2 = = boundaryPos1 + 2 ) ) | 0 | 0 |
| ( y = = boundaryPos1 − 2 \|\| y = = boundary Pos2 + 1 ) && ( boundaryPos1>−1 && boundaryPos2 = = boundaryPos1 + 2 ) ) | 1 | 1 |
| otherwise | 1 | 2 |

8.8.5.5 Vertical Boundary Position Derivation Process for Luma Samples

Inputs of this process are:
 a luma location yCtb specifying the vertical position of the top-left sample of the current luma coding tree block relative to the top left sample of the current picture.
 a luma location y specifying the vertical position of the current pixel relative to the top-left sample of the current luma coding tree block.

Output of this process are:
 the above vertical boundary position boundaryPos1.
 the below vertical boundary position boundaryPos2.
 The variable boundaryPos1 is derived as follows:
  The variable boundaryPos1 is set equal to −1.
  If pps_loop_filter_across_virtual_boundaries_disabled_flag is equal to 1 and yCtb+y−PpsVirtualBoundariesPos[n] is greater than or equal to 0 and less than 3 for any n=0 . . . pps_num_hor_virtual_boundaries—1, the following applies:

boundaryPos1=PpsVirtualBoundariesPosY[n]   (8-1201)

Otherwise, if pps_loop_filter_across_virtual_boundaries_disabled_flag is equal to 1 and PpsVirtualBoundariesPosY[n]−yCtb−y is greater than 0 and less than 4 for any n=0 . . . pps_num_hor_virtual_boundaries−1, the following applies:

boundaryPos1=PpsVirtualBoundariesPosY[n]   (8-1201)

The variable boundaryPos2 is derived as follows:
  The variable boundaryPos2 is set equal to −1.
  If the bottom boundary of the current coding tree block is the bottom boundary of the brick and loop_filter_across_bricks_enabled_flag is equal to 0, the following applies:
   If CtbSizeY−y is smaller than 4, the variable boundaryPos2 is set equal to CtbSizeY.
  Otherwise, if the bottom boundary of the current coding tree block is the bottom boundary of the slice and loop_filter_across_slices_enabled_flag is equal to 0, the following applies:
   If CtbSizeY−y is smaller than 4, the variable boundaryPos2 is set equal to CtbSizeY.
  Otherwise, if the top boundary of the current coding tree block is the top boundary of the brick and loop_filter_across_bricks_enabled_flag is equal to 0, the following applies:
   If y is smaller than 3, the variable boundaryPos2 is set equal to 0.
  Otherwise, if the top boundary of the current coding tree block is the top boundary of the slice and loop_filter_across_slices_enabled_flag is equal to 0, the following applies:
   If y is smaller than 3, the variable boundaryPos2 is set equal to 0.
  If the variable boundaryPos1 is equal to −1, the following applies:
   The variable boundaryPos1 is equal to boundaryPos2.
   The variable boundaryPos2 is equal to −1.
 The variable applyVirtualBoundary is derived as follows:
  If one or more of the following conditions are true, applyVirtualBoundary is set equal to 0:
   The bottom boundary of the current coding tree block is the bottom boundary of the picture.
  Otherwise, applyVirtualBoundary is set equal to 1.
 If applyVirtualBoundary is equal to 1, the following applies:
  If boundaryPos1 is equal to −1, boundaryPos1 is set equal to CtbSizeY−4.
  Otherwise, If boundaryPos2 is equal to −1, boundaryPos2 is set equal to CtbSizeY−4.
 If boundaryPos1 is not equal to −1 and boundaryPos1 is not equal to −1, the following applies:
  If boundaryPos1 is equal to boundaryPos2, boundaryPos2 is set equal to 1.
  Otherwise, If boundaryPos1 is greater than boundaryPos2, the following applies:
   The variable tmpPos is set equal to boundaryPos2.
   The variable boundaryPos2 is set equal to boundaryPos1
 The variable boundaryPos1 is set equal to tmpPos.

Figure 22:
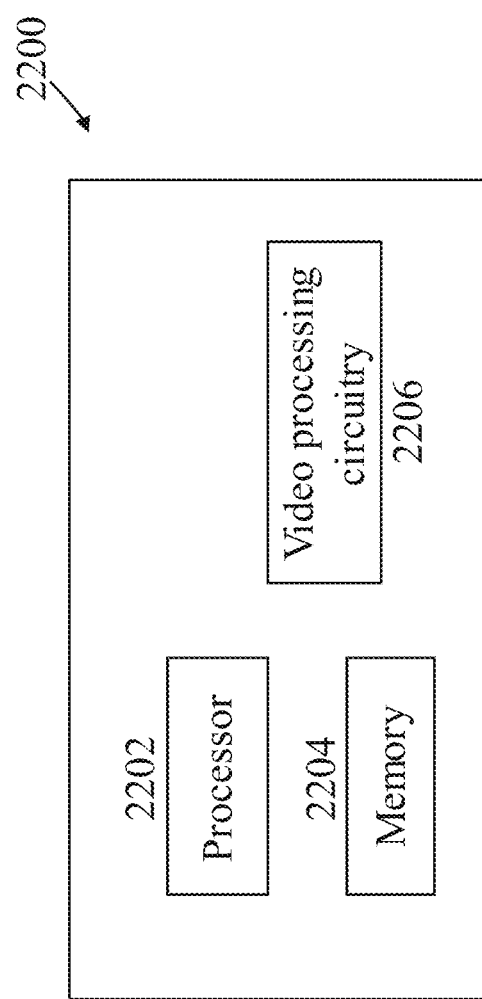
FIG. 22 is a block diagram of an example of a video processing apparatus.

FIG. 22 is a block diagram of a video processing apparatus 2200. The apparatus 2200 may be used to implement one or more of the methods described herein. The apparatus 2200 may be embodied in a smartphone, tablet, computer, Internet of Things (IoT) receiver, and so on. The apparatus 2200 may include one or more processors 2202, one or more memories 2204 and video processing hardware 2206. The processor(s) 2202 may be configured to implement one or more methods described in the present document. The memory (memories) 2204 may be used for storing data and code used for implementing the methods and techniques described herein. The video processing hardware 2206 may be used to implement, in hardware circuitry, some techniques described in the present document.

In some embodiments, the video coding methods may be implemented using an apparatus that is implemented on a hardware platform as described with respect to FIG. 22.

Figure 23:
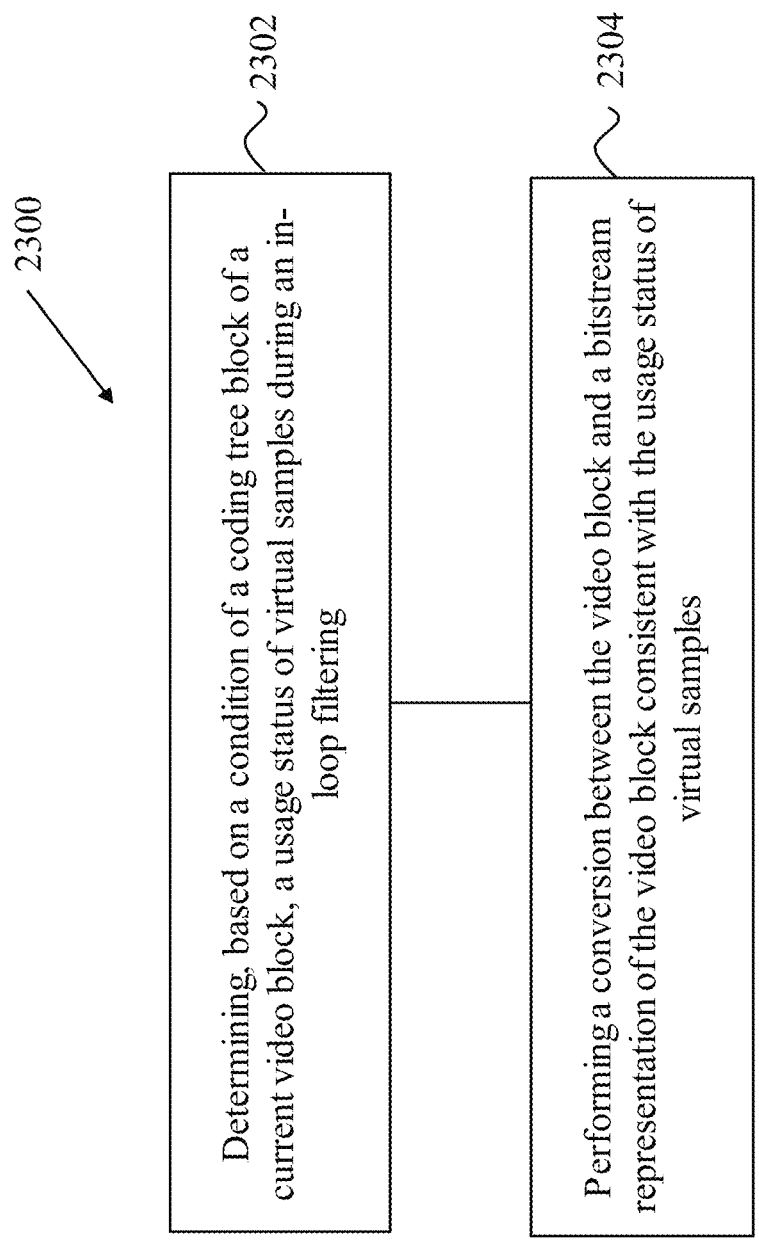
FIG. 23 is a flowchart for an example method of video processing.

FIG. 23 is a flowchart of an example method 2300 of video processing. The method includes determining (2302), for a conversion between a current video block of a video and a bitstream representation of the current video block, one or more interpolation filters to use during the conversion, wherein the one or more interpolation filters are from multiple interpolation filters for the video and performing (2304) the conversion using the one or more interpolation filters.

Various solutions and embodiments described in the present document are further described using a list of solutions.

Section 4, item 1 provides additional examples of the following solutions.

1. A method of video processing, comprising: performing a conversion between video blocks of a video picture and a bitstream representation thereof, wherein the video blocks are processed using logical groupings of coding tree blocks, wherein the coding tree blocks are processed based on whether a bottom boundary of a bottom coding tree block is outside a bottom boundary of the video picture.

2. The method of solution 1, wherein the processing the coding tree block includes performing an adaptive loop filtering of sample values of the coding tree block by using samples within the coding tree block.

3. The method of solution 1, wherein the processing the coding tree block includes performing an adaptive loop filtering of sample values of the coding tree block by disabling splitting the coding tree block into two parts according to virtual boundaries.

Section 4, item 2 provides additional examples of the following solutions.

4. A method of video processing, comprising: determining, based on a condition of a coding tree block of a current video block, a usage status of virtual samples during an in-loop filtering; and performing a conversion between the video block and a bitstream representation of the video block consistent with the usage status of virtual samples.

5. The method of solution 4, wherein, a logical true value of the usage status indicates that the current video block is split at least to two parts by a virtual boundary and filtering samples in one part is disallowed to utilize the information from another part.

6. The method of solution 4, wherein, a logical true value of the usage status indicates virtual samples are used during the in-loop filtering, and wherein the in-loop filtering is performed using modified values of reconstructed samples of the current video block.

7. The method of solution 4, wherein a logical false value of the usage status indicates that filtering samples in the block is allowed to utilize the information in the same block.

8. The method of solution 4, wherein, a logical true value of the usage status indicates the in-loop filtering is performed on reconstructed samples of the current video block without further modifying the reconstructed samples.

9. The method of any of solutions 4-8, wherein the condition specifies to set the usage status to the logical false value due to the coding tree block having a specific size.

10. The method of any of solutions 4-8, wherein the condition specifies to set the usage status to the logical false value due to the coding tree block having a size greater than a specific size.

11. The method of any of solutions 4-8 tree block having a size less than a specific size.

Section 4, item 3 provides additional examples of the following solutions.

12. The method of solution 5, wherein the condition depends on whether a bottom boundary of the current video block is a bottom boundary of a video unit that is smaller than the video picture or the bottom boundary of the current video block is a virtual boundary.

13. The method of solution 12, wherein the condition depends on whether a bottom boundary of the current video block is a bottom boundary of a slice or tile or brick boundary.

14. The method of solution 12, wherein the condition specifies to set the usage status to the logical true value when the bottom boundary of the current videoblock is a bottom boundary of a slice or tile or brick boundary.

15. The method of solution 4-12, wherein the condition specifies to set the usage status to the logical false value when the bottom boundary of the current video block is a bottom boundary of a picture boundary or outside the bottom boundary of a picture boundary.

Section 4, item 4 provides additional examples of the following solutions.

16. A method of video processing, comprising: determining, during a conversion between a video picture that is logically grouped into one or more video slices or video bricks, and a bitstream representation of the video picture, to disable a use of samples in another slice or brick in the adaptive loop filter process; and performing the conversion consistent with the determining Section 4, item 5 provides additional examples of the following solutions.

17. A method of video processing, comprising: determining, during a conversion between a current video block of a video picture and a bitstream representation of the current video block, that the current video block includes samples located at a boundary of a video unit of the video picture; and performing the conversion based on the determining, wherein the performing the conversion includes generating virtual samples for an in-loop filtering process using a unified method that is same for all boundary types in the video picture.

18. The method of solution 17, wherein the video unit is a slice or tile or 360-degree video.

19. The method of solution 17, wherein the in-loop filtering includes adaptive loop filtering.

20. The method of any of solutions 17-19, wherein the unified method is a two-side padding method.

21. The method of any of solutions 17-20, wherein the unified method is when accessing samples below a first line is disallowed and padding is utilized to generate virtual samples for those below the first line, then accessing samples above a second line is also set to be disallowed and padding is utilized to generate virtual samples for those above the second line.

22. The method of any of solutions 17-20, wherein the unified method is when accessing samples above a first line is disallowed and padding is utilized to generate virtual samples for those above the first line, then accessing samples below a second line is also set to be disallowed and padding is utilized to generate virtual samples for those below the second line.

23. The method of any of solutions 21-22, wherein the distance between the first line and a current line where the current sample to be filtered is located and distance between the second line and the first line is equal.

Section 4, item 6 provides additional examples of the following solutions.

24. A method of video processing, comprising: determining to apply, during a conversion between a current video block of a video picture and a bitstream representation thereof, one of multiple adaptive loop filter (ALF) sample selection methods available for the video picture during the conversion; and performing the conversion by applying the one of multiple ALF sample selection methods.

25. The method of solution 24, wherein the multiple ALF sample selection methods include a first method in which samples are selected before an in-loop filter is applied to the current video block during the conversion and a second method in which samples are selected after an in-loop filter is applied to the current video block during the conversion.

Section 4, item 7 provides additional examples of the following solutions.

26. A method of video processing, comprising: performing, based on a boundary rule, an in-loop filtering operation over samples of a current video block of a video picture during a conversion between the current videoblock and a bitstream representation of a current video block; wherein the boundary rule disables using samples that cross a virtual pipeline data unit (VPDU) of the video picture, and performing the conversion using a result of the in-loop filtering operation.

27. The method of solution 26, wherein the VPDU corresponds to a region of the video picture having a fixed size.

28. The method of any of solutions 26-27, wherein the boundary rule further specifies to use virtual samples for the in-loop filtering in place of disabled samples.

29. The method of solution 28, wherein the virtual samples are generated by padding.

Section 4, item 8 provides additional examples of the following solutions.

30. A method of video processing, comprising: performing, based on a boundary rule, an in-loop filtering operation over samples of a current video block of a video picture during a conversion between the current videoblock and a bitstream representation of a current video block; wherein the boundary rule specifies to use, for locations of the current video block across a video unit boundary, samples that are generated without using padding; and performing the conversion using a result of the in-loop filtering operation.

31. The method of solution 30, wherein the samples are generated using a two-side padding technique.

32. The method of solution 30, wherein the in-loop filtering operation comprises using a same virtual sample generation technique for symmetrically located samples during the in-loop filtering operation.

33. The method of any of solutions 30-32, wherein the in-loop filtering operation over samples of the current video block includes performing reshaping of the samples of the current video block prior to applying the in-loop filtering.

Section 4, item 9 provides additional examples of the following solutions.

34. A method of video processing, comprising: performing, based on a boundary rule, an in-loop filtering operation over samples of a current video block of a video picture during a conversion between the current videoblock and a bitstream representation of a current video block; wherein the boundary rule specifies selecting, for the in-loop filtering operation, a filter having dimensions such that samples of current video block used during the in-loop filtering do not cross a boundary of a video unit of the video picture; and performing the conversion using a result of the in-loop filtering operation.

Section 4, item 10 provides additional examples of the following solutions.

35. A method of video processing, comprising: performing, based on a boundary rule, an in-loop filtering operation over samples of a current video block of a video picture during a conversion between the current videoblock and a bitstream representation of a current video block; wherein the boundary rule specifies selecting, for the in-loop filtering operation, clipping parameters or filter coefficients based on whether or not padded samples are needed for the in-loop filtering; and performing the conversion using a result of the in-loop filtering operation.

36. The method of solution 35, wherein the clipping parameters or filter coefficients are included in the bitstream representation.

Section 4, item 11 provides additional examples of the following solutions.

37. A method of video processing, comprising: performing, based on a boundary rule, an in-loop filtering operation over samples of a current video block of a video picture during a conversion between the current videoblock and a bitstream representation of a current video block; wherein the boundary rule depends on a color component identity of the current video block; and performing the conversion using a result of the in-loop filtering operation.

38. The method of solution 37, wherein the boundary rule is different for luma and/or different color components.

39. The method of any of solutions 1-38, wherein the conversion includes encoding the current video block into the bitstream representation.

40. The method of any of solutions 1-38, wherein the conversion includes decoding the bitstream representation to generate sample values of the current video block.

41. A video encoding apparatus comprising a processor configured to implement a method recited in any one or more of solutions 1-38.

42. A video decoding apparatus comprising a processor configured to implement a method recited in any one or more of solutions 1-38.

43. A computer-readable medium having code stored thereon, the code, upon execution by a processor, causing the processor to implement a method recited in any one or more of solutions 1-38.

Figure 28:
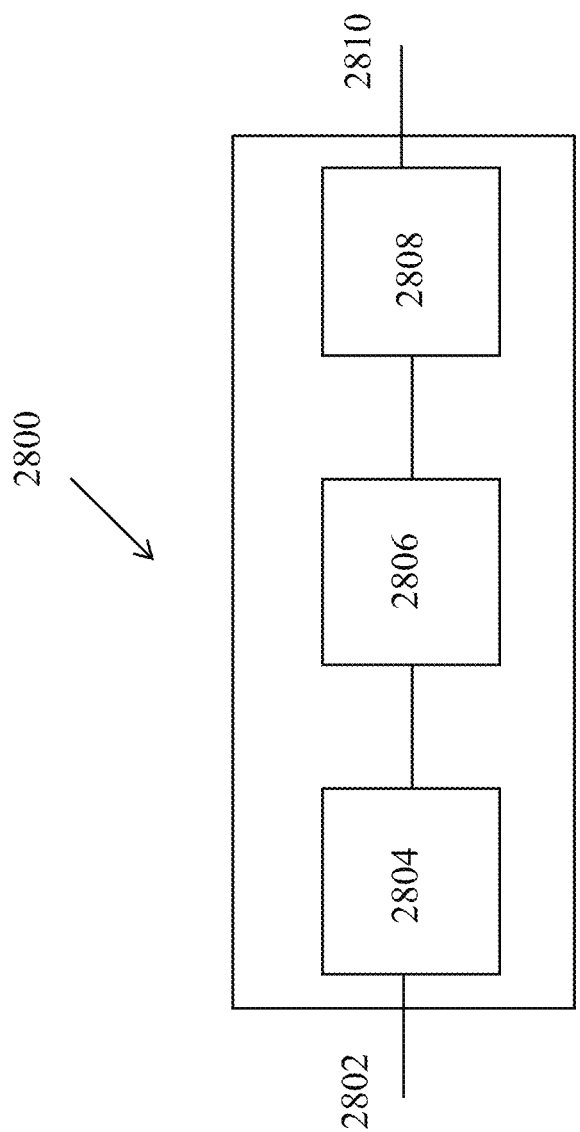
FIG. 28 is a block diagram of an example video processing system in which disclosed techniques may be implemented.

FIG. 28 is a block diagram showing an example video processing system 2800 in which various techniques disclosed herein may be implemented. Various implementations may include some or all of the components of the system 2800. The system 2800 may include input 2802 for receiving video content. The video content may be received in a raw or uncompressed format, e.g, 8 or 10 bit multi-component pixel values, or may be in a compressed or encoded format. The input 2802 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 2800 may include a coding component 2804 that may implement the various coding or encoding methods described in the present document. The coding component 2804 may reduce the average bitrate of video from the input 2802 to the output of the coding component 2804 to produce a coded representation of the video. The coding techniques are therefore sometimes called video compression or video transcoding techniques. The output of the coding component 2804 may be either stored, or transmitted via a communication connected, as represented by the component 2806. The stored or communicated bitstream (or coded) representation of the video received at the input 2802 may be used by the component 2808 for generating pixel values or displayable video that is sent to a display interface 2810. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

Figure 29:
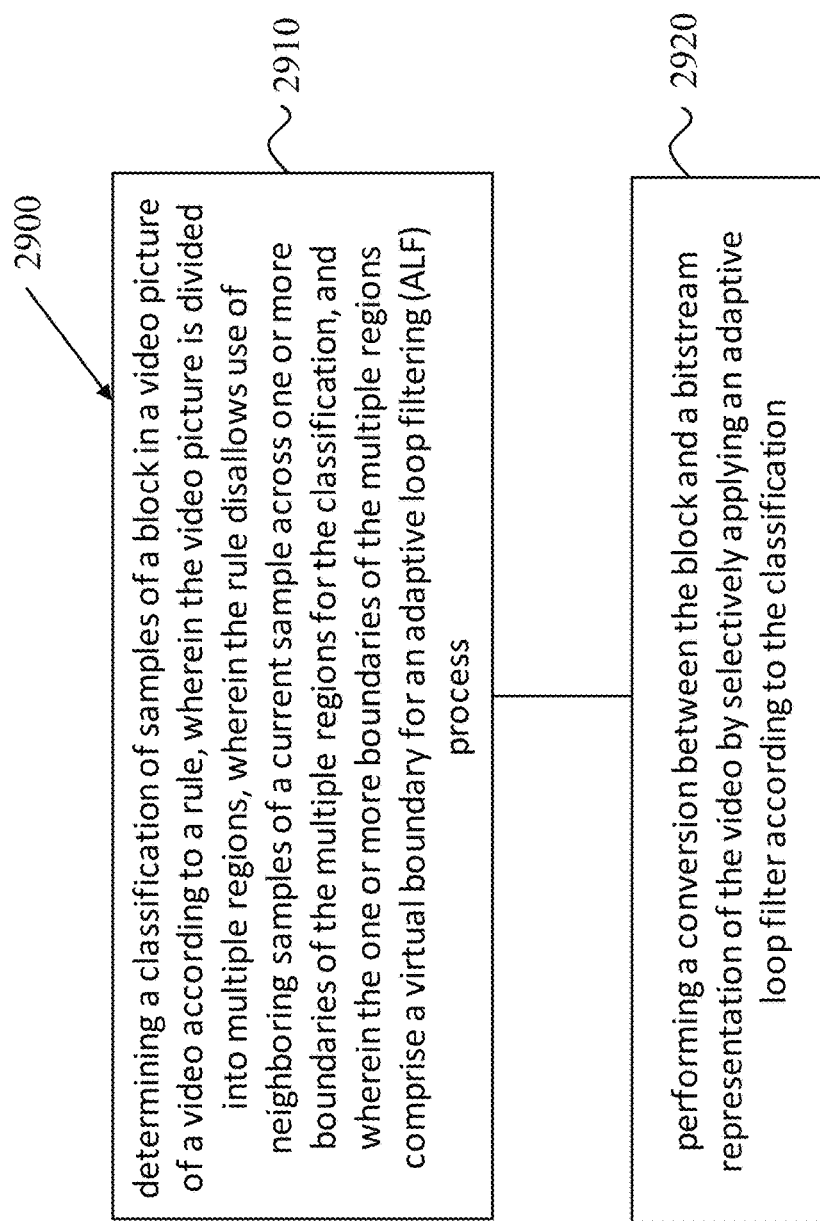
FIG. 29 is a flowchart representation of a method for video processing in accordance with the present technology.

FIG. 29 is a flowchart representation of a method 2900 for video processing in accordance with the present technology. The method 2900 includes, at operation 2910, determining a classification of samples of a block in a video picture of a video according to a rule. The video picture is divided into multiple regions. The rule disallows use of neighboring samples of a current sample across one or more boundaries of the multiple regions for the classification. The one or more boundaries of the multiple regions comprise a virtual boundary for an adaptive loop filtering (ALF) process. The method 2900 also includes, at operation 2920, performing a conversion between the block and a bitstream representation of the video by selectively applying an adaptive loop filter according to the classification.

In some embodiments, a gradient of the current sample is not calculated in case a neighboring sample of the current sample is unavailable for the classification. In some embodiments, the gradient is considered to be zero for the classification. In some embodiments, the gradient is excluded in the classification.

In some embodiments, a directionality or an activity value of the block for the classification is scaled in case the set of neighboring samples available for the classification is a subset of neighboring samples of the current sample. In some embodiments, the classification requires gradients of N samples of the block while gradients are calculated for only M samples in the block, wherein M and N are integers, M being smaller than N. The directionality or the activity value of the block is scaled by a factor that is based on M and N. In some embodiments, the factor is N/M. In some embodiments, the factor is MN.

In some embodiments, the one or more boundaries comprise at least a vertical boundary. In some embodiments, whether the classification is applicable with respect to a 360 virtual boundary of the video region used in 360-degree video coding is based on a location of the 360 virtual boundary. In some embodiments, the classification is applicable with respect to the 360 virtual boundary in case the 360 virtual boundary is co-located with an actual boundary of a coding tree unit. In some embodiments, only a two-sided padding operation is applied for samples located at the 360 virtual boundary in the ALF process. In some embodiments, the classification is not applicable with respect to the 360 virtual boundary in case the 360 virtual boundary is separate from an actual boundary of a coding tree unit. In some embodiments, a single-sided padding operation is applied for samples located at the 360 virtual boundary in the ALF process. In some embodiments, the one or more boundaries further comprise another virtual boundary, and a two-sided padding operation is applied after the single-sided padding operation in the ALF process. In some embodiments, the multiple regions include a slice, a brick, a tile, or a sub-picture.

In some embodiments, the conversion includes encoding the video into the bitstream representation. In some embodiments, the conversion includes decoding the bitstream representation into the video.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

Some embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the disclosed technology include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was enabled based on the decision or determination.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, e.g., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub combination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A method of processing video data, comprising:
   determining, for a conversion between a picture of a video comprising one or more coding tree blocks and a bitstream of the video, that a first filtering process is applied to a current coding tree block of the one or more coding tree blocks;
   determining a classification of an M×N region of the current coding tree block based on gradients derived from a P×Q region including the M×N region according to a rule, wherein the rule disallows use of a sample in the P×Q region across one or more boundaries of multiple kinds of video regions, and wherein the picture is divided into multiple kinds of video regions and the one or more boundaries at least comprise a 360-degree virtual boundary or a picture boundary, where M, N, P, Q are positive integers, P is greater than M and Q is greater than N; and
   performing the conversion by applying the first filtering process according to the determined classification, wherein the first filtering process comprises:
      deriving a filtering coefficient set for the M×N region based on the determined classification;
      determining a clipping value set for the M×N region; and
      performing a filtering operation based on the filtering coefficient set and the clipping value set.

2. The method of claim 1, wherein a one-side padding process is applied to generate one or more virtual samples for the sample across the one or more boundaries, wherein the one or more virtual samples are copied from available samples inside a video region where the M×N region is located in.

3. The method of claim 1, wherein the one or more boundaries conditionally further comprise at least one of: a slice boundary, a tile boundary, or a sub-picture boundary.

4. The method of claim 2, further comprising determining whether a virtual boundary is enabled for the current coding tree block based on a relationship between a bottom boundary of the current coding tree block and a bottom boundary of the picture.

5. The method of claim 4, wherein the virtual boundary is enabled in case the bottom boundary of the current coding tree block is not the bottom boundary of the picture.

6. The method of claim 4, wherein the virtual boundary is used to determine the classification, and wherein samples outside the virtual boundary are not used to determine the classification.

7. The method of claim 1, wherein the M×N region is a 4*4 region and the P×Q region is a 10*10 region.

8. The method of claim 1, wherein 1:2 sub sampling is used when determining the classification.

9. The method of claim 1, wherein the first filtering process is an adaptive loop filtering process.

10. The method of claim 1, wherein the conversion includes encoding the video into the bitstream.

11. The method of claim 1, wherein the conversion includes decoding the bitstream into the video.

12. An apparatus for processing video data comprising a processor and a non-transitory memory with instructions thereon, wherein the instructions upon execution by the processor, cause the processor to:
  determine, for a conversion between a picture of a video comprising one or more coding tree blocks and a bitstream of the video, that a first filtering process is applied to a current coding tree block of the one or more coding tree blocks;
  determine a classification of an M×N region of the current coding tree block based on gradients derived from a P×Q region including the M×N region according to a rule, wherein the rule disallows use of a sample in the P×Q region across one or more boundaries of multiple kinds of video regions, and wherein the picture is divided into multiple kinds of video regions and the one or more boundaries at least comprise a 360-degree virtual boundary or a picture boundary, where M, N, P, Q are positive integers, P is greater than M and Q is greater than N; and
  perform the conversion by applying the first filtering process according to the determined classification, wherein the first filtering process comprises:
    deriving a filtering coefficient set for the M×N region based on the determined classification;
    determining a clipping value set for the M×N region; and
    performing a filtering operation based on the filtering coefficient set and the clipping value set.

13. The apparatus of claim 12, wherein a one-side padding process is applied to generate one or more virtual samples for the sample across the one or more boundaries, wherein the one or more virtual samples are copied from available samples inside a video region where the M×N region is located in; and
  wherein the one or more boundaries conditionally further comprise at least one of: a slice boundary, a tile boundary, or a sub-picture boundary.

14. The apparatus of claim 12, wherein the processor is further caused to determine whether a virtual boundary is enabled for the current coding tree block based on a relationship between a bottom boundary of the current coding tree block and a bottom boundary of the picture;
  wherein the virtual boundary is enabled in case the bottom boundary of the current coding tree block is not the bottom boundary of the picture;
  wherein the virtual boundary is used to determine the classification, and wherein samples outside the virtual boundary are not used to determine the classification; and
  wherein the first filtering process is an adaptive loop filtering process.

15. A non-transitory computer-readable storage medium storing instructions that cause a processor to:
  determine, for a conversion between a picture of a video comprising one or more coding tree blocks and a bitstream of the video, that a first filtering process is applied to a current coding tree block of the one or more coding tree blocks;
  determine a classification of an M×N region of the current coding tree block based on gradients derived from a P×Q region including the M×N region according to a rule, wherein the rule disallows use of a sample in the P×Q region across one or more boundaries of multiple kinds of video regions, and wherein the picture is divided into multiple kinds of video regions and the one or more boundaries at least comprise a 360-degree virtual boundary or a picture boundary, where M, N, P, Q are positive integers, P is greater than M and Q is greater than N; and
  perform the conversion by applying the first filtering process according to the determined classification, wherein the first filtering process comprises:
    deriving a filtering coefficient set for the M×N region based on the determined classification;
    determining a clipping value set for the M×N region; and
    performing a filtering operation based on the filtering coefficient set and the clipping value set.

16. The non-transitory computer-readable storage medium of claim 15, wherein a one-side padding process is applied to generate one or more virtual samples for the sample across the one or more boundaries, wherein the one or more virtual samples are copied from available samples inside a video region where the M×N region is located in; and
  wherein the one or more boundaries conditionally further comprise at least one of: a slice boundary, a tile boundary, or a sub-picture boundary.

17. The non-transitory computer-readable storage medium of claim 15, wherein the processor is further caused to determine whether a virtual boundary is enabled for the current coding tree block based on a relationship between a bottom boundary of the current coding tree block and a bottom boundary of the picture;
  wherein the virtual boundary is enabled in case the bottom boundary of the current coding tree block is not the bottom boundary of the picture;
  wherein the virtual boundary is used to determine the classification, and wherein samples outside the virtual boundary are not used to determine the classification; and
  wherein the first filtering process is an adaptive loop filtering process.

18. A non-transitory computer-readable recording medium storing a bitstream of a video which is generated by a method performed by a video processing apparatus, wherein the method comprises:
  determining, for a picture of a video comprising one or more coding tree blocks, that a first filtering process is applied to a current coding tree block of the one or more coding tree blocks;
  determining a classification of an M×N region of the current coding tree block based on gradients derived from a P×Q region including the M×N region according to a rule, wherein the rule disallows use of a sample in the P×Q region across one or more boundaries of multiple kinds of video regions, and wherein the picture is divided into multiple kinds of video regions and the one or more boundaries at least comprise a 360-degree virtual boundary or a picture boundary, where M, N, P, Q are positive integers, P is greater than M and Q is greater than N;
  generating the bitstream by applying the first filtering process according to the determined classification, wherein the first filtering process comprises:
    deriving a filtering coefficient set for the M×N region based on the determined classification;

determining a clipping value set for the M×N region; and performing a filtering operation based on the filtering coefficient set and the clipping value set.

19. The non-transitory computer-readable storage medium of claim 18, wherein a one-side padding process is applied to generate one or more virtual samples for the sample across the one or more boundaries, wherein the one or more virtual samples are copied from available samples inside a video region where the M×N region is located in; and wherein the one or more boundaries conditionally further comprise at least one of: a slice boundary, a tile boundary, or a sub-picture boundary.

20. The non-transitory computer-readable storage medium of claim 18, wherein the method further comprises determining whether a virtual boundary is enabled for the current coding tree block based on a relationship between a bottom boundary of the current coding tree block and a bottom boundary of the picture;

wherein the virtual boundary is enabled in case the bottom boundary of the current coding tree block is not the bottom boundary of the picture;

wherein the virtual boundary is used to determine the classification, and wherein samples outside the virtual boundary are not used to determine the classification; and wherein the first filtering process is an adaptive loop filtering process.

* * * * *